US012793467B2

(12) United States Patent
Berkebile

(10) Patent No.: US 12,793,467 B2
(45) **Date of Patent: *Nov. 10, 2026**

(54) SYSTEMS AND METHODS FOR VIRTUAL AND AUGMENTED REALITY

(71) Applicant: MAGIC LEAP, INC., Plantation, FL (US)

(72) Inventor: Robert David Berkebile, Phoenix, MD (US)

(73) Assignee: Magic Leap, Inc., Plantation, FL (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/820,103

(22) Filed: Aug. 29, 2024

(65) Prior Publication Data

US 2024/0420508 A1 Dec. 19, 2024

Related U.S. Application Data

(63) Continuation of application No. 17/211,502, filed on Mar. 24, 2021, now Pat. No. 12,112,574.
(Continued)

(51) Int. Cl.
*G06V 40/20* (2022.01)
*G02B 27/01* (2006.01)
(Continued)

(52) U.S. Cl.
CPC ......... *G06V 40/20* (2022.01); *G02B 27/0172* (2013.01); *G06F 3/04812* (2013.01);
(Continued)

(58) Field of Classification Search
CPC ..... G06T 19/006; G06T 7/70; G02B 27/0172; G02B 27/0093; G02B 2027/0138;
(Continued)

(56) References Cited

U.S. PATENT DOCUMENTS

| | | | | |
|---|---|---|---|---|
| 10,937,247 | B1 * | 3/2021 | Chuah | G06T 7/70 |
| 11,017,611 | B1 * | 5/2021 | Mount | G06V 20/20 |

(Continued)

FOREIGN PATENT DOCUMENTS

| | | |
|---|---|---|
| JP | 2015522195 | 8/2015 |
| WO | WO 2017/215899 | 12/2017 |
| WO | WO 2019123729 | 6/2019 |

OTHER PUBLICATIONS

Foreign Examination Report for EP Patent Appln. No. 21774273.3 dated Dec. 10, 2025.

(Continued)

*Primary Examiner* — Jitesh Patel

(74) *Attorney, Agent, or Firm* — Vista IP Law Group, LLP

(57) ABSTRACT

An apparatus for providing a virtual or augmented reality experience, includes: a screen, wherein the screen is at least partially transparent for allowing a user of the apparatus to view an object in an environment surrounding the user; a surface detector configured to detect a surface of the object; an object identifier configured to obtain an orientation and/or an elevation of the surface of the object, and to make an identification for the object based on the orientation and/or the elevation of the surface of the object; and a graphic generator configured to generate an identifier indicating the identification for the object for display by the screen, wherein the screen is configured to display the identifier.

20 Claims, 44 Drawing Sheets

Related U.S. Application Data

(60) Provisional application No. 62/994,159, filed on Mar. 24, 2020.

(51) Int. Cl.

| | |
|---|---|
| ***G06F 3/04812*** | (2022.01) |
| ***G06F 3/04815*** | (2022.01) |
| ***G06F 3/04842*** | (2022.01) |
| ***G06T 7/70*** | (2017.01) |
| ***G06T 19/00*** | (2011.01) |
| ***G06V 10/25*** | (2022.01) |
| ***G06V 10/44*** | (2022.01) |
| ***G06V 20/10*** | (2022.01) |
| ***G06V 20/20*** | (2022.01) |
| ***G06V 40/18*** | (2022.01) |

(52) U.S. Cl.

CPC ...... *G06F 3/04815* (2013.01); *G06F 3/04842* (2013.01); *G06T 7/70* (2017.01); *G06T 19/006* (2013.01); *G06V 10/25* (2022.01); *G06V 10/44* (2022.01); *G06V 20/10* (2022.01); *G06V 20/20* (2022.01); *G06V 40/18* (2022.01)

(58) Field of Classification Search

CPC ........... G02B 2027/014; G06F 3/04812; G06F 3/04815; G06F 3/04842; G06F 1/163; G06F 3/011; G06F 3/0346; G06F 3/03547; G06V 20/10; G06V 10/25; G06V 10/44; G06V 20/20; G06V 40/18; G06V 40/20

See application file for complete search history.

(56) References Cited

U.S. PATENT DOCUMENTS

| | | | | |
|---|---|---|---|---|
| 2013/0083003 | A1 | 4/2013 | Perez et al. | |
| 2013/0196772 | A1* | 8/2013 | Latta | A63F 13/48 463/42 |
| 2013/0257907 | A1* | 10/2013 | Matsui | G06T 7/74 345/633 |
| 2014/0028712 | A1* | 1/2014 | Keating | G06T 19/006 345/633 |
| 2014/0333666 | A1* | 11/2014 | Poulos | G06T 19/006 345/633 |
| 2015/0309578 | A1 | 10/2015 | Mccoy et al. | |
| 2017/0262045 | A1 | 9/2017 | Rouvinez et al. | |
| 2017/0357332 | A1 | 12/2017 | Balan et al. | |
| 2018/0197340 | A1* | 7/2018 | Loberg | G06T 19/00 |
| 2019/0333282 | A1 | 10/2019 | Choi et al. | |
| 2019/0362557 | A1 | 11/2019 | Lacey et al. | |
| 2019/0370544 | A1 | 12/2019 | Wright, Jr. et al. | |
| 2020/0074738 | A1 | 3/2020 | Hare et al. | |
| 2020/0312029 | A1 | 10/2020 | Heinen et al. | |

OTHER PUBLICATIONS

Microsoft Hololens: "Microsoft Hololens: Course 250—Ch. 3—Sharing", , Jul. 14, 2017 (Jul. 14, 2017), XP093343181, Retrieved from the Internet: URL:https://www.youtube.com/watch?v=1diycJvxfDc.

Tuliper Adam: "HoloLens—Introduction to the HoloLens, Part 2: Spatial Mapping | Microsoft Learn", Jan. 31, 2017 (Jan. 31, 2017), XP093343160, Retrieved from the Internet: URL: https://learn.microsoft.com/en-us/archive/msdn-magazine/2017/january/hololens-introduction-to-the-hololens-part-2-spatialmapping.

Microsoft: "MR Sharing 250—HoloLens and immersive headsets—Mixed Reality | Microsoft Learn", , Dec. 31, 2017 (Dec. 31, 2017), XP093343178, Retrieved from the Internet: URL:https://learn.microsoft.com/en-us/windows/mixed-reality/deprecated/mixed-reality-250.

Foreign OA for CN Patent Appln. No. 202180024039.5 dated Aug. 5, 2025.

Foreign OA for CN Patent Appln. No. 202180024039.5 dated Apr. 16, 2025.

Foreign OA Response for CN Patent Appln. No. 202180024039.5 dated Jul. 29, 2025.

English Translation of Foreign OA for CN Patent Appln. No. 202180024039.5 dated Aug. 5, 2025.

English Translation of Foreign OA for CN Patent Appln. No. 202180024039.5 dated Apr. 16, 2025.

Final Office Action for U.S. Appl. No. 17/211,502 dated Jul. 18, 2023.

Non-Final Office Action for U.S. Appl. No. 17/211,502 dated Oct. 26, 2023.

Non-Final Office Action for U.S. Appl. No. 17/211,502 dated Mar. 2, 2023.

Amendment Response to NFOA for U.S. Appl. No. 17/211,502 dated Jan. 25, 2024.

Amendment Response to NFOA for U.S. Appl. No. 17/211,502 dated Jun. 1, 2023.

Notice of Allowance for U.S. Appl. No. 17/211,502 dated May 31, 2024.

Notice of Allowance for U.S. Appl. No. 17/211,502 dated Feb. 15, 2024.

PCT.International Search Report and Written Opinion for International Appln. No. PCT/US21/23961, Applicant Magic Leap, Inc., dated Jun. 4, 2021 (11 pages).

Extended European Search Report for EP Patent Appln. No. 21774273.3 dated Nov. 28, 2023.

Koch, P., "Hololens Contest—(10 Weeks to go)—Spatial Mapping, Processing, Understanding," VR, AR, and MR Development, dated Aug. 27, 2017.

Foreign OA for JP Patent Appln. No. 2022-557750 dated Apr. 26, 2024.

Foreign Response for EP Patent Appln. No. 21774273.3 dated Jun. 13, 2024.

English translation of Foreign OA for JP Patent Appln. No. 2022-557750 dated Apr. 26, 2024.

Foreign OA Response for JP Patent Appln. No. 2022-557750 dated Jul. 25, 2024.

Foreign OA Response for JP Patent Appln. No. 2022-557750 dated Aug. 21, 2024.

Foreign Response for EP Patent Appln. No. 21774273.3 dated Apr. 9, 2026.

* cited by examiner

SYSTEMS AND METHODS FOR VIRTUAL AND AUGMENTED REALITY

RELATED APPLICATION DATA

The present application is a continuation of U.S. patent application Ser. No. 17/211,502 filed on Mar. 24, 2021, which claims priority to, and the benefit of, U.S. Provisional Patent Application No. 62/994,159, filed on Mar. 24, 2020. The entire disclosures of the above applications are expressly incorporated by reference herein.

FIELD

The present disclosure relates to connected mobile computing systems, methods, and configurations, and more specifically to mobile computing systems, methods, and configurations featuring at least one wearable component which may be utilized for virtual and/or augmented reality operation.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (e.g., semi-transparent or full-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment.

It is desirable that mixed reality, or augmented reality, near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch.

SUMMARY

Methods and apparatuses for providing virtual content, such as virtual object, for display by one or more screens of one or more image display devices (worn by one or more users) are described herein. In some embodiments, the virtual content may be displayed so that it appears to be in a physical environment as viewed by a user through the screen. The virtual content may be provided for interaction by users in the same physical environment, or by users in different environments (e.g., in different rooms). New techniques for identifying objects in the environment, for defining a virtual space to place virtual items, and for inserting virtual items for interaction by one or more users, are described herein.

An apparatus for providing a virtual or augmented reality experience, includes: a screen, wherein the screen is at least partially transparent for allowing a user of the apparatus to view an object in an environment surrounding the user; a surface detector configured to detect a surface of the object; an object identifier configured to obtain an orientation and/or an elevation of the surface of the object, and to make an identification for the object based on the orientation and/or the elevation of the surface of the object; and a graphic generator configured to generate an identifier indicating the identification for the object for display by the screen, wherein the screen is configured to display the identifier.

Optionally, the object identifier is configured to identify the object as a wall if the orientation of the surface of the object is substantially vertical, and if the elevation of the surface of the object is above an elevation threshold.

Optionally, the object identifier is configured to identify the object as a floor if the orientation of the surface of the object is substantially horizontal, and if the elevation of the surface of the object is below an elevation threshold.

Optionally, the object is configured to identify the object as furniture if the orientation of the surface of the object is substantially horizontal, and if the elevation of the surface of the object is above a first elevation threshold and is below a second elevation threshold.

Optionally, the screen is configured to display the identifier at a location in the screen, such that when the user views the object in the environment through the screen, the identifier will be in a spatial relationship with respect to the object.

Optionally, the object identifier is configured to obtain an input indicating a selection of the object for which the identification of the object is to be determined.

Optionally, the input comprises a user input generated via a controller component, the user input indicating the selection of the object.

Optionally, the user input indicates a cursor position in the screen, and wherein the object identifier is configured to determine the object in the environment being selected based on the cursor position.

Optionally, the user input indicates an orientation of the controller component, and wherein the object identifier is configured to determine the object in the environment being selected based on a direction of pointing by the controller component towards the object in the environment.

Optionally, the apparatus further includes a camera, wherein the object identifier is configured to select the object for identification based on a presence of an image of the object in a camera image provided by the camera.

Optionally, the object identifier is configured to select the object automatically.

Optionally, the object identifier is configured to select the object in response to the object being presence in a sequence of camera images that comprise the camera image within a duration exceeding a time threshold.

Optionally, the apparatus further includes a space definer configured to define a virtual space.

Optionally, the space definer is configured to define a virtual wall for the virtual space.

Optionally, the virtual wall is offset from a real physical wall in the environment surrounding the user.

Optionally, the virtual wall is aligned with, or intersects, a real physical wall in the environment surrounding the user.

Optionally, the screen is configured to display a wall identifier at a location in the screen, such that when the user views the virtual wall, the wall identifier will be in a spatial relationship with respect to the virtual wall.

Optionally, the space definer is configured to define a plurality of virtual walls for the virtual space; and wherein the screen is configured to display wall identifiers for the respective virtual walls.

Optionally, the space definer is configured to define a corner for the virtual space.

Optionally, the space definer is configured to define a wall edge for the virtual space.

Optionally, the space definer is configured to obtain a user input generated via a controller component, the user input indicating a selection of a feature in the environment for defining at least a part of the virtual space.

Optionally, the feature in the environment comprises a wall, a wall corner, an edge, or any combination of the foregoing.

Optionally, the user input indicates a cursor position in the screen.

Optionally, the user input indicates an orientation of the controller component, and wherein the selection of the feature in the environment is based on a direction of pointing by the controller component towards the feature in the environment.

Optionally, the apparatus further includes a camera, wherein the apparatus is configured to select a feature in the environment, for defining at least a part of the virtual space, based on a presence of an image of the feature in a camera image provided by the camera.

Optionally, the apparatus is configured to select the feature in the environment automatically.

Optionally, the apparatus is configured to select the feature in response to the feature being presence in a sequence of camera images that includes the camera image within a duration exceeding a time threshold.

Optionally, the screen is configured to display a pointer based on an orientation of a controller component, and wherein the apparatus further comprises a pointer configurator, wherein the pointer configurator is configured to adjust a configuration of the pointer displayed in the screen, and/or to present an interaction graphic in association with the pointer.

Optionally, the pointer configurator is configured to adjust the configuration of the pointer and/or to present the interaction graphic in response to an interaction between the pointer and a virtual object.

Optionally, the graphic generator is also configured to provide a virtual content for interaction by the user and an additional user, and wherein the screen is configured to display the virtual content.

Optionally, the apparatus is configured to connect the user and the additional user to a same virtual space so that the user and the additional user can interact with the virtual content at the same virtual space.

Optionally, the graphic generator is configured to provide the virtual content for interaction by the user and the additional user in different respective rooms.

Optionally, the graphic generator is configured to provide the virtual content for interaction by the user and the additional user in a same room.

Optionally, the apparatus is configured to register the user and the additional user to the environment so that the user and the additional user can interact with the virtual content while they are in the environment.

Optionally, the apparatus is configured to register the user and the additional user to the environment by determining one or more anchor points that are associated with a location of the user and a location of the additional user.

A method performed by an apparatus that is configured to provide a virtual or augmented reality experience, includes: detecting, by a surface detector, a surface of an object in an environment surrounding a user of the apparatus; obtaining, by an object identifier, an orientation and/or an elevation of the surface of the object; identifying, by the object identifier, the object based on the orientation and/or the elevation of the surface of the object; and generating, by a graphic generator, an identifier for the identified object for display by a screen, wherein the screen is at least partially transparent for allowing the user of the apparatus to view the object in the environment surrounding the user.

Optionally, the object is identified as a wall if the orientation of the surface of the object is substantially vertical, and if the elevation of the surface of the object is above an elevation threshold.

Optionally, the object is identified as a floor if the orientation of the surface of the object is substantially horizontal, and if the elevation of the surface of the object is below an elevation threshold.

Optionally, the object is identified as furniture if the orientation of the surface of the object is substantially horizontal, and if the elevation of the surface of the object is above a first elevation threshold and is below a second elevation threshold.

Optionally, the identifier is displayed at a location in the screen, such that when the user views the object in the environment through the screen, the identifier will be in a spatial relationship with respect to the object.

Optionally, the method further includes obtaining an input indicating a selection of the object for which the identification of the object is to be determined.

Optionally, the input comprises a user input generated via a controller component, the user input indicating the selection of the object.

Optionally, the user input indicates a cursor position in the screen, and wherein the method further comprises determining the object in the environment being selected based on the cursor position.

Optionally, the user input indicates an orientation of the controller component, and wherein the method further comprises determining the object in the environment being selected based on a direction of pointing by the controller component towards the object in the environment.

Optionally, the method further includes selecting the object for identification based on a presence of an image of the object in a camera image provided by a camera of the apparatus.

Optionally, object is selected automatically for identification.

Optionally, the object is selected in response to the object being presence in a sequence of camera images that comprise the camera image within a duration exceeding a time threshold.

Optionally, the method further includes defining a virtual space.

Optionally, the act of defining the virtual space comprises defining a virtual wall for the virtual space.

Optionally, the virtual wall is offset from a real physical wall in the environment surrounding the user.

Optionally, the virtual wall is aligned with, or intersects, a real physical wall in the environment surrounding the user.

Optionally, the method further includes displaying, by the screen, a wall identifier at a location in the screen, such that when the user views the virtual wall, the wall identifier will be in a spatial relationship with respect to the virtual wall.

Optionally, the act of defining the virtual space comprises defining a plurality of virtual walls for the virtual space; and wherein the method further comprises displaying, by the screen, wall identifiers for the respective virtual walls.

Optionally, the act of defining the virtual space comprises defining a corner for the virtual space.

Optionally, the act of defining the virtual space comprises defining a wall edge for the virtual space.

Optionally, the method further includes obtaining a user input generated via a controller component, the user input indicating a selection of a feature in the environment for defining at least a part of the virtual space.

Optionally, the feature in the environment comprises a wall, a wall corner, an edge, or any combination of the foregoing.

Optionally, the user input indicates a cursor position in the screen.

Optionally, the user input indicates an orientation of the controller component, and wherein the selection of the feature in the environment is based on a direction of pointing by the controller component towards the feature in the environment.

Optionally, the method further includes selecting a feature in the environment for defining at least a part of the virtual space, wherein the act of selecting is performed based on a presence of an image of the feature in a camera image provided by a camera of the apparatus.

Optionally, the feature in the environment is selected automatically.

Optionally, the feature is selected in response to the feature being presence in a sequence of camera images that includes the camera image within a duration exceeding a time threshold.

Optionally, the method further includes displaying, by the screen, a pointer based on an orientation of a controller component, and wherein the method further comprises adjusting a configuration of the pointer displayed in the screen, and/or presenting an interaction graphic in association with the pointer.

Optionally, the act of adjusting the configuration of the pointer and/or the act of presenting the interaction graphic, is performed in response to an interaction between the pointer and a virtual object.

Optionally, the method further includes providing a virtual content for interaction by the user and an additional user.

Optionally, the method further includes connecting the user and the additional user to a same virtual space so that the user and the additional user can interact with the virtual content at the same virtual space.

Optionally, the virtual content is provided for interaction by the user and the additional user in different respective rooms.

Optionally, the virtual content is provided for interaction by the user and the additional user in a same room.

Optionally, the method further includes registering the user and the additional user to the environment so that the user and the additional user can interact with the virtual content while they are in the environment.

Optionally, the act of registering the user and the additional user to the environment comprises determining one or more anchor points that are associated with a location of the user and a location of the additional user.

A processor-readable non-transitory medium stores a set of instructions, an execution of which by a processing unit will cause a method to be performed, the processing unit being a part of an apparatus that is configured to provide a virtual or augmented reality experience, the method comprising: detecting, by a surface detector, a surface of an object in an environment surrounding a user of the apparatus; obtaining, by an object identifier, an orientation and/or an elevation of the surface of the object; identifying, by the object identifier, the object based on the orientation and/or the elevation of the surface of the object; and generating, by a graphic generator, an identifier for the identified object for display by a screen, wherein the screen is at least partially transparent for allowing the user of the apparatus to view the object in the environment surrounding the user.

An apparatus for providing an augmented reality experience, includes: a screen, wherein the screen is at least partially transparent for allowing a user of the apparatus to view an object in an environment surrounding the user; a space definer configured to obtain an input, and to define a virtual space based on the input, wherein the space definer is configured to obtain the input while the screen is being worn by the user; and a graphic generator configured to provide a virtual content for display by the screen, wherein the screen is configured to display the virtual content in the virtual space.

Optionally, the space definer is configured to define a virtual wall for the virtual space.

Optionally, the virtual wall is offset from a real physical wall in the environment surrounding the user.

Optionally, the virtual wall is aligned with, or intersects, a real physical wall in the environment surrounding the user.

Optionally, the screen is configured to display a wall identifier at a location in the screen, such that when the user views the virtual wall, the wall identifier will be in a spatial relationship with respect to the virtual wall.

Optionally, the space definer is configured to define a plurality of virtual walls for the virtual space; and wherein the screen is configured to display wall identifiers for the respective virtual walls.

Optionally, the space definer is configured to define a corner for the virtual space.

Optionally, the space definer is configured to define a wall edge for the virtual space.

Optionally, the space definer is configured to obtain the user input generated via a controller component, the user input indicating a selection of a feature in the environment for defining at least a part of the virtual space.

Optionally, the feature in the environment comprises a wall, a wall corner, an edge, or any combination of the foregoing.

Optionally, the user input indicates a cursor position in the screen.

Optionally, the user input indicates an orientation of the controller component, and wherein the selection of the feature in the environment is based on a direction of pointing by the controller component towards the feature in the environment.

Optionally, the apparatus further includes a camera, wherein the apparatus is configured to select a feature in the environment, for defining at least a part of the virtual space, based on a presence of an image of the feature in a camera image provided by the camera, wherein the camera image is the input obtained by the space definer.

Optionally, the apparatus is configured to select the feature in the environment automatically.

Optionally, the apparatus is configured to select the feature in response to the feature being presence in a sequence of camera images that includes the camera image within a duration exceeding a time threshold.

Optionally, the virtual content is also for interaction by an additional user.

Optionally, the apparatus is configured to connect the user and the additional user to the virtual space so that the user and the additional user can interact with the virtual content at the virtual space.

Optionally, the graphic generator is configured to provide the virtual content for interaction by the user and the additional user in different respective rooms.

Optionally, the graphic generator is configured to provide the virtual content for interaction by the user and the additional user in a same room.

Optionally, the apparatus is configured to register the user and the additional user to the environment so that the user and the additional user can interact with the virtual content while they are in the environment.

Optionally, the apparatus is configured to register the user and the additional user to the environment by determining one or more anchor points that are associated with a location of the user and a location of the additional user.

A method is performed by an apparatus that is configured to provide a virtual or augmented reality experience, the apparatus comprising a screen, the method comprising: obtaining, by a space definer, an input, wherein the space definer is configured to obtain the input while the screen is being worn by a user; defining a virtual space by the space definer based on the input; providing, by a graphic generator, a virtual content for display by a screen; and displaying the virtual content in the virtual space by the screen, wherein the screen is at least partially transparent for allowing the user of the apparatus to view an object in an environment surrounding the user.

Optionally, the act of defining the virtual space comprises defining a virtual wall for the virtual space.

Optionally, the virtual wall is offset from a real physical wall in the environment surrounding the user.

Optionally, the virtual wall is aligned with, or intersects, a real physical wall in the environment surrounding the user.

Optionally, the method further includes displaying, by the screen, a wall identifier at a location in the screen, such that when the user views the virtual wall, the wall identifier will be in a spatial relationship with respect to the virtual wall.

Optionally, the act of defining the virtual space comprises defining a plurality of virtual walls for the virtual space; and wherein the method further comprises displaying, by the screen, wall identifiers for the respective virtual walls.

Optionally, the act of defining the virtual space comprises defining a corner for the virtual space.

Optionally, the act of defining the virtual space comprises defining a wall edge for the virtual space.

Optionally, the method further includes obtaining the user input generated via a controller component, the user input indicating a selection of a feature in the environment for defining at least a part of the virtual space.

Optionally, the feature in the environment comprises a wall, a wall corner, an edge, or any combination of the foregoing.

Optionally, the user input indicates a cursor position in the screen.

Optionally, the user input indicates an orientation of the controller component, and wherein the selection of the feature in the environment is based on a direction of pointing by the controller component towards the feature in the environment.

Optionally, the method further includes selecting a feature in the environment, for defining at least a part of the virtual space, based on a presence of an image of the feature in a camera image provided by a camera, wherein the camera image is the input obtained by the space definer.

Optionally, the feature in the environment is selected automatically.

Optionally, the feature in the environment is selected in response to the feature being presence in a sequence of camera images that includes the camera image within a duration exceeding a time threshold.

Optionally, the virtual content is also for interaction by an additional user.

Optionally, the method further includes connecting the user and the additional user to the virtual space so that the user and the additional user can interact with the virtual content at the virtual space.

Optionally, the virtual content is provided for interaction by the user and the additional user in different respective rooms.

Optionally, the virtual content is provided for interaction by the user and the additional user in a same room.

Optionally, the method further includes registering the user and the additional user to the environment so that the user and the additional user can interact with the virtual content while they are in the environment.

Optionally, the act of registering the user and the additional user to the environment comprises determining one or more anchor points that are associated with a location of the user and a location of the additional user.

A processor-readable non-transitory medium stores a set of instructions, an execution of which by a processing unit will cause a method to be performed, the processing unit being a part of an apparatus that is configured to provide a virtual or augmented reality experience, the apparatus comprising a screen, the method comprising: obtaining, by a space definer, an input, wherein the space definer is configured to obtain the input while the screen is being worn by a user; defining a virtual space by the space definer based on the input; providing, by a graphic generator, a virtual content for display by a screen; and displaying the virtual content in the virtual space by the screen, wherein the screen is at least partially transparent for allowing the user of the apparatus to view an object in an environment surrounding the user.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 14A-141 illustrate examples of techniques for defining a virtual space.

DETAILED DESCRIPTION

Figure 1A:
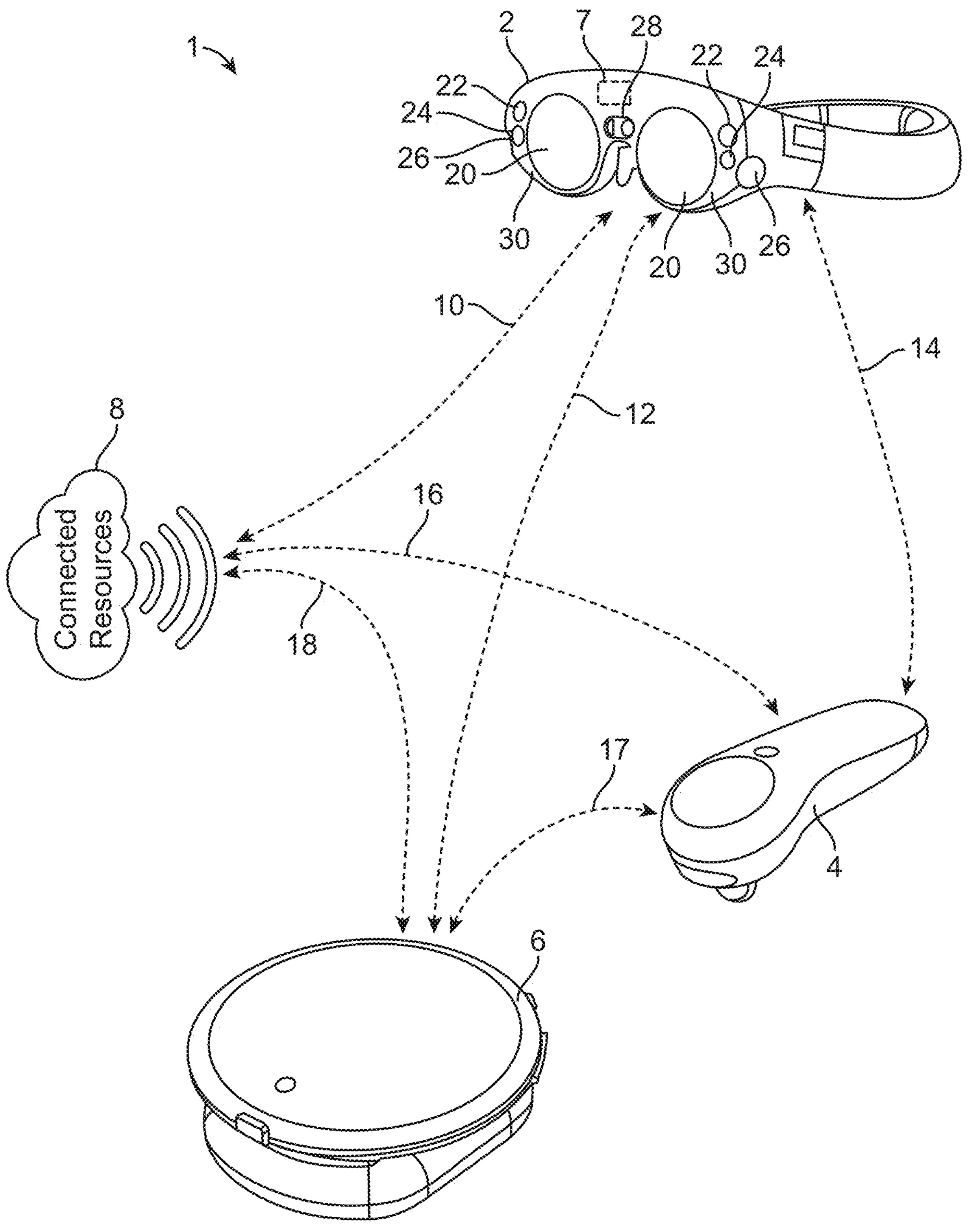
FIG. 1A illustrates an image display system having an image display device in accordance with some embodiments.

Various embodiments of the disclosure are directed to methods, apparatuses, and articles of manufacture for providing input for head-worn video image devices. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

Referring to FIG. 1A, an augmented reality system 1 is illustrated featuring a head-worn viewing component (image display device) 2, a hand-held controller component 4, and an interconnected auxiliary computing or controller component 6 which may be configured to be worn as a belt pack or the like on the user. Each of these components may be operatively coupled (10, 12, 14, 16, 17, 18) to each other and to other connected resources 8 such as cloud computing or cloud storage resources via wired or wireless communication configurations, such as those specified by IEEE 802.11, Bluetooth (RTM), and other connectivity standards and configurations. As described, for example, in U.S. patent application Ser. Nos. 14/555,585, 14/690,401, 14/331,218, 15/481,255, 62/627,155, 62/518,539, 16/229,532, 16/155, 564, 15/413,284, 16/020,541, 62,702,322, 62/206,765, 15,597,694, 16/221,065, 15/968,673, 62/682,788, and 62/899,678 each of which is incorporated by reference herein in its entirety, various aspects of such components are described, such as various embodiments of the two depicted optical elements 20 through which the user may see the world around them along with visual components which may be produced by the associated system components, for an augmented reality experience. As illustrated in FIG. 1A, such a system 1 may also comprise various sensors configured to provide information pertaining to the environment around the user, including but not limited to various camera type sensors (such as monochrome, color/RGB, and/or thermal imaging components) (22, 24, 26), depth camera sensors 28, and/or sound sensors 30 such as microphones. There is a need for compact and persistently connected wearable computing systems and assemblies such as those described herein, which may be utilized to provide a user with the perception of rich augmented reality experiences.

The system 1 also includes an apparatus 7 for providing input for the image display device 2. The apparatus 7 will be described in further detail below. The image display device 2 may be a VR device, an AR device, a MR device, or any of other types of display devices. As shown in the figure, the image display device 2 includes a frame structure worn by an end user, a display subsystem carried by the frame structure, such that the display subsystem is positioned in front of the eyes of the end user, and a speaker carried by the frame structure, such that the speaker is positioned adjacent the ear canal of the end user (optionally, another speaker (not shown) is positioned adjacent the other ear canal of the end user to provide for stereo/shapeable sound control). The display subsystem is designed to present the eyes of the end user with light patterns that can be comfortably perceived as augmentations to physical reality, with high-levels of image quality and three-dimensional perception, as well as being capable of presenting two-dimensional content. The display subsystem presents a sequence of frames at high frequency that provides the perception of a single coherent scene.

In the illustrated embodiments, the display subsystem employs “optical see-through” display through which the user can directly view light from real objects via transparent (or semi-transparent) elements. The transparent element, often referred to as a “combiner,” superimposes light from the display over the user’s view of the real world. To this end, the display subsystem comprises a partially transparent display or a complete transparent display. The display is positioned in the end user’s field of view between the eyes of the end user and an ambient environment, such that direct light from the ambient environment is transmitted through the display to the eyes of the end user.

In the illustrated embodiments, an image projection assembly provides light to the partially transparent display, thereby combining with the direct light from the ambient environment, and being transmitted from the display to the eyes of the user. The projection subsystem may be an optical fiber scan-based projection device, and the display may be a waveguide-based display into which the scanned light from the projection subsystem is injected to produce, e.g., images at a single optical viewing distance closer than infinity (e.g., arm’s length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem may be monocular or binocular.

The image display device 2 may also include one or more sensors mounted to the frame structure for detecting the position and movement of the head of the end user and/or the eye position and inter-ocular distance of the end user. Such sensors may include image capture devices (such as cameras), microphones, inertial measurement units, accelerometers, compasses, GPS units, radio devices, and/or gyros), or any combination of the foregoing. Many of these sensors operate on the assumption that the frame on which they are affixed is in turn substantially fixed to the user’s head, eyes, and ears.

The image display device 2 may also include a user orientation detection module. The user orientation module detects the instantaneous position of the head of the end user (e.g., via sensors coupled to the frame) and may predict the position of the head of the end user based on position data received from the sensors. Detecting the instantaneous position of the head of the end user facilitates determination of the specific actual object that the end user is looking at, thereby providing an indication of the specific virtual object to be generated in relation to that actual object and further providing an indication of the position in which the virtual object is to be displayed. The user orientation module may also track the eyes of the end user based on the tracking data received from the sensors.

The image display device 2 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUS).

The control subsystem of the image display device 2 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem.

The apparatus 7 represents the various processing components for the system 1. In the figure, the apparatus 7 is illustrated as a part of the image display device 2. In other embodiments, the apparatus 7 may be implemented in the handheld controller component 4, and/or in the controller component 6. In further embodiments, the various processing components of the apparatus 7 may be implemented in a distributed subsystem. For example, the processing components of the apparatus 7 may be located in two or more of: the image display device 2, in the handheld controller component 4, in the controller component 6, or in another device (that is in communication with the image display device 2, the handheld controller component 4, and/or the controller component 6).

The couplings 10, 12, 14, 16, 17, 18 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. Thus, the particular choice of wired or wireless communications should not be considered limiting.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 1 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 1B:
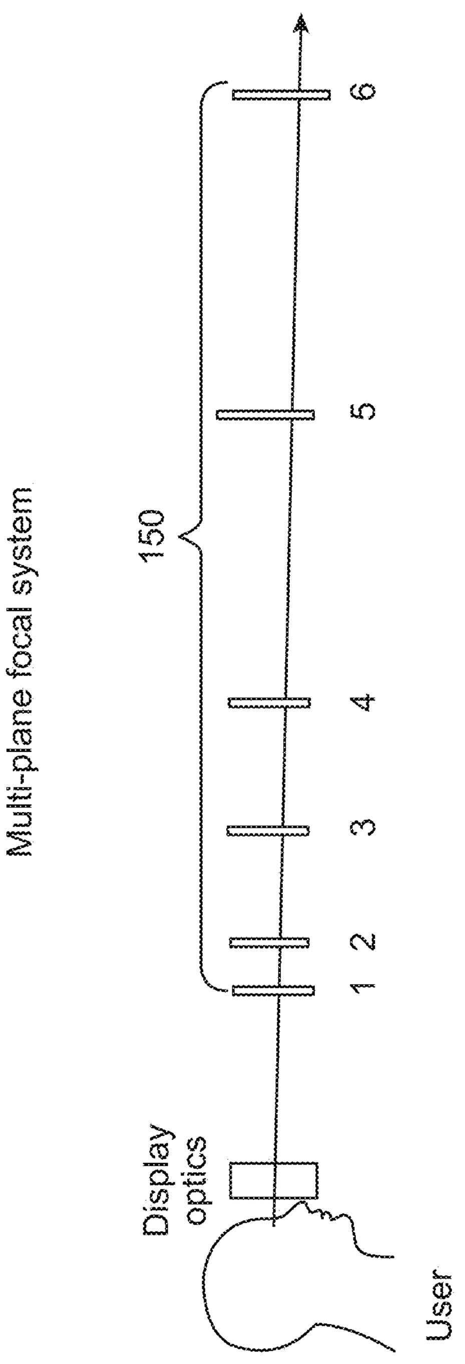
FIG. 1B illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 1B, it should be appreciated that multiple-plane focus systems may display frames at fixed depth planes 150 (e.g., the six depth planes 150 shown in FIG. 1B). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 1B. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 1 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 1B) may be utilized. Then an image of a closer tree branch may be injected at time 2 and an LOE configured to create an image appearing to originate from a depth plane 10 meters away (e.g., depth plane 5 from FIG. 1B) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 1 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

In some cases, in order to localize a user of a head-worn image display device with respect to the user's environment, a localization map of the environment is obtained. In some embodiments, the localization map may be stored in a non-transitory medium that is a part of the system 1. In other embodiments, the localization map may be received wirelessly from a database. After the localization map is obtained, real-time input image from the camera system of the image display device is then matched against the localization map to localize the user. For example corner features of the input image may be detected from the input image, and match against corner features of the localization map. In some embodiments, in order to obtain a set of corners as features from an image for use in localization, the image may first need to go through corner detection to obtain an initial set of detected corners. The initial set of detected corners is then further processed, e.g., go through non-maxima suppression, spatial binning, etc., in order to obtain a final set of detected corners for localization purposes. In some cases, filtering may be performed to identify a subset of detected corners in the initial set to obtain the final set of corners.

Also, in some embodiments, a localization map of the environment may be created by the user directing the image display device 2 at different directions (e.g., by turning his/her head while wearing the image display device 2). As the image display device 2 is pointed to different spaces in the environment, the sensor(s) on the image display device 2 senses characteristics of the environment, which characteristics may then be used by the system 1 to create a localization map. In one implementation, the sensor(s) may include one or more cameras and/or one or more depth sensors. The camera(s) provide camera images, which are processed by the apparatus 7 to identify different objects in the environment. Additionally or alternatively, the depth sensor(s) provide depth information, which are processed by the apparatus to determine different surfaces of objects in the environment.

In various embodiments, a user may be wearing an augmented reality system such as that depicted in FIG. 1A, which may also be termed a "spatial computing" system in relation to such system's interaction with the three-dimensional world around the user when operated. Such a system may comprise, for example, a head wearable display component 2, and may feature environmental sensing capabilities as described above and in the aforementioned incorporated by reference materials, such as cameras of various types which may be configured to map the environment around the user, or to create a "mesh" of such environment, comprising various points representative of the geometry of various objects within the environment around the user, such as walls, floors, chairs, and the like. The spatial computing system may be configured to map or mesh the environment around the user, and to run or operate software, such as that available from Magic Leap, Inc., of Plantation, Florida, which may be configured to utilize the map or mesh of the room to assist the user in placing, manipulating, visualizing, creating, and modifying various objects and elements in the three-dimensional space around the user. Referring back to FIG. 1A, the system may be operatively coupled to additional resources, such as other computing systems, by cloud or other connectivity configurations. One of the challenges in spatial computing relates to the utilization of data captured by various operatively coupled sensors (such as elements 22, 24, 26, 28 of the system of FIG. 1A) in making determinations useful and/or critical to the user, such as in computer vision and/or object recognition challenges that may, for example, relate to the three-dimensional world around a user.

Figure 2A:
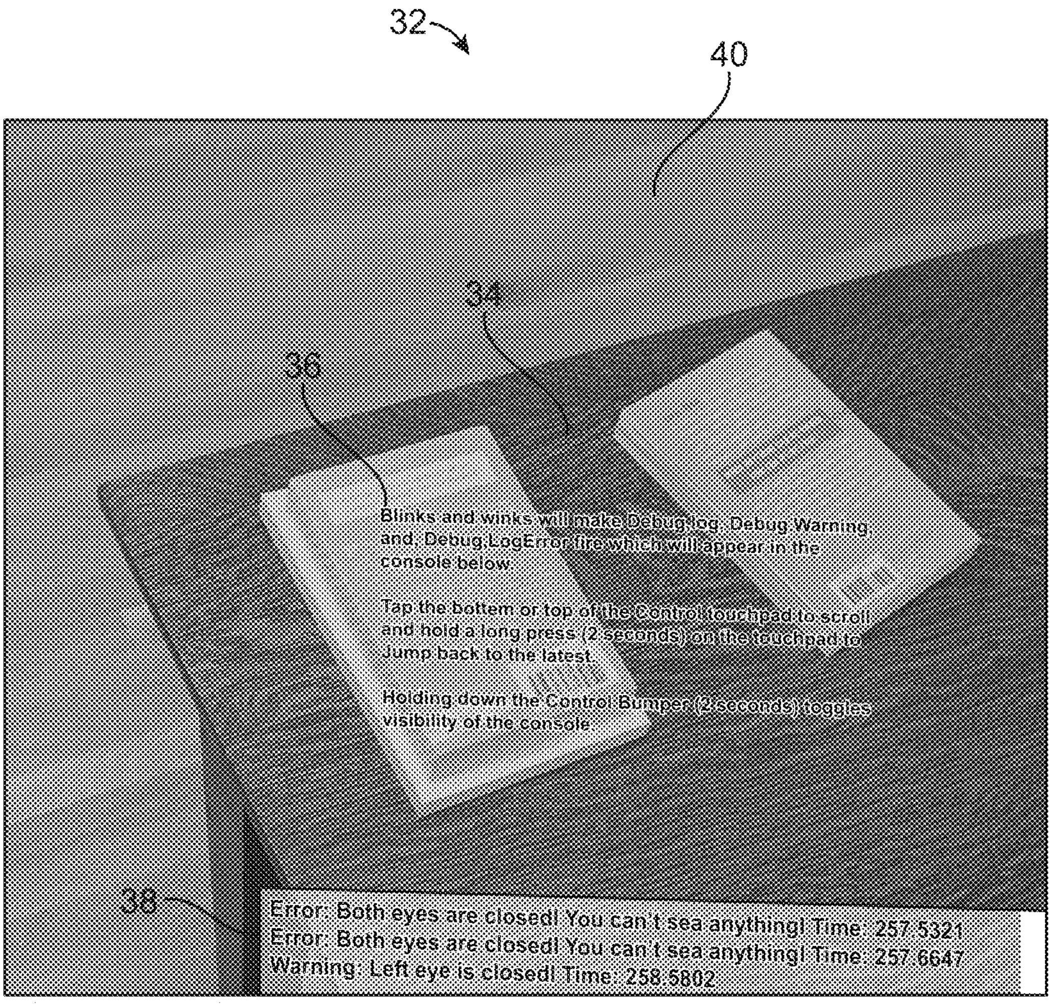
FIGS. 2A-2B illustrate examples of information displayed by an image display device.
Figure 2B:
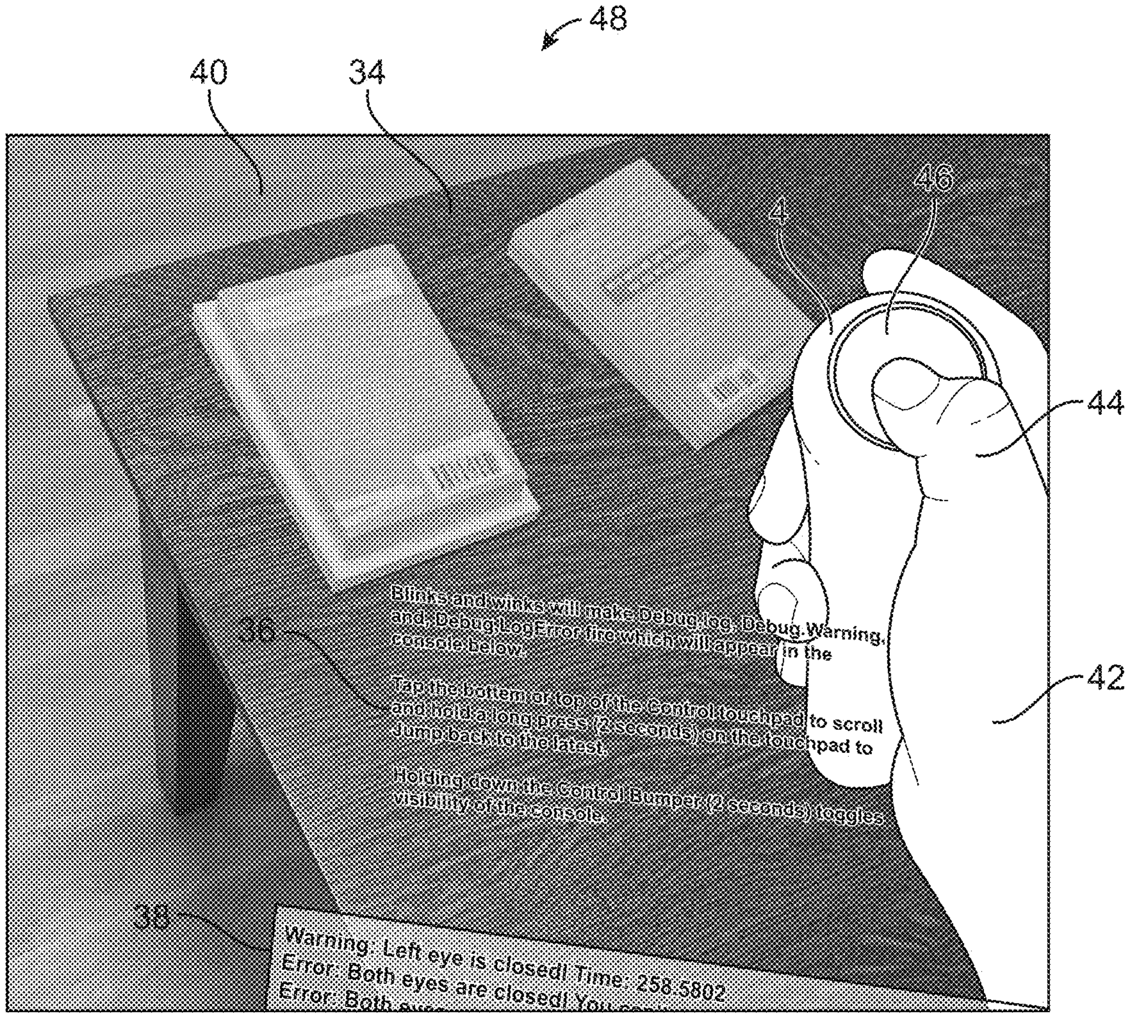
Figure 3:
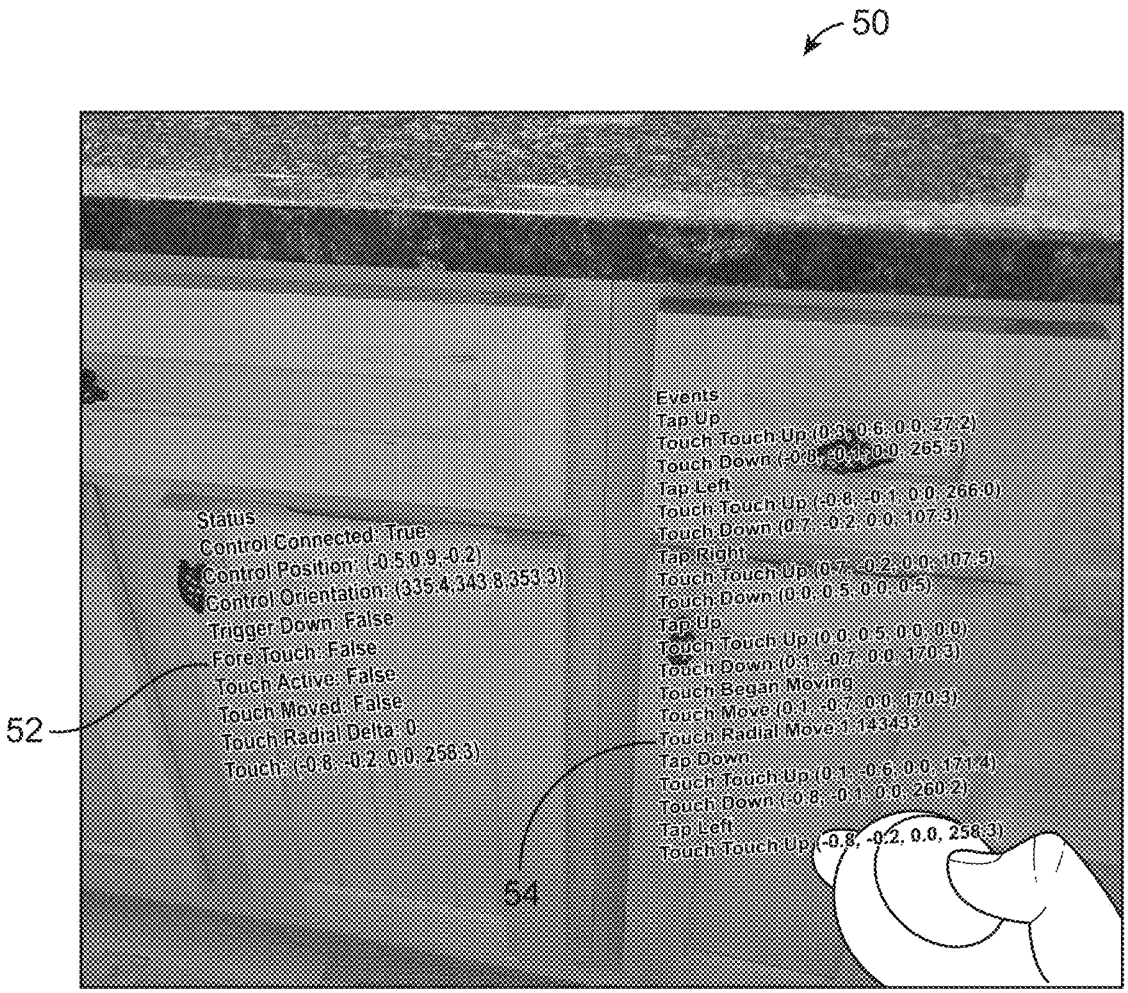
FIG. 3 illustrates another example of information displayed by an image display device.

Referring to FIGS. 2A-2B, as described in the various aforementioned incorporated references, a user wearing and operating a system such as that illustrated in FIG. 1A generally may be presented with not only a view of the actual environment around the user, such as a floor 40 or a desk 34, but also certain so-called virtual elements to augment the experience in a manner wherein they also may be presented for viewing and interpretation, such as textual elements, graphical elements, artistic imagery, and the like. FIG. 2A illustrates a user's view 32 of a configuration wherein certain textual information 36, 38 pertaining to runtime processes may be presented to the user to assist, for example, in debugging processes. Referring to FIG. 2B, the a hand of a user 42 shows that the user may operate a hand-held controller component 4, such as by various button presses, swipes across a touch interface (such as by a thumb 44 as shown across the touch interface 46), or other device interactions to interact with the displayed information 36, 38, to, for example, step through processes sequentially, observe errors or impacts of various inputs, move to most recent activities, toggle visibility options, and the like. The system may be configured to generally keep the displayed information 36, 38 relatively low in the user's field of view to be somewhat out of the way. Referring to FIG. 3, in another embodiment various status 52 and event 54 information may be presented to the user for similar viewability, as shown in the user's view 50 of FIG. 3.

Figure 4A:
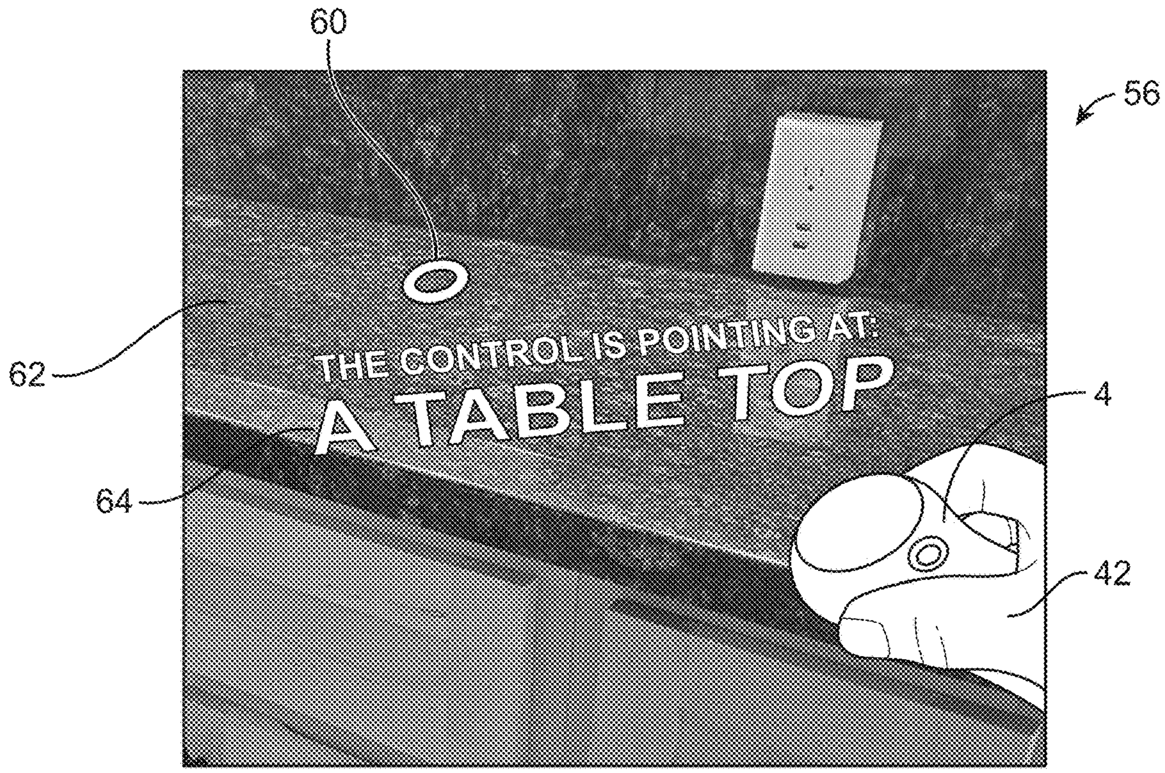
FIGS. 4A-4F illustrate examples of object identifications.
Figure 4B:
Figure 4C:
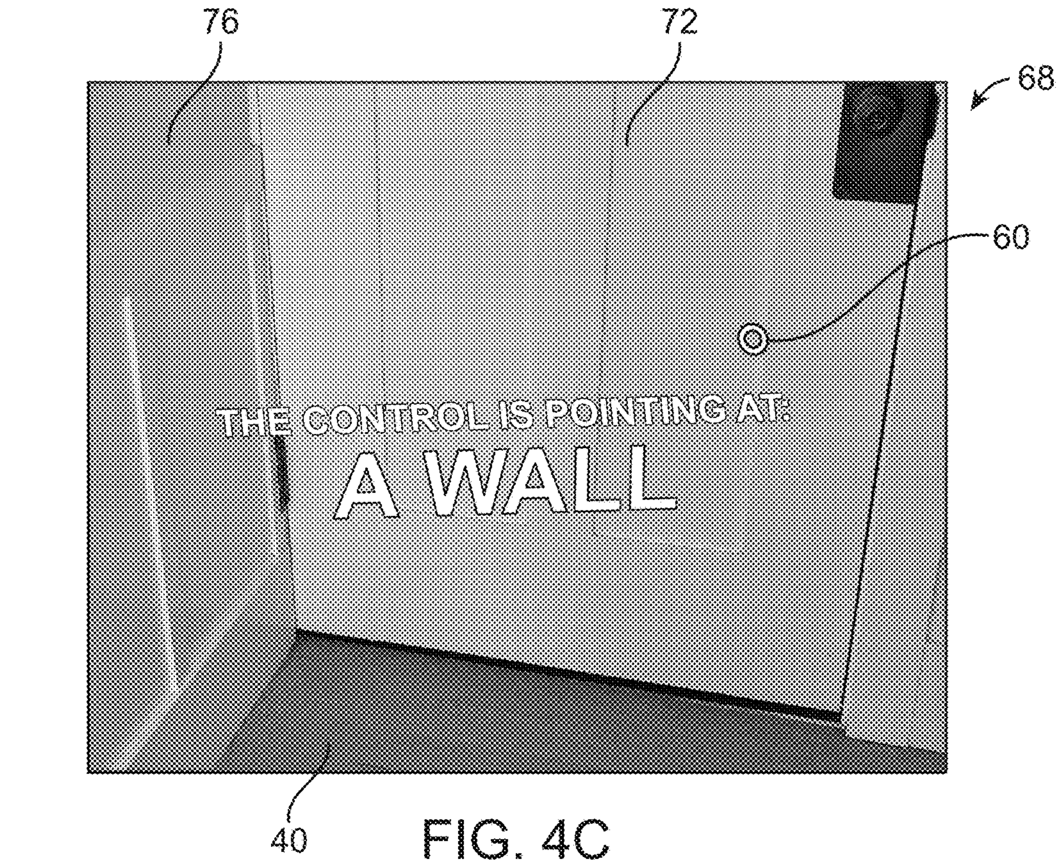
Figure 4D:
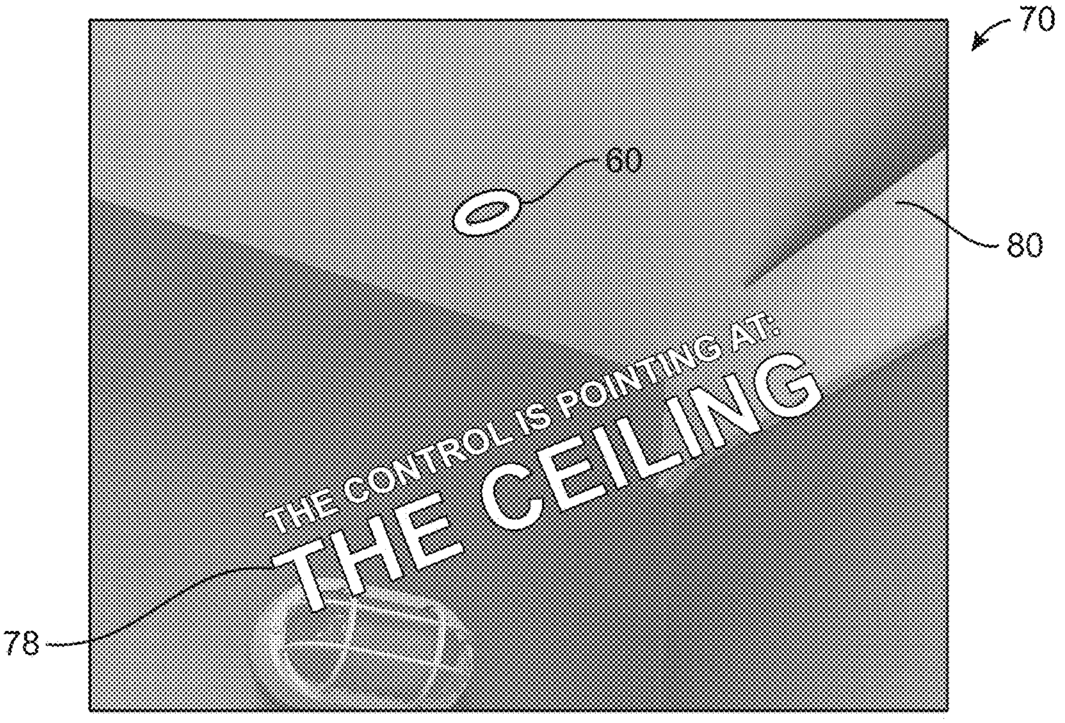
Figure 4E:
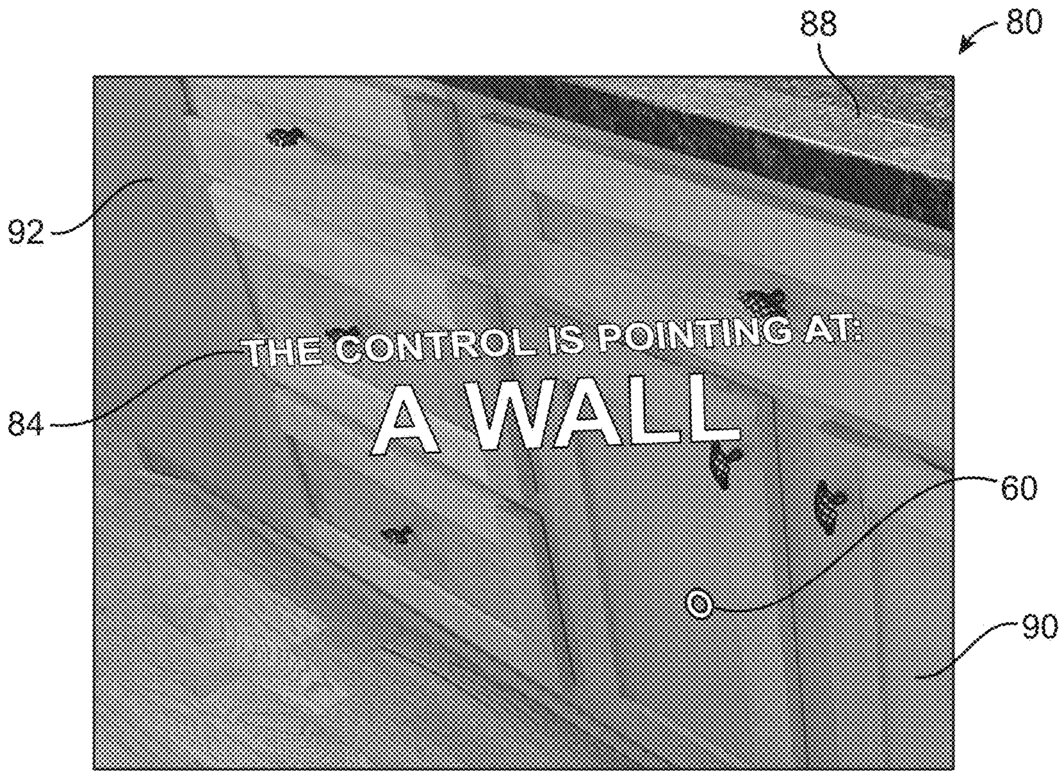
Figure 4F:
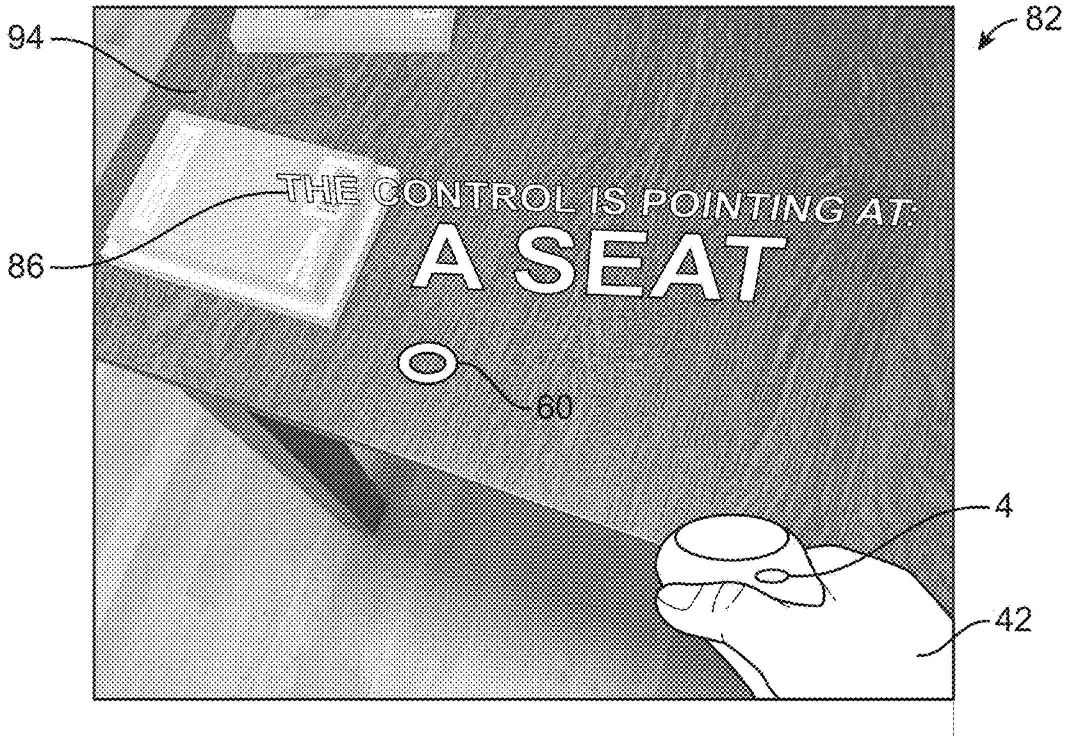
Figure 5A:
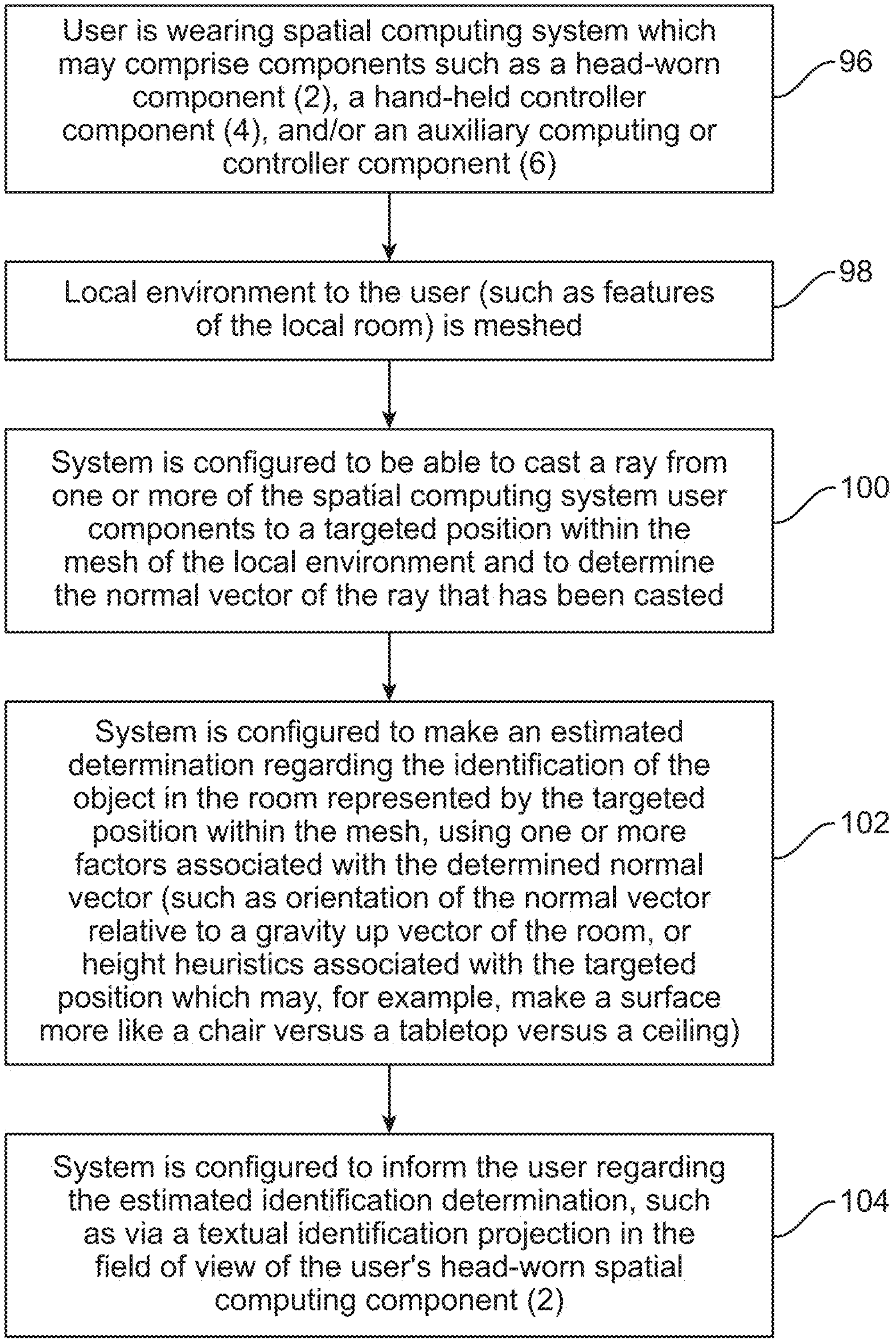
FIG. 5A illustrates a method in accordance with some embodiments.

Referring ahead to FIG. 5A, in one embodiment a user may be wearing a system such as that illustrated in FIG. 1 (item 96) and may be in a local environment, such as an office or other room, wherein the system has created or uploaded a mesh of the features of such room, such as a triangular mesh of the walls of the room, a desk near the user, a floor, a ceiling, and a cabinet structure against one of the walls (item 98). The system may be configured to cast a ray, such as by using a ray casting function within a development environments or game engines such as Unity (RTM) or Unreal Engine (RTM), from one or more of the components of the spatial computing system, toward a targeted position within the mesh of the local environment of the user, and to determine a normal vector of the ray that has been casted and aimed (item 100). For example, a user may operate a hand-held controller device 4 to aim a virtual pointer at a portion of the wall around him, or at the surface of his desk, or the floor or ceiling. The system may be configured to make an estimated determination regarding the identification of the object in the room represented by the targeted position within the mesh by using one or more factors associated with the determined normal vector (Item 102). For example, the system may be configured to also determine or acquire a "gravity-up" vector based upon the mesh information pertaining to the orientation and positioning of the walls of the room; the system may be configured to compare the orientation of the determined normal vector pertaining to the targeted position to the orientation of the gravity-up vector, and/or utilize height and/or geometry heuristics, to make an educated guess that the user is pointing at a tabletop, a seating surface, a floor, or a ceiling, for example. In other words, the system may be configured to utilize information such as: ceilings and floors often are in parallel planes with the ceiling about 8-10 feet above the floor, and are orthogonal to walls; floors are gravity down relative to ceilings; seating surfaces often are at about 18-24"; tabletops often are at about 36-40". Referring back to FIG. 5A, the system may be configured to inform the user regarding the estimated identification determination, such as via a textual identification element in the field of view of the user's head-worn spatial computing system (item 104). Thus referring back to FIGS. 4A-4F, various user views 56, 58, 68, 70, 80, 82 are illustrated. As shown in FIG. 4A, the user has aimed a virtual cursor 60 at the countertop 62 of a cabinet using his hand 42 and a hand controller 4, and based upon the mesh of the room around the user, the system is identifying the countertop as a "table top" and presenting such estimation via text presentation virtual element 64 to the user.

Referring to FIG. 4B, the user has aimed a virtual cursor 60 at the floor 40 of the room adjacent to a cabinet door 66, such as by using his hand and a hand controller (or alternatively, for example, could be a head-wearable component based pointing configuration such as eye gaze detection and/or an aiming reticle), and based upon the mesh of the room around the user, the system is identifying the floor as a "floor" and presenting such estimation via text presentation virtual element 74 to the user.

Referring to FIG. 4C, the user has aimed a virtual cursor 60 at a door (72; adjacent to a wall 76 and floor 40), such as by using his hand and a hand controller (or alternatively, for example, could be a head-wearable component based pointing configuration such as eye gaze detection and/or an aiming reticle), and based upon the mesh of the room around the user, the system is identifying the door as a "wall" and presenting such estimation via text presentation virtual element 76 to the user.

Referring to FIG. 4D, the user has aimed a virtual cursor 60 at a ceiling 80, such as by using his hand and a hand controller (or alternatively, for example, could be a head-wearable component based pointing configuration such as eye gaze detection and/or an aiming reticle), and based upon the mesh of the room around the user, the system is identifying the ceiling as a "ceiling" and presenting such estimation via text presentation virtual element 78 to the user.

As noted above and in FIG. 5A, the system may be configured to make an object identification based upon an estimation; the identification may not always be correct. For example, referring to user views 80, 82 of FIGS. 4E-4F, respectively, the system has mis-identified an object. In FIG. 4E, with a cursor 60 aimed at one in a series of cabinet doors 90, 92, with a cabinet countertop, the system is returning and presenting to the user that the cabinet door is a "wall"; depending upon the specific configuration, this may be a result of the cabinet door being orthogonal to or parallel to another identified wall, orthogonal to a ceiling and/or floor, etc. Similarly in FIG. 4F, the system has returned and presented 86 an estimation of "seat" when the user is actually pointing the cursor 60 at a table 94 that happens to be at approximately typical seating surface height.

Figure 5B:
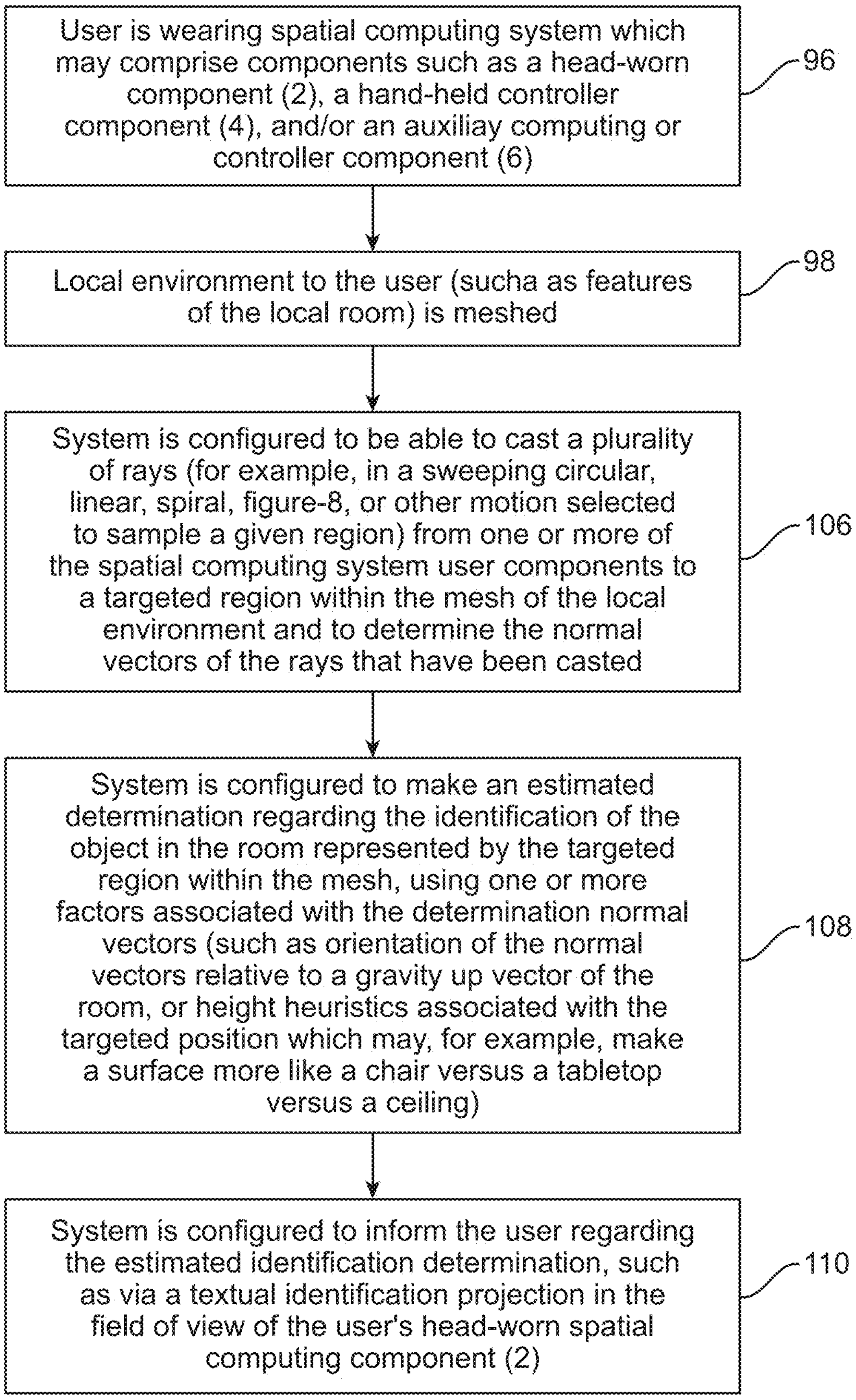
FIG. 5B illustrates another method in accordance with some embodiments.

Referring ahead to FIG. 5B, an embodiment is illustrated wherein in addition to a system (item 96) being associated with a mesh (item 98) of the local environment, a plurality of rays 106 may be utilized to gain more information for the estimated determination 108, such as by sweeping, such as by automation or manually, with ray casting around the region adjacent the aimed cursor, so that further information about the region may be gained (such as whether the region seems to be a planar surface or not; the sweeping to gain additional information from the ray casting may be conducted in a predetermined pattern, such as a circular, linear, spiral, or figure-8 pattern). With the enhanced information, the estimation may be returned to the user 110.

Figure 6A:
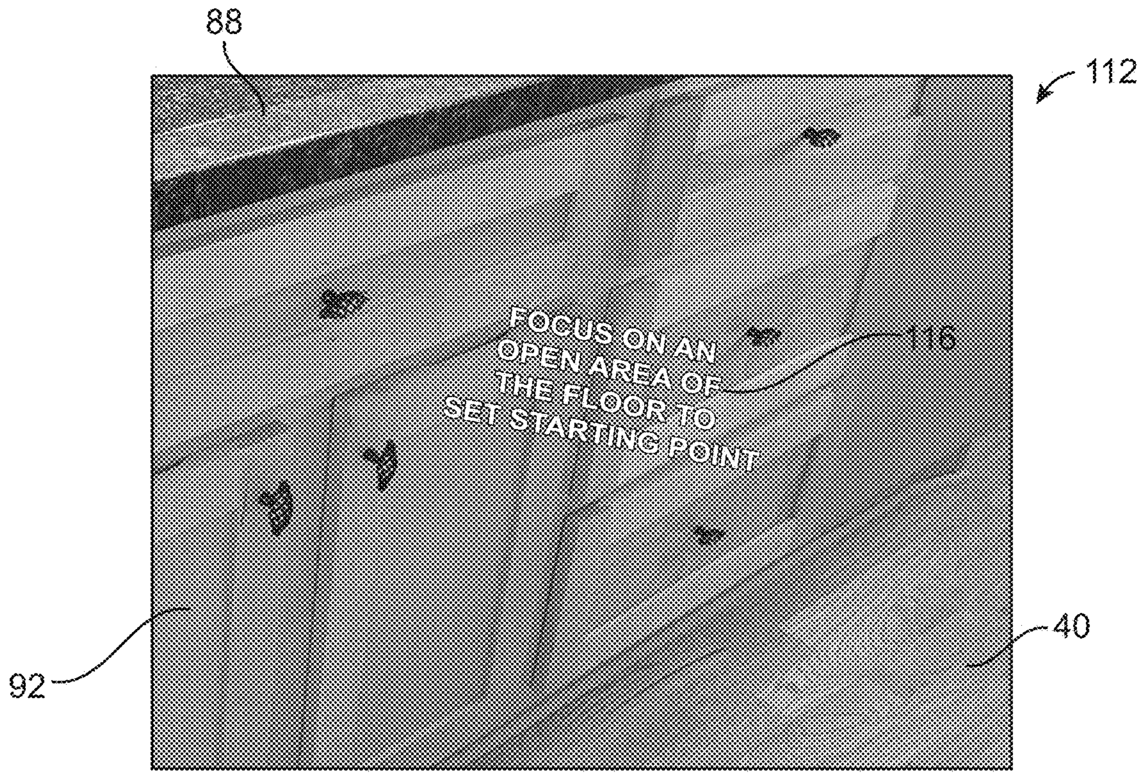
FIGS. 6A-6C illustrate an example of a technique for inserting a virtual item.
Figure 6B:
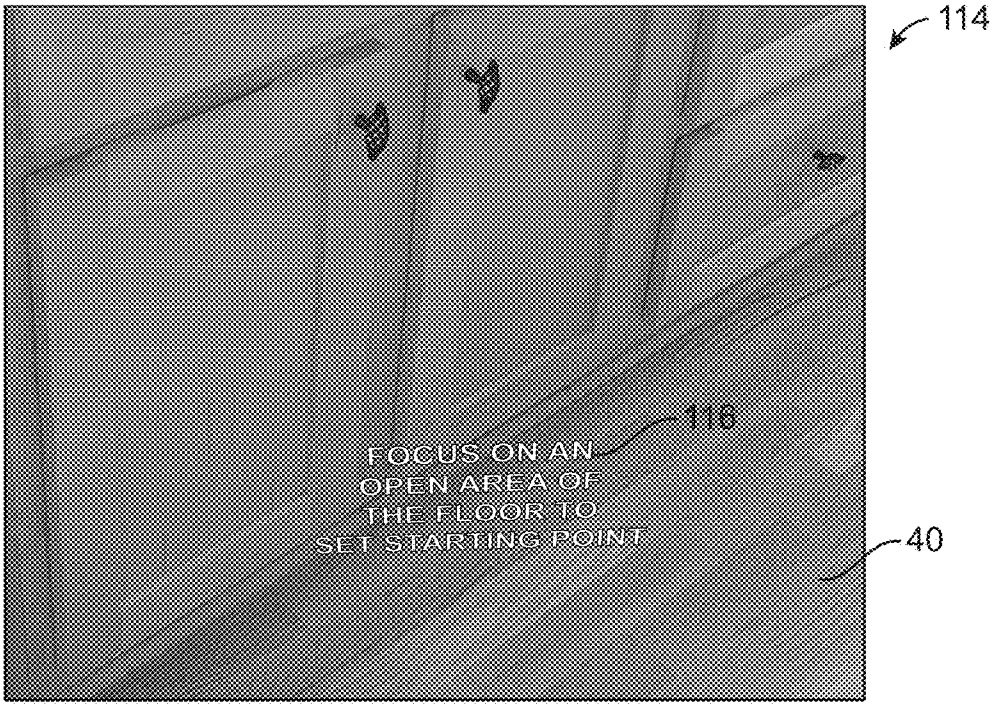
Figure 6C:
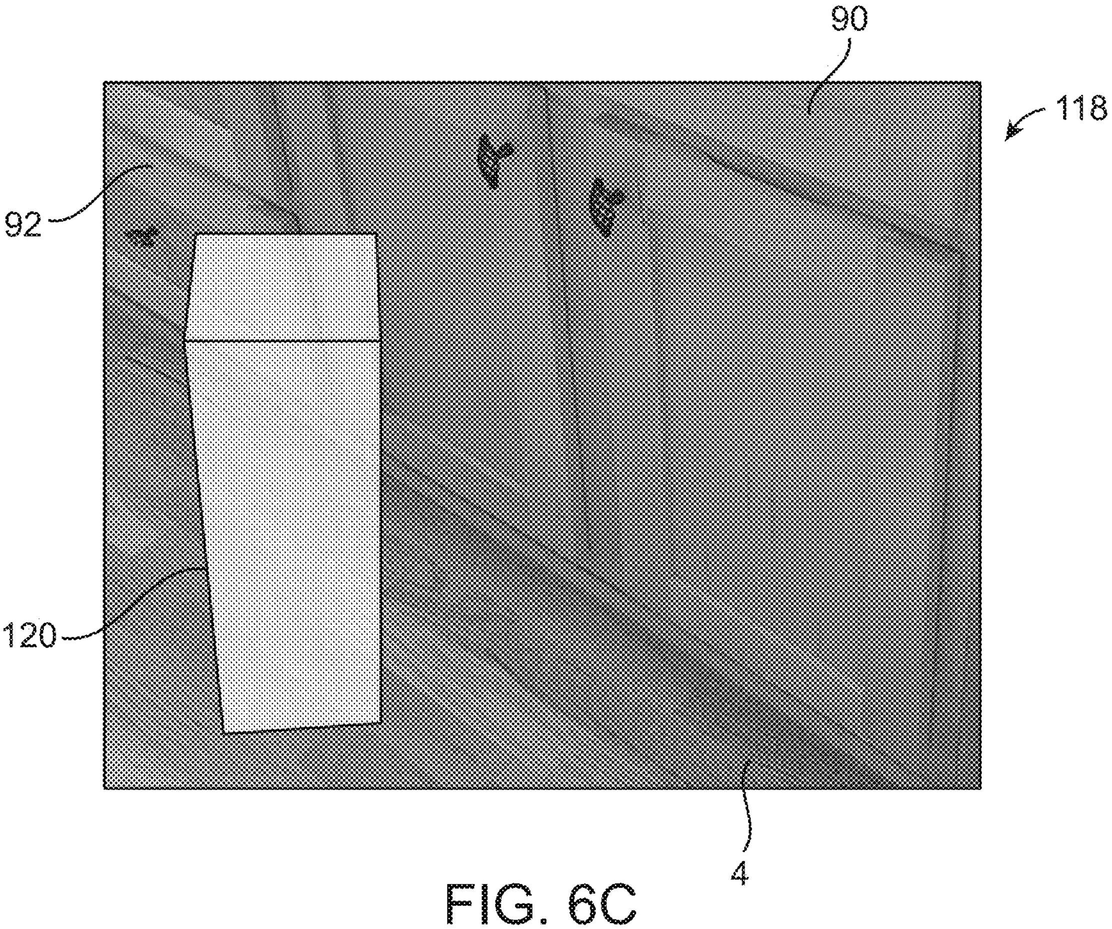
Figure 7:
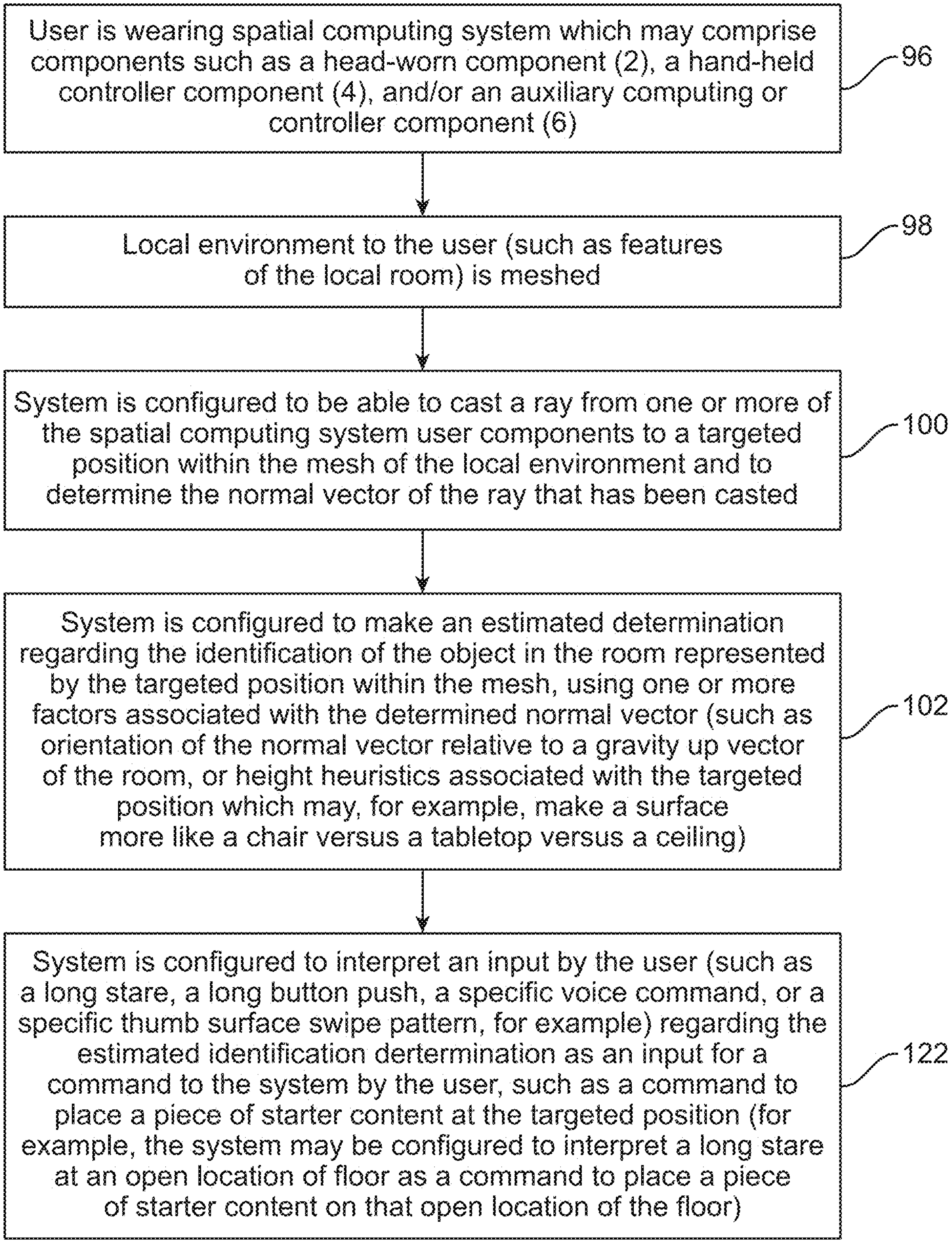
FIG. 7 illustrates a method in accordance with some embodiments.

Referring ahead to FIG. 7, in various embodiments, a configuration similar to that described in reference to FIGS. 5A-5B may be utilized to efficiently issue and receive commands or inputs. For example, referring to FIG. 7, an embodiment is illustrated wherein in addition to a system (item 96) being associated with a mesh (item 98) of the local environment, and being configured to cast one or more rays (item 102) to assist in estimating identification of various objects, the system may be configured to interpret an input by the user (such as a long stare, a long button push, a specific voice command, or a specific thumb surface swipe pattern, for example) regarding the estimated identification determination as an input for a command to the system by the user, such as a command to place a piece of starter content at the targeted position (for example, the system may be configured to interpret a long stare at an open location of floor as a command to place a piece of starter content on that open location of the floor). Referring to FIGS. 6A-6C, such a configuration is further illustrated in user views 112, 114, 118. Referring to FIG. 6A, a user is viewing a floor 40, cabinet 88, 92 area with a system configured to interpret a long stare at a portion of a floor as a desire to select such portion of said floor to placing a piece of starter content, as noted in the textual object 116 shown to the user. Referring to FIG. 6B, the user does gaze down to the floor 40, and after staring for a time longer than a predetermined threshold time period, such stare is interpreted as a command to place a starter content object 120, as shown in FIG. 6C.

Figure 8A:
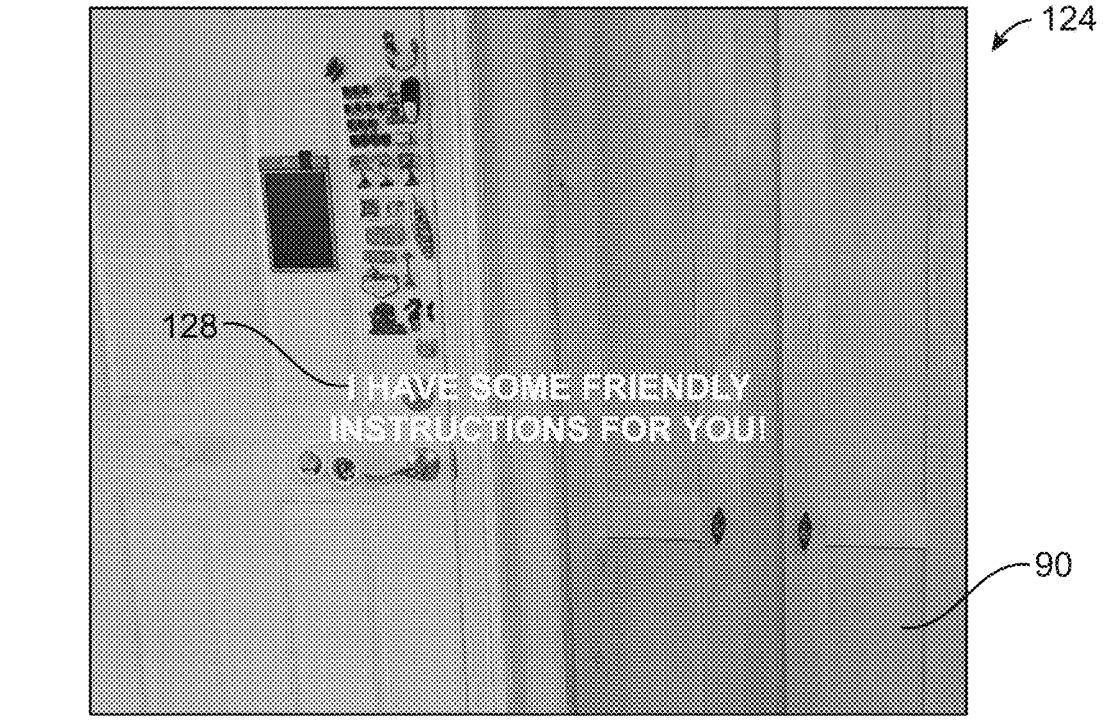
FIGS. 8A-8E illustrate examples of techniques of presenting information in an augmented reality environment.
Figure 8B:
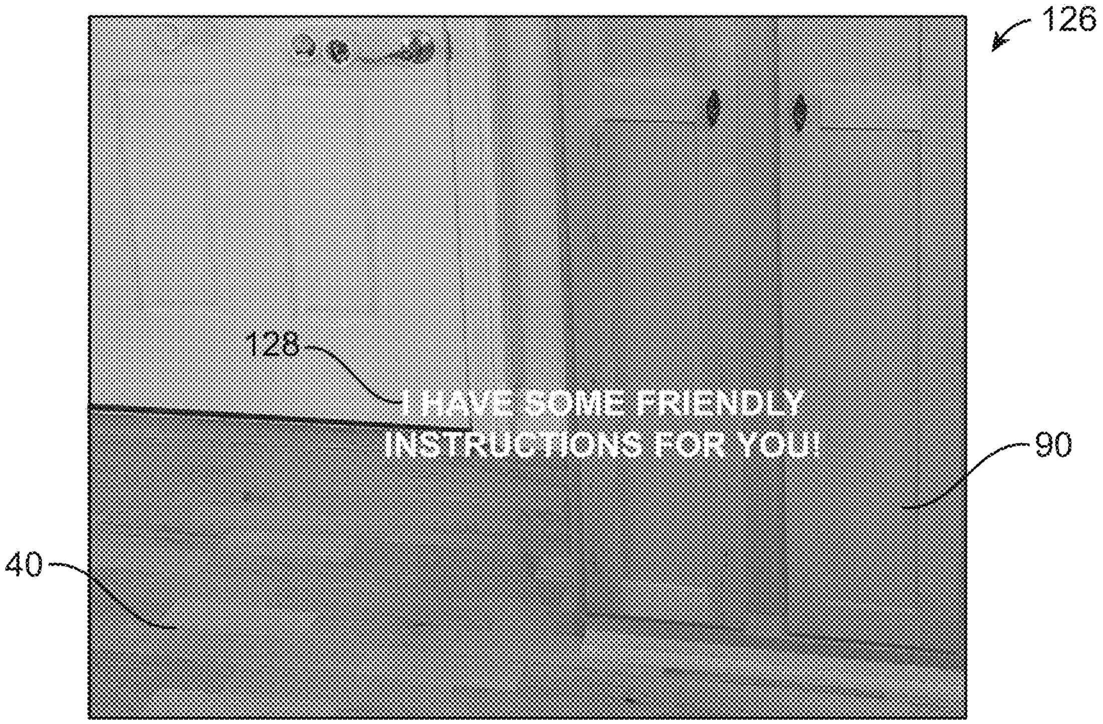
Figure 8C:
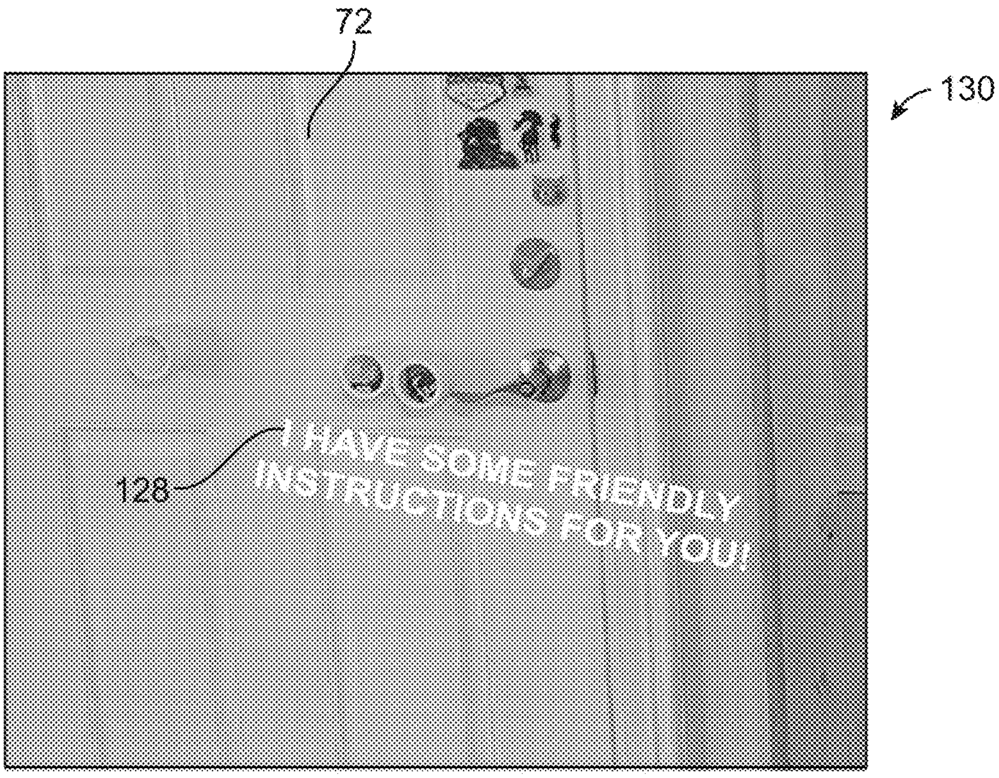
Figure 8D:
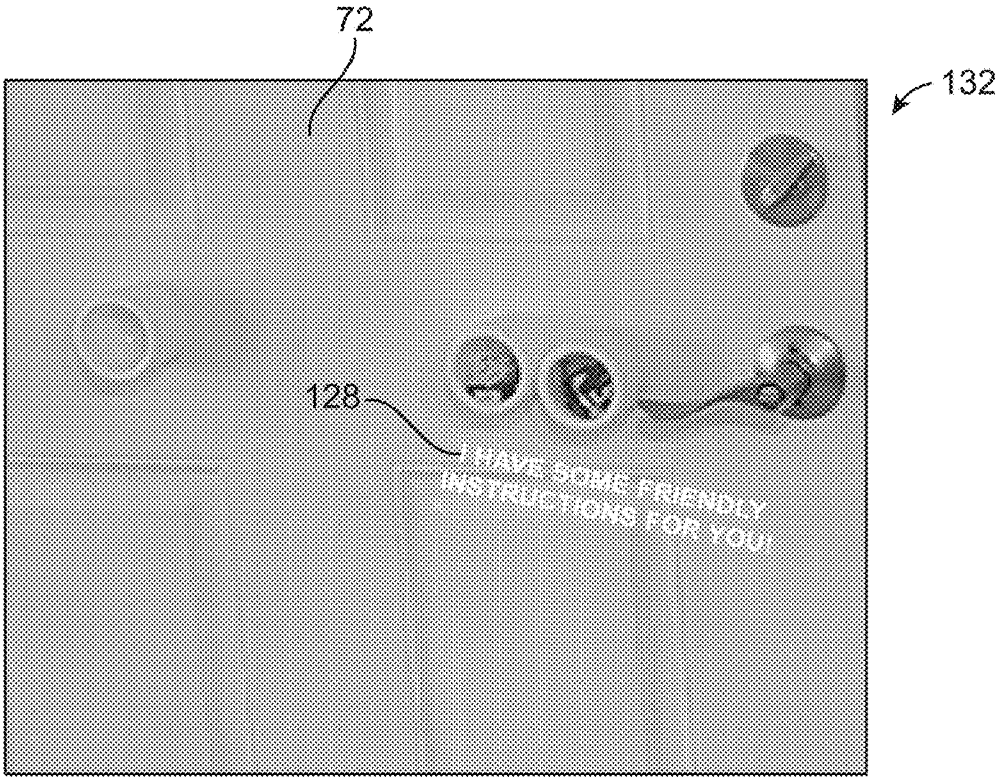

Referring to FIGS. 8A-8E, in another embodiment, a user or designer may desire to have a certain virtual object placed at a given location within the user's field of view. For example, it may be desirable to a user to have a small digital clock textual readout object presented in the upper left of his or her field of view, generally out of the way of the remainder of the field of view. In another embodiment it may be desirable for a user to have some valuable textual information, such as pertinent operating instructions, presented in the center of the user's field of view; such a configuration is shown in FIGS. 8A-8B. In FIG. 8A, the field of view of the user includes cabinetry 90 and a door; the textual instruction virtual object 128 is presented in the center of the user's field of view. Referring to FIG. 8B, as the user changes his head orientation down toward the floor 40, the textual instruction virtual object 128 may remain presented in the center of the user's field of view. In other words, the system may be configured to retain the virtual object generally in the center of the user's field of view. As noted above, the content may be placed anywhere, such as upper left, lower right, center, etc. Further, in other embodiments, the system may be configured to maintain the content's position relative to the objects around the user in the room until a certain predetermined delta in position or orientation of the head is achieved, after which the object may be moved again to the center or other desired catchup position. In another embodiment the system may be configured to "soft lock" to certain aspects of the room. For example, the user may decide to "soft lock" a virtual clock right above his doorway, but when the user rotates his head such that the doorway is no longer in his field of view, to then have the clock jump to a different object then in his field of view and "soft lock" to that next object, and so on. In other embodiments, the system may be configured to ensure that a desired content display is not overlayed in collision with other objects in the room. For example, a user may decide to have a small digital clock positioned three dimensionally about three feet in front of his straight ahead field of view—but in the event that this collides with a meshed object of the room, such as a computer monitor or wall, to have the small digital clock position just proximal of such other meshed object relative to the user, so that the user still can see the clock without collision/occlusion. For example, referring to FIG. 8C, a user has placed a textual object pertaining to some instructions 128 centrally within the field of view, and about two feet forward relative to the head-wearable component 2 of his or her spatial computing system. As the user approaches a door or wall 72, the object 128 may be configured to remain approximately two feet away from the user's head-wearable component 2 until the object would start to collide with the mesh that is pertinent to the door 72. In one embodiment, as shown in FIG. 8D, the system may be configured to continue to present the object 128 without collision with the wall, but with incremental decreases in scale as the user continues to get closer and closer to the door 72, almost as though the object is being projected onto the door 72 with a projector that is closing in as the user's head closes in.

Figure 8E:
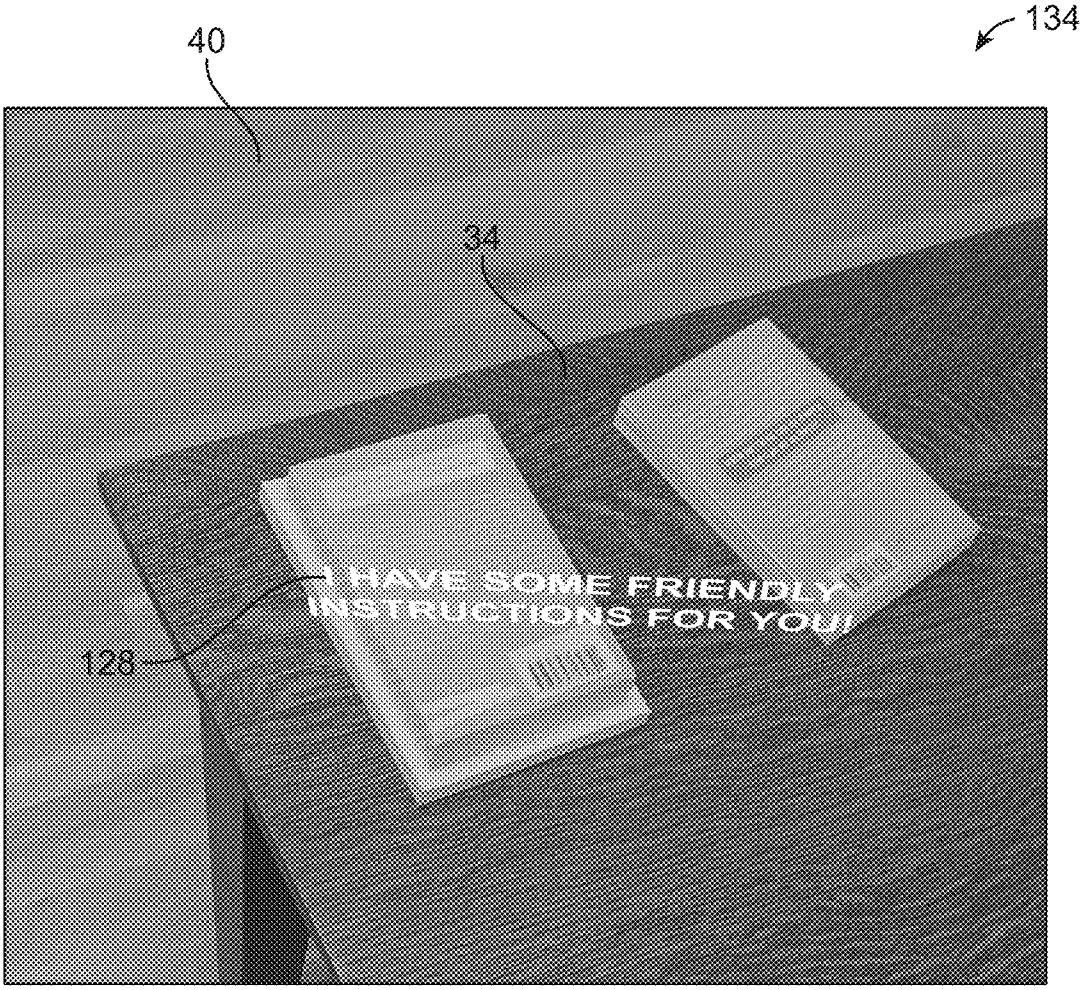

Referring to FIG. 8E, a user view 134 illustrates that presented objects such as textual content 128 may be oriented by the system to align with gravity up, as shown, or in any other orientation, such as in parallel or orthogonal to a plane of a tabletop 34.

Figure 9A:
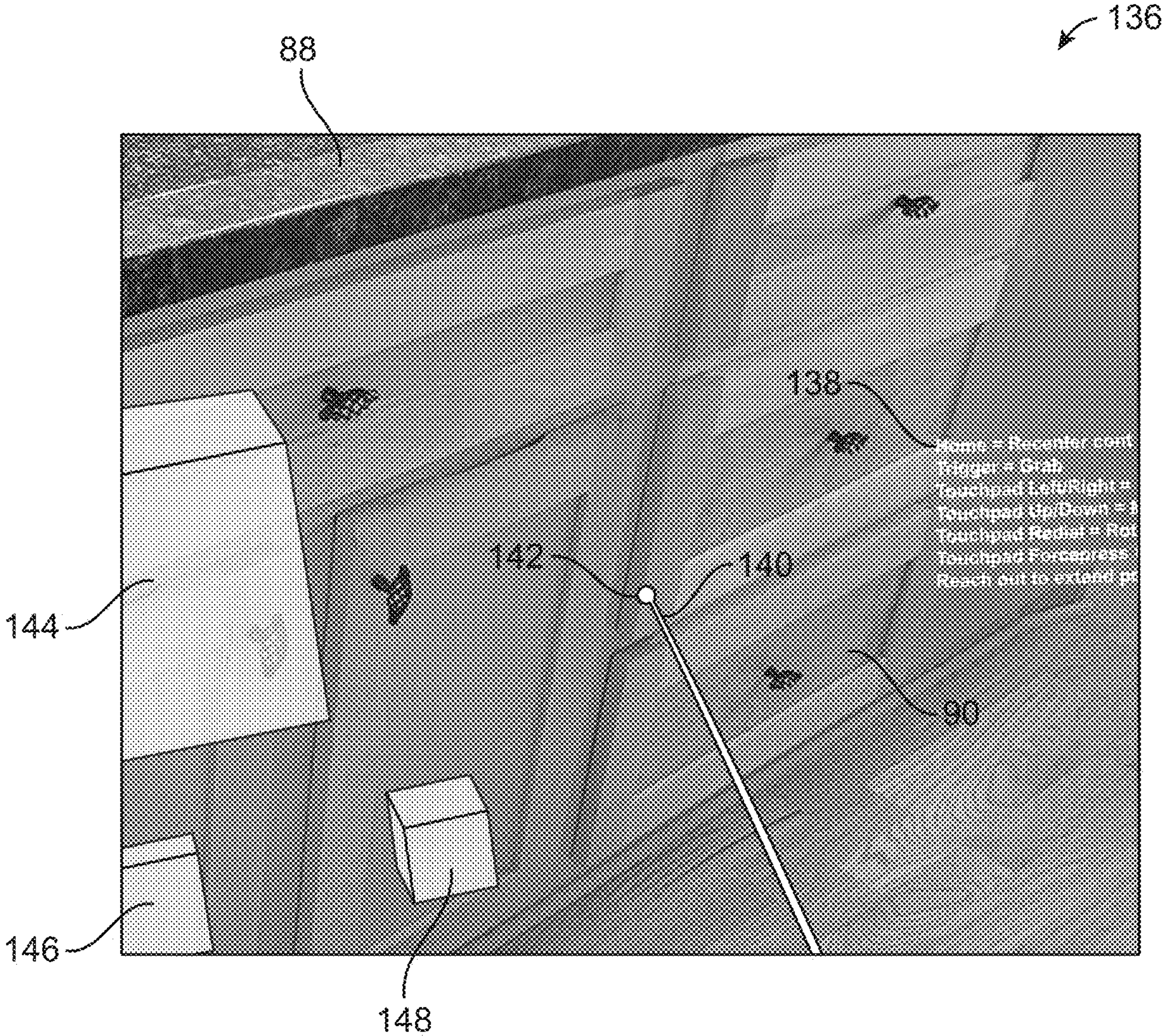
FIGS. 9A-9E illustrate examples of features associated with a virtual pointer.
Figure 9B:
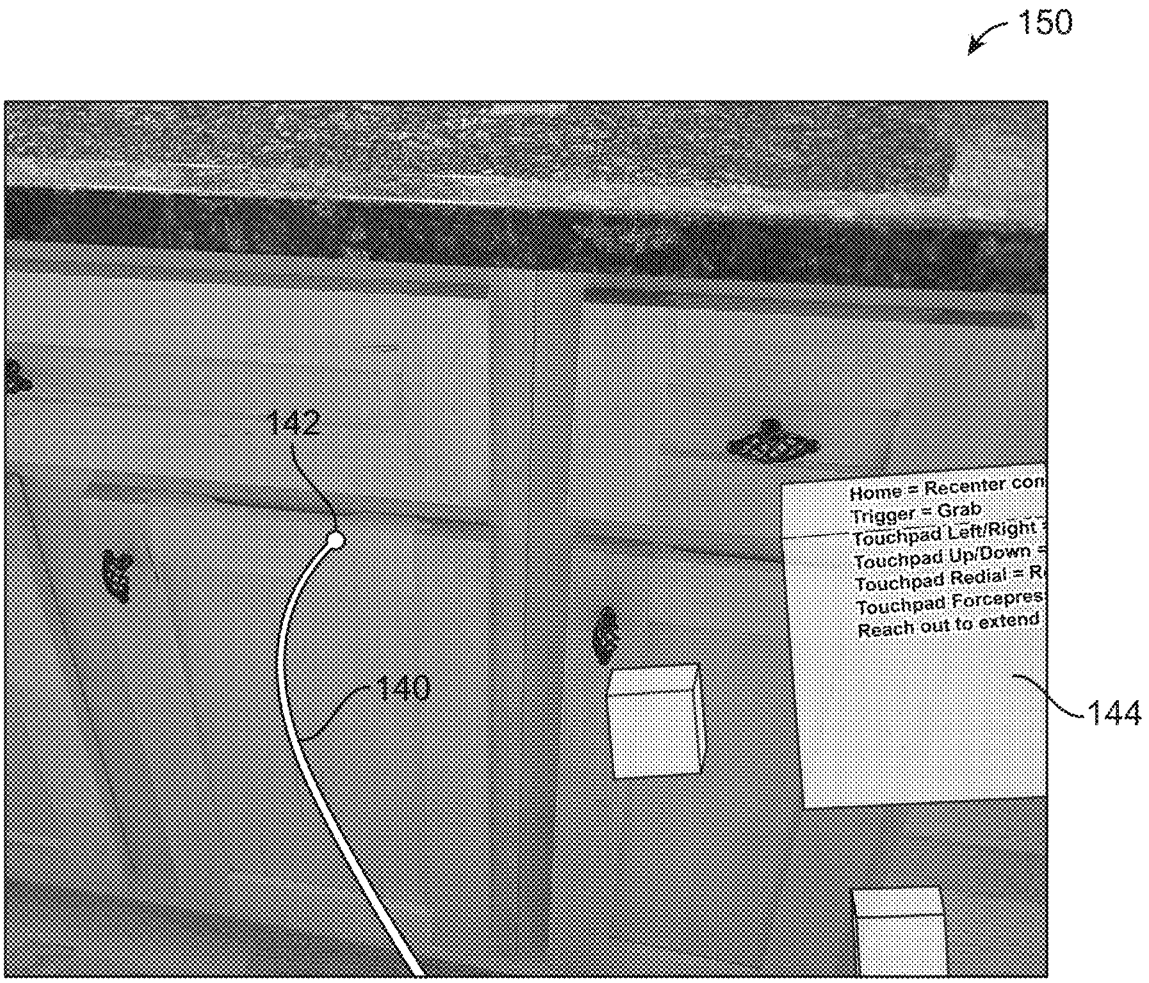

Referring to FIGS. 9A-9E, a virtual pointer may be utilized to move, size, and otherwise manipulate virtual objects, and simulated physics may be added to enhance operation of the pointer and also manipulation of objects. Referring to FIG. 9A, a pointer 140 with distal pointer tip 142 is shown in a stationary position, as aimed, for example, by a user operating a hand-held component 4. Several virtual cube-like objects are shown in this user view 136, as is a small virtual display 138 pertaining to operation of the user interface; in the background, a cabinet structure 90 is shown. Referring to FIG. 9B, a mass configuration and structural modulus configuration may be simulated and imparted by the system to provide the pointer 140, 142 with a simulated physical behavior that may be observed in the user's view 150, such that quick changes in orientation, as shown in FIG. 9B relative to FIG. 9A, produce a simulated bending of the pointer 140. In various embodiments the system may be configured to add a desirable and customizable physical "feel" for the user as the user selects, moves, drags, and/or modifies various virtual objects. For example, the system may be configured to provide smooth movement with object and pointer positional and angular velocity limitations, filtering, interpolation, averaging, and the like. The structural modulus of the pointer 140 may be simulated using a Bezier spline, and may be given linear or nonlinear bending properties and various simulated mass characteristics.

Figure 9C:
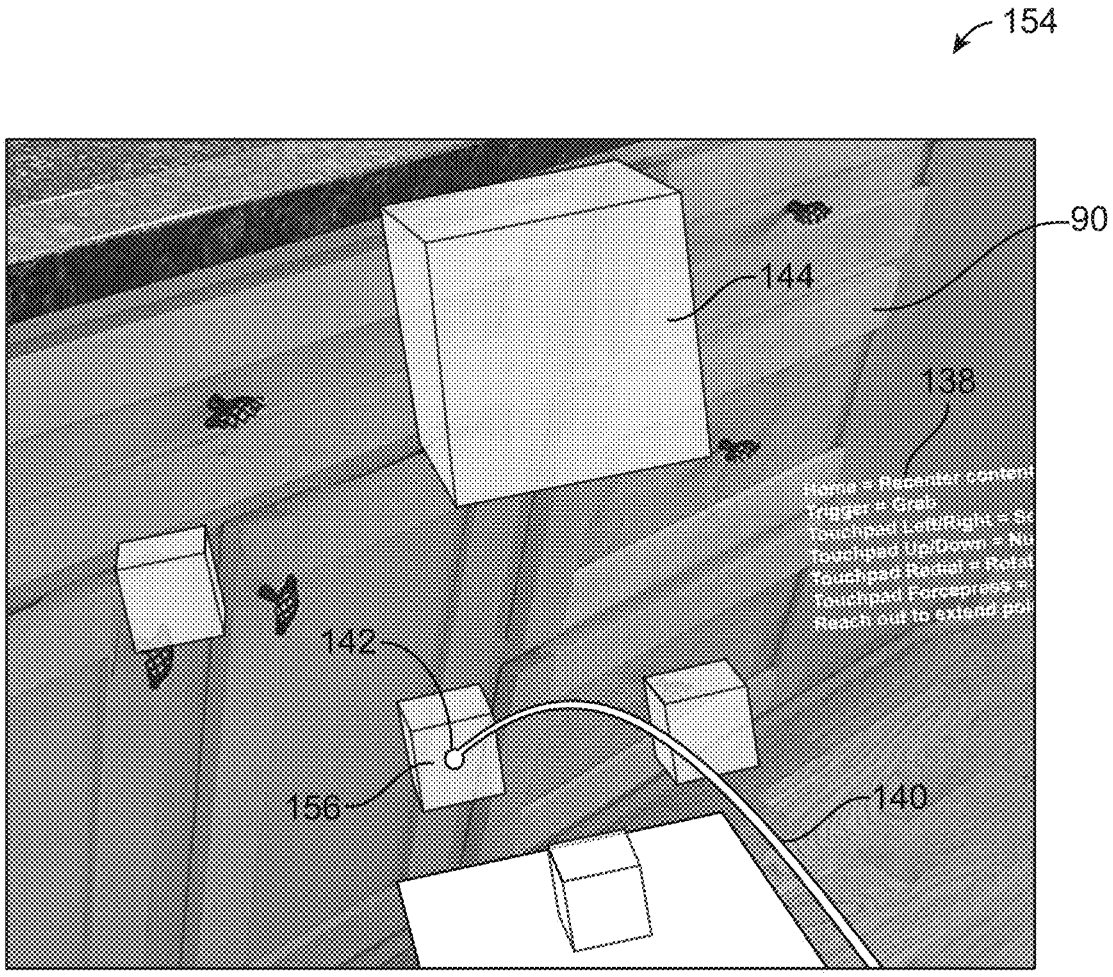
Figure 9D:
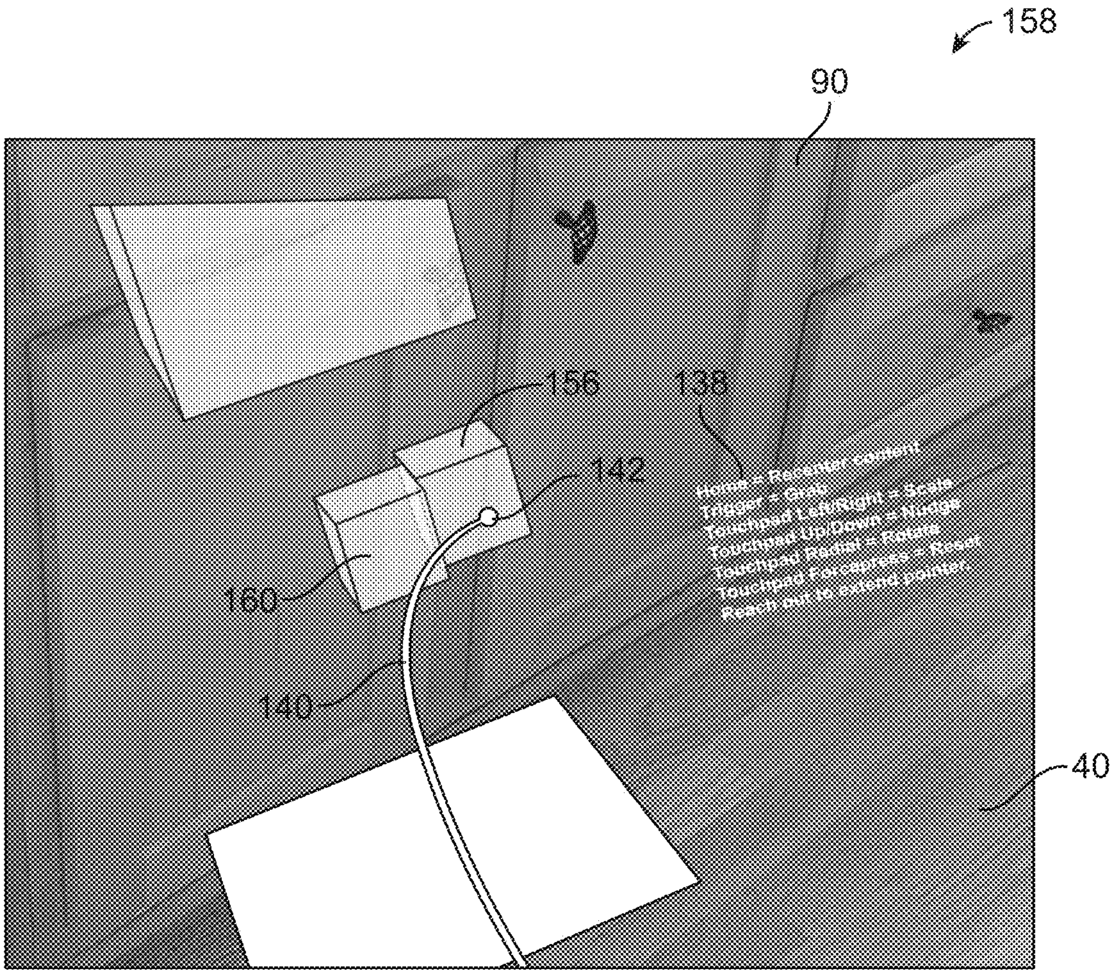
Figure 9E:
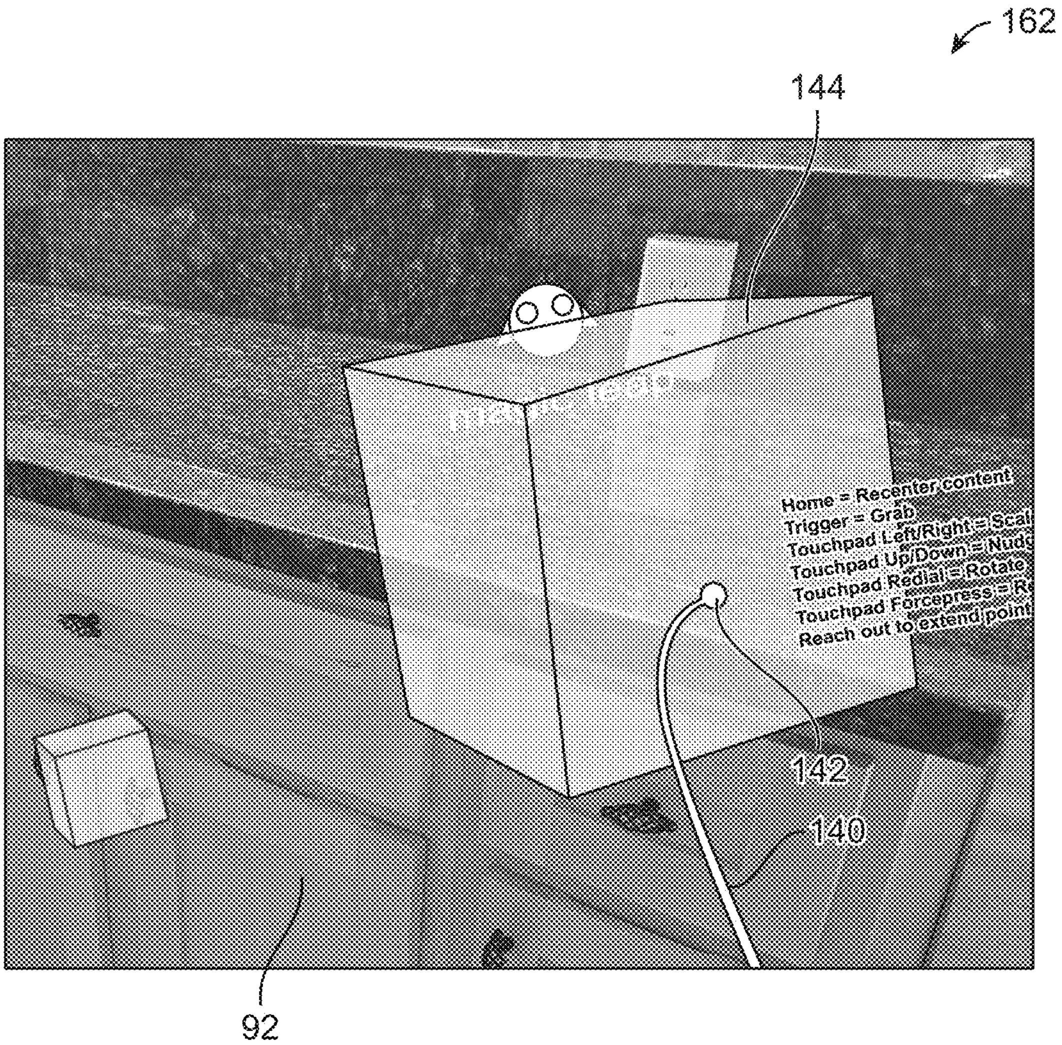

Pointer objects 140, 142 may be configured to add simulated spring-based inertia to make objects move more realistically, and objects may be tagged with physical properties to respect gravity, collisions, and structural modulus configurations of themselves and other objects with which they may collide or interface, such as when dragged or repositioned by the pointer. FIG. 9C illustrates user view 154 of a pointer dragging a virtual cube object 156 with simulated mass and structural modulus imparted to each. Friction physics may also be added in various configurations as though virtual elements have static and kinetic coefficients of friction relative to each other, and relative to the space that they occupy or objects with which they may interface (for example, a virtual shuffleboard configuration may have a relatively low friction configuration for the virtual board, but higher friction elsewhere, with the exception of free 3-D space, which may be configured to have very little friction in one "thin air" embodiment, or relatively high friction in a "viscous gelatine world" simulated embodiment. FIG. 9D illustrates a user view 158 of an embodiment wherein one virtual object 156 is being dragged into a collision state with another virtual object 160 via the intercoupled virtual pointer 140. FIG. 9E illustrates a user view 162 of an embodiment wherein a pointer 140, 142 is being utilized to re-size an object 144.

Figure 11A:
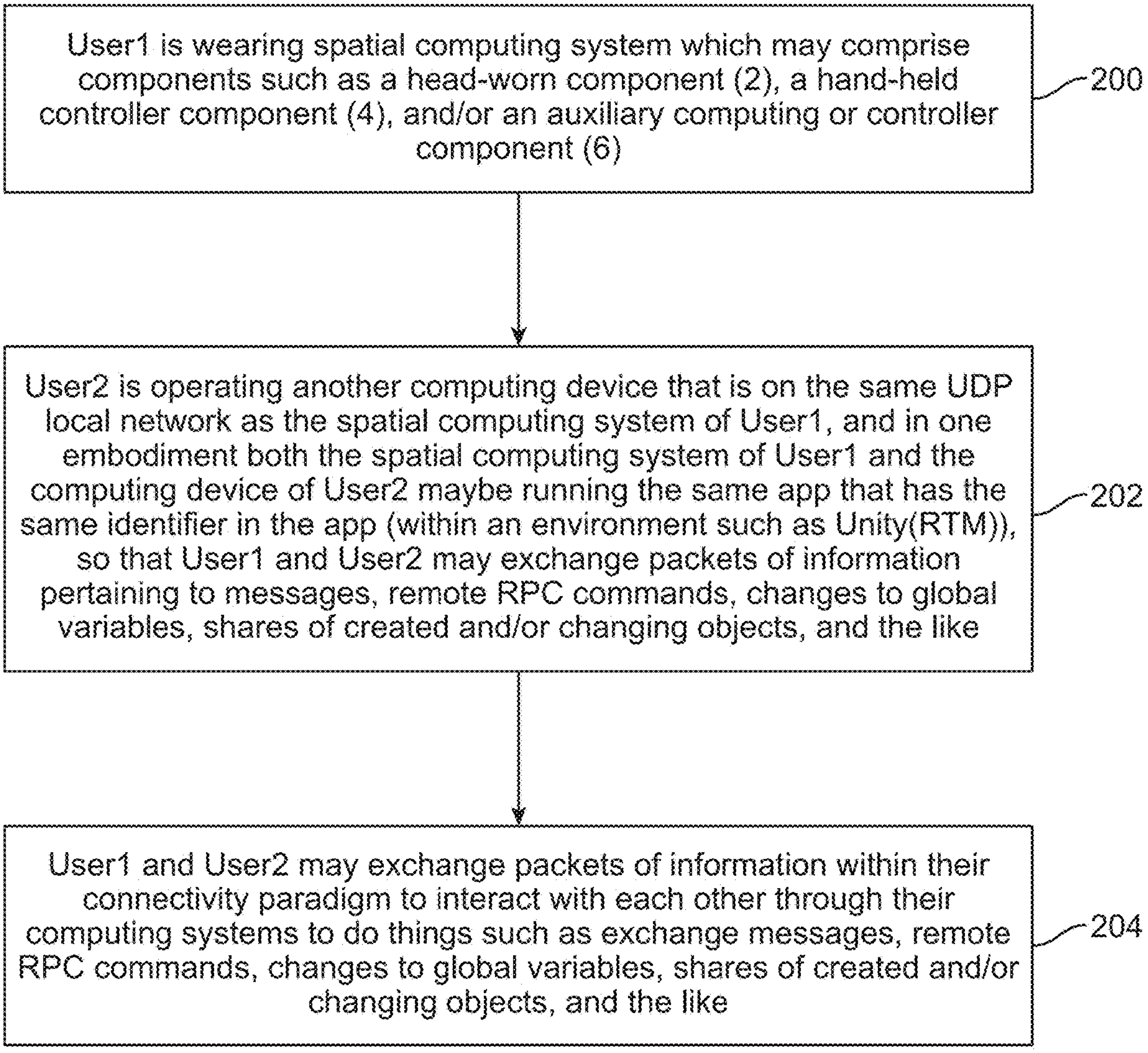
FIG. 11A illustrates a method in accordance with some embodiments.

Referring ahead to FIG. 11A, a plurality of users may work together with connected systems. As shown in FIG. 11A, with a first user wearing a spatial computing system which may comprise components such as a head-worn component 2, a hand-held controller component 4, and/or an auxiliary computing or controller component 6 (item 200), and a second user operating another computing device, such as a laptop computer or smartphone, that is on the same UDP local network as the spatial computing system of the first user, the two users may collaborate. Preferably both the spatial computing system of the first user and the computing device of second user are running the same app that has the same identifier in the app (within an environment and/or game engine such as Unity (RTM) or Unreal Engine (RTM)), so that the first user and second user may exchange packets of information pertaining to messages, remote RPC commands, changes to global variables, shares of created and/or changing objects, and the like (item 202). With such a configuration, the two users may exchange packets of information within their connectivity paradigm to interact with each other through their computing systems to do things such as exchange messages, remote RPC commands, changes to global variables, shares of created and/or changing objects, and the like (item 204).

Figure 11B:
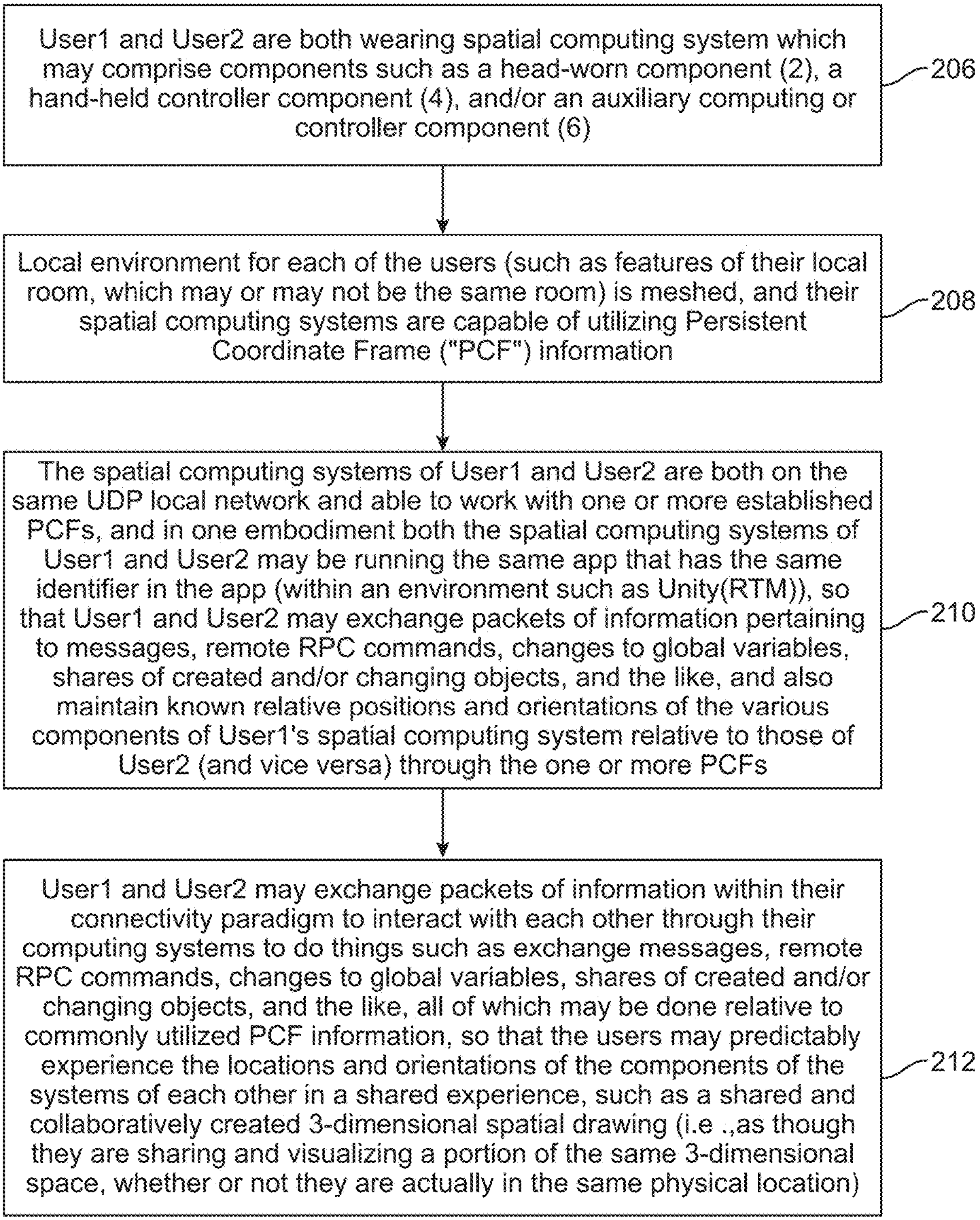
FIG. 11B illustrates another method in accordance with some embodiments.

Referring to FIG. 11B, in another embodiment, further collaboration is facilitated by spatial alignment relative to a persistent coordinate frame ("PCF"), which is a coordinate frame that is persistent relative to the physical world around a user and generally is configured to not drift or move across multiple user sessions. Persistent coordinate frames and persistent anchor points are discussed also in the aforementioned incorporated references, such as 62/989,584 to Daniel Lehrich et al. Systems such as those available from Magic Leap, Inc. under the tradename "Magic Leap One" (TM) may be configured such that whenever a Magic Leap One spatial computing system recognizes that it is in a space it has seen before, any PCFs placed in the space are restored. In this manner, any content placed relative to a PCF can be persisted across multiple reboots; such a spatial computing platform may be configured to automatically synchronize PCFs amongst users who are in the same space, so multiple users can see the same content in the same physical location. Thus, referring back to FIG. 11B, two users may both be wearing spatial computing systems which may comprise components such as a head-worn component 2, a hand-held controller component 4, and/or an auxiliary computing or controller component 6 (item 206). The local environment for each of the users (such as features of their local room, which may or may not be the same room) may be meshed, and their spatial computing systems are capable of utilizing Persistent Coordinate Frame ("PCF") information (item 208). The spatial computing systems of the two users preferably are both on the same UDP local network, able to work with one or more established PCFs, and in one embodiment both the spatial computing systems of the two users may be running the same app that has the same identifier in the app (within an environment and/or game engine such as Unity (RTM) or Unreal Engine (RTM)), so that the two users may exchange packets of information pertaining to messages, remote RPC commands, changes to global variables, shares of created and/or changing objects, and the like, and also maintain known relative positions and orientations of the various components of one user's spatial computing system relative to those of the other user (and vice versa) through the one or more PCFs (item 210). Thus the two users may exchange packets of information within their connectivity paradigm to interact with each other through their computing systems to do things such as exchange messages, remote RPC commands, changes to global variables, shares of created and/or changing objects, and the like, all of which may be done relative to commonly utilized PCF information, so that the users may predictably experience the locations and orientations of the components of the systems of each other in a shared experience, such as a shared and collaboratively created 3-dimensional spatial drawing (i.e., as though they are sharing and visualizing a portion of the same 3-dimensional space, whether or not they are actually in the same physical location) (item 212).

Figure 10A:
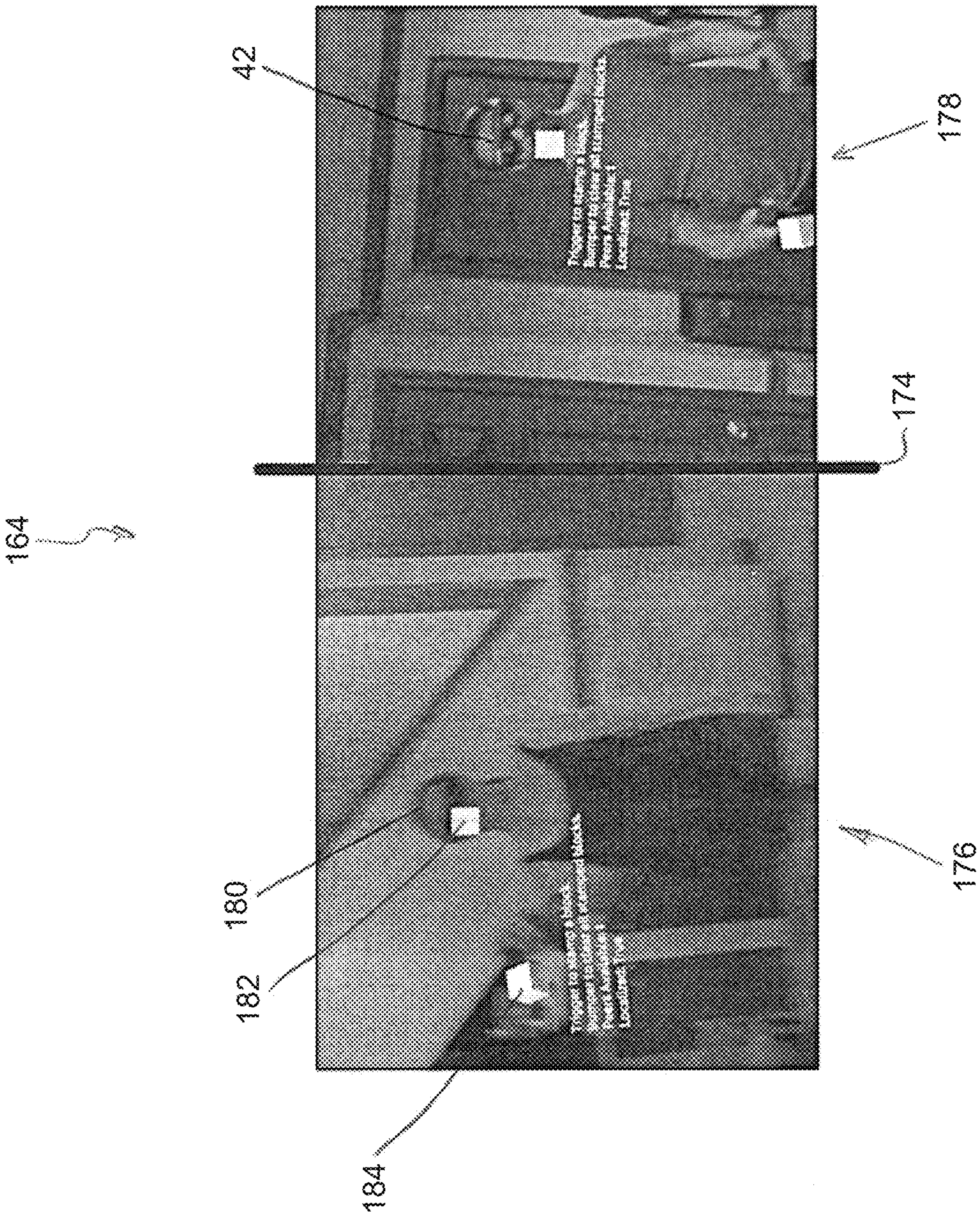
FIGS. 10A-10E illustrate examples of virtual objects being interacted with by multiple users.

Referring to FIGS. 10A-10E, aspects of a configuration similar to that described in reference to FIG. 11B are illustrated in split-screen format (the user views 176 to the left of the split 174 represent views of the first user 42; the user views 178 to the right of the split 174 represent views of the second user 180). FIG. 10A illustrates a split view 164 wherein each of the users 180, 42 has a small cube virtually coupled to their head-wearable and hand-held spatial computing components. The second user 180 has these two small cubes labelled in the illustration as elements 184 and 182; as shown in FIG. 10A, the first user sees these two small cubes in his view 176 and they are, indeed, remaining tied to the second user's head-wearable and hand-held spatial computing components as the second user moves around.

Figure 10B:
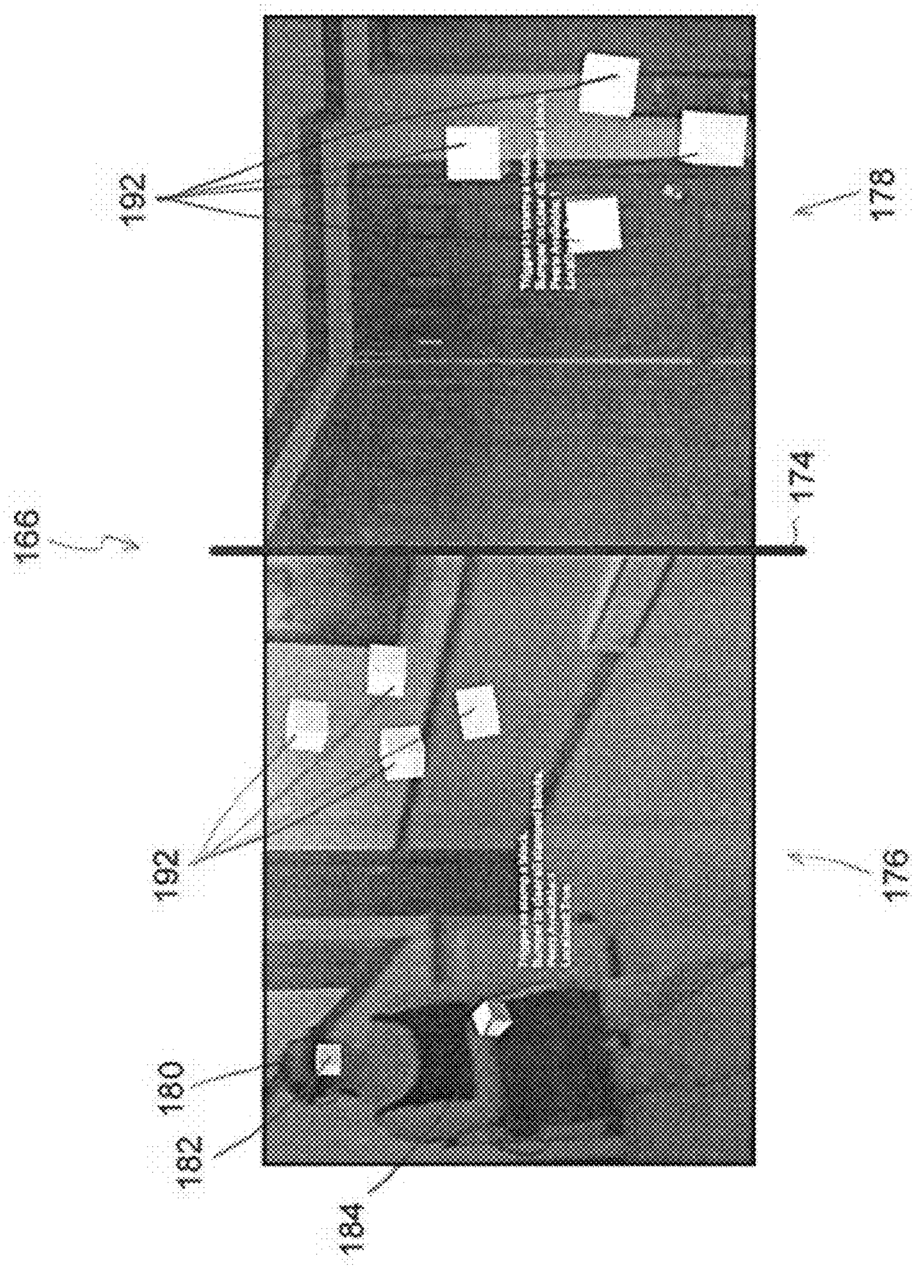
Figure 10C:
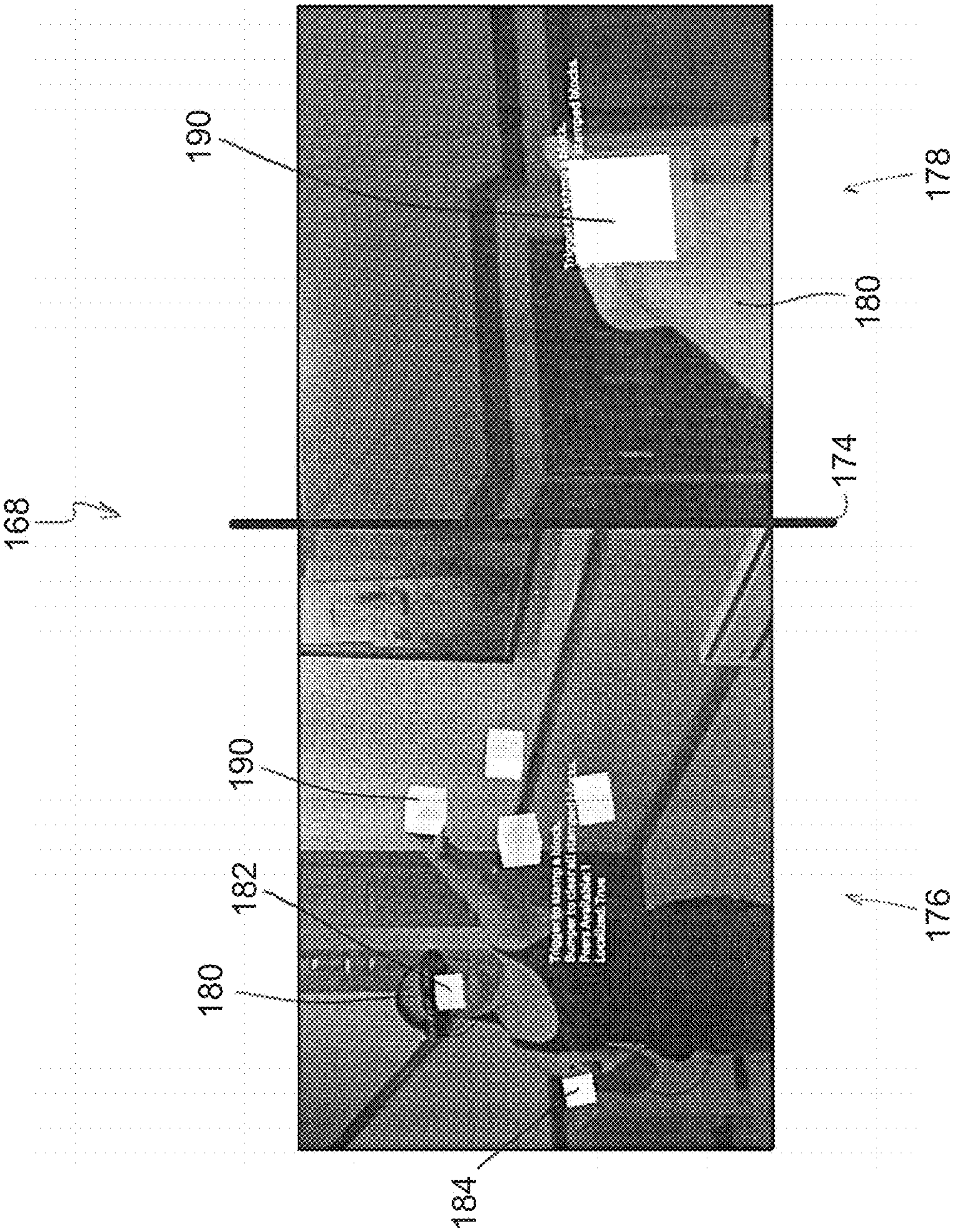
Figure 10D:
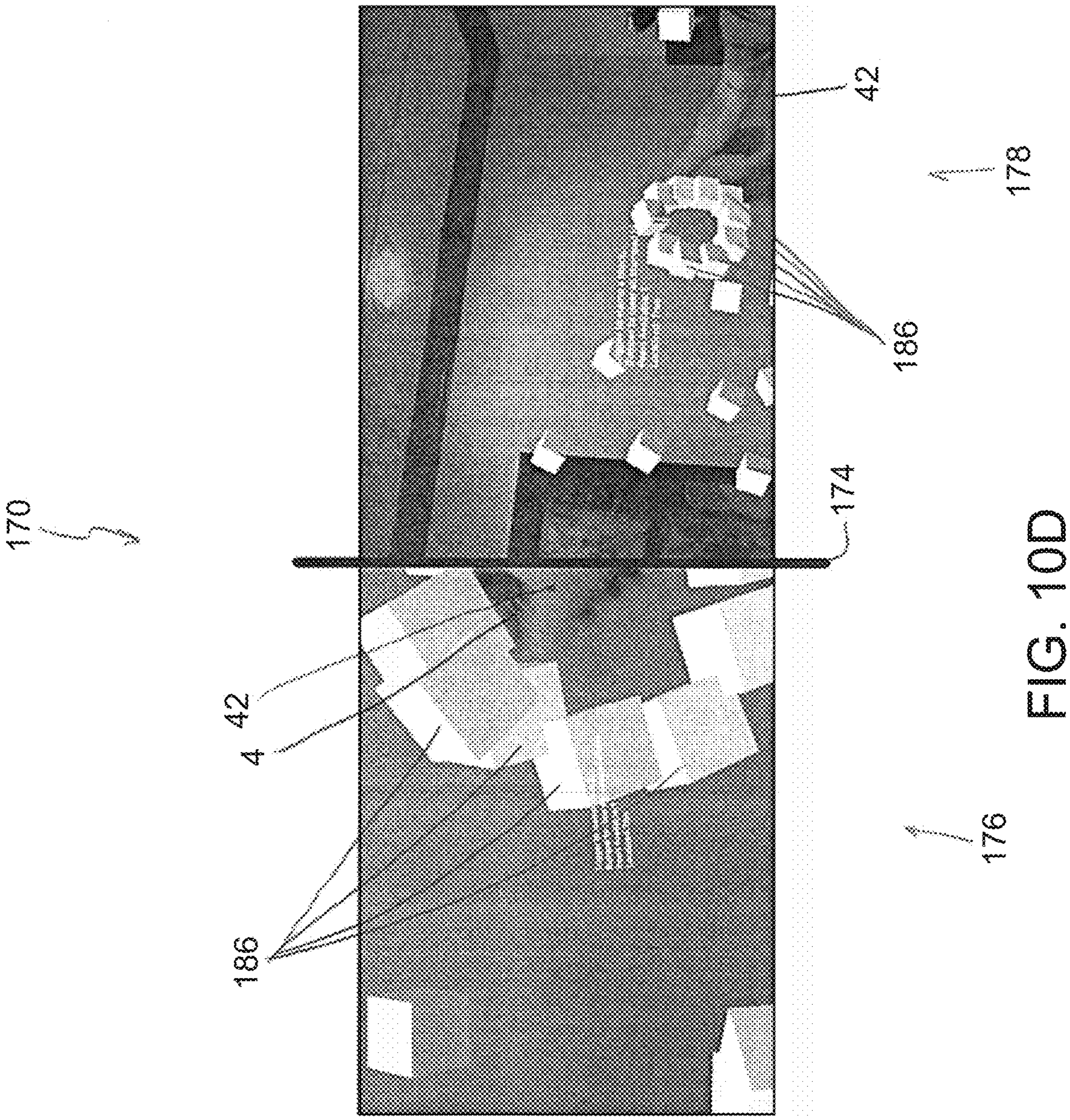
Figure 10E:
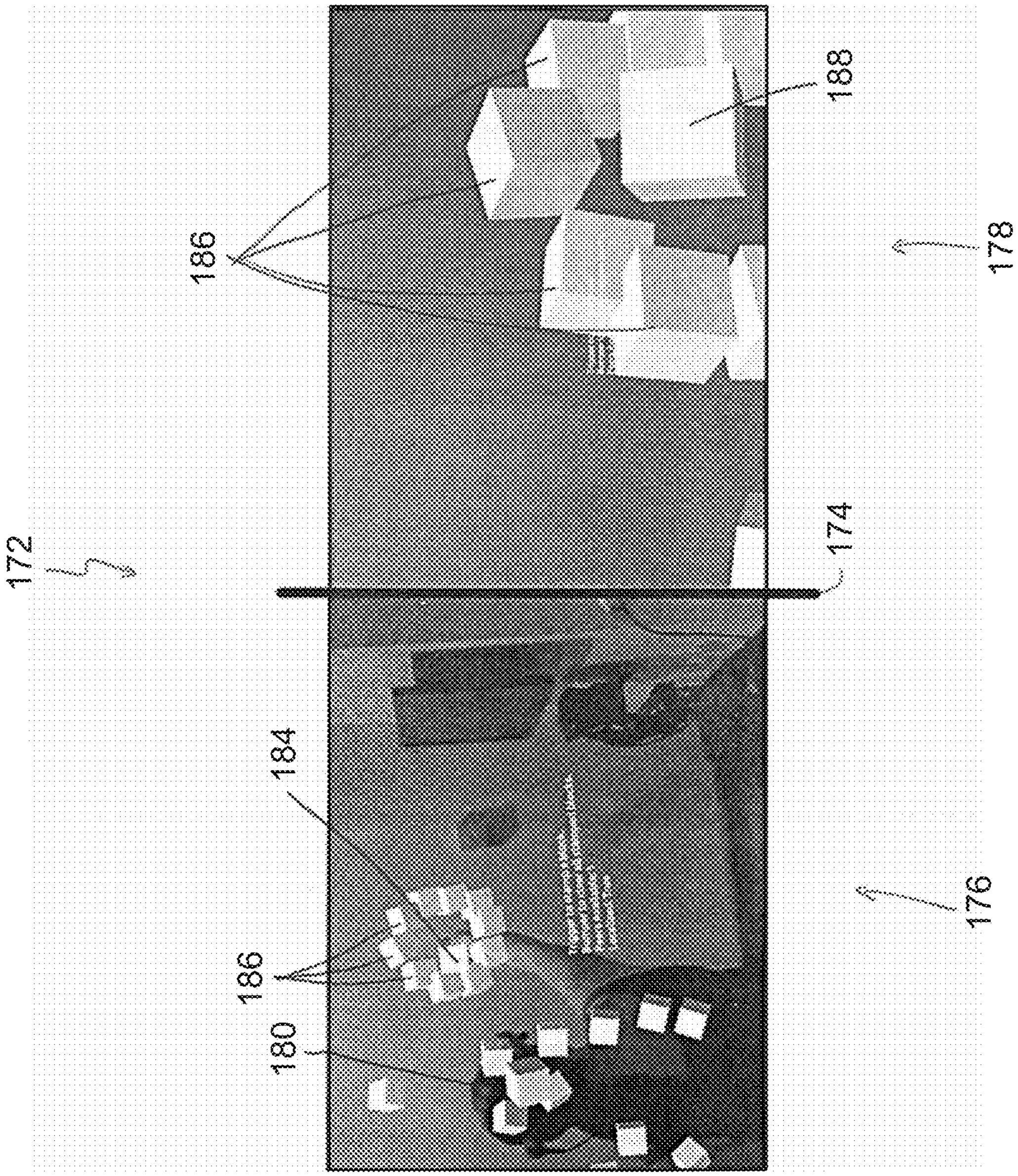

Referring to the split view 166 of FIG. 10B, as the first user utilizes his hand-held spatial computing component to place four new cubes in space 192, these cubes are visible by the second user; indeed, as the first user 42 asks the second user 180 to reach out and touch the top one 190 of the four new cubes 192, the second user 180 does appear to the first user to touch that top 190 new cube. Similarly, referring to FIGS. 10D-10E, split views (170 and 172, respectively) are shown wherein the first user 42 creates a circular pattern of new cubes 186, after which the second user 180 sees these new cubes 186 in space in front of her and then places her own new cube 188 directly in the center for both users to see, thus illustrating that the two users are collaborating in space in a configuration involving viewability and spatial interaction by both of them, subject to a persistent coordinate frame that keeps their positions and orientations calibrated and consistent relative to each other so that they may effectively collaborate in space.

Figure 12:
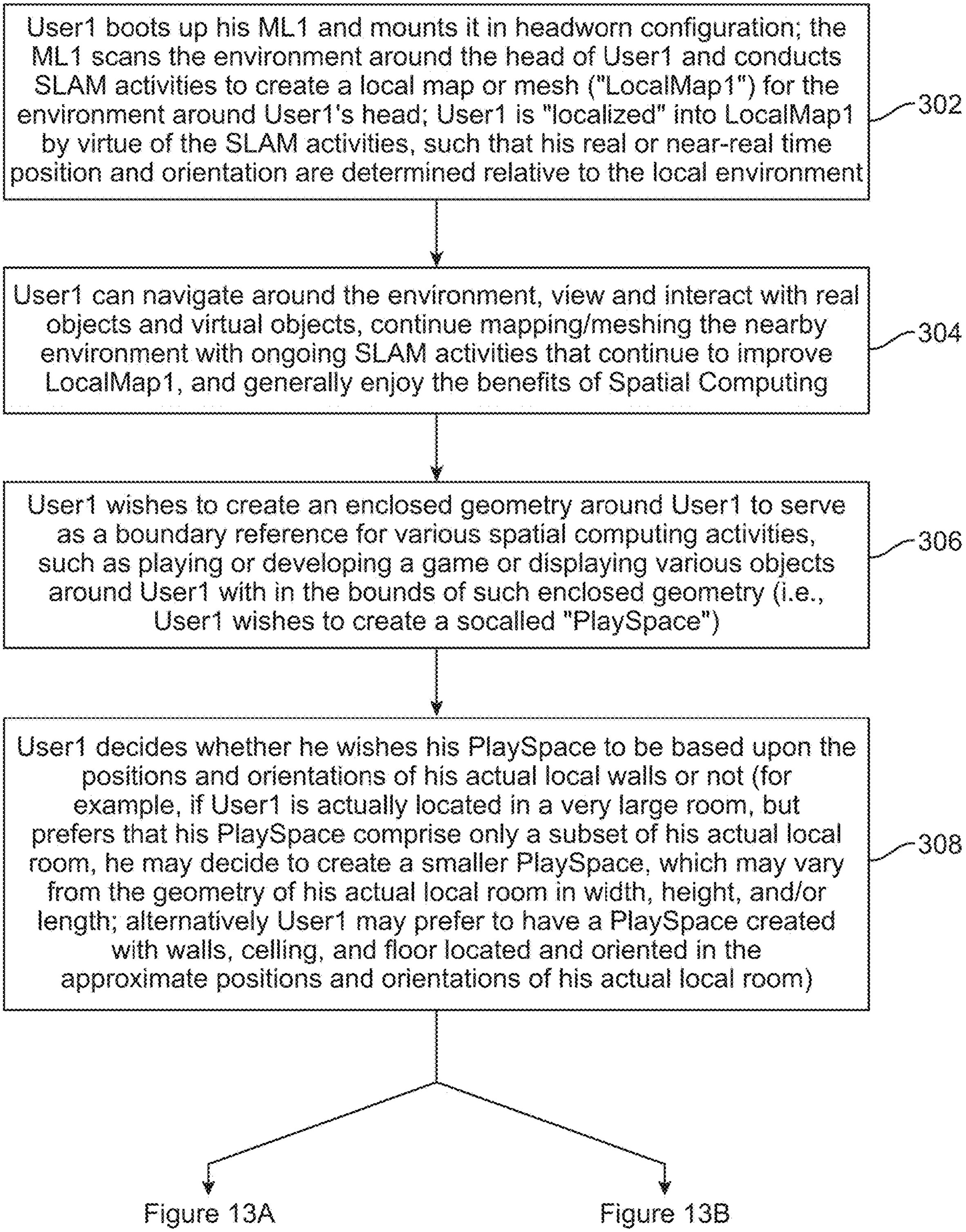
FIGS. 12, 13A, and 13B illustrate a method in accordance with some embodiments.

Referring to FIG. 12, an embodiment is illustrated wherein a user ("User1") wishes to create an enclosed virtual geometry around User1 to serve as a boundary reference for various spatial computing activities. As shown in FIG. 12, User1 boots up his or her spatial computing or augmented reality system, such as that available from Magic Leap, Inc. under the tradename "Magic Leap One" ("ML1"), and mounts it upon his or her head in headworn configuration (item 302). The ML1 scans the environment around the head of User1 and conducts simultaneous localization and mapping ("SLAM") activities to create a local map or mesh ("LocalMap1" in this example) for the three-dimensional spatial environment around User1's head. User1 is "localized" into LocalMap1 by virtue of the SLAM activities, such that his real or near-real time position and orientation are determined or estimated relative to the features of the local environment.

User1 can navigate around the environment, view and interact with real objects and/or virtual objects, continue mapping/meshing the nearby environment with ongoing SLAM activities that continue to improve LocalMap1, and generally enjoy the benefits of spatial computing (item 304).

If User1 wishes to create an enclosed geometry around him or herself as a boundary reference for various spatial computing activities, such as playing or developing a game (for example, the augmented reality game distributed by Magic Leap, Inc. under the tradename "Dr Grordborts Invaders"™, wherein various characters and robots are configured to pursue the user in an augmented reality environment) or displaying various objects around User1 within the bounds of such enclosed geometry, such a bounded geometry may be termed a "PlaySpace" (item 306).

With such a decision made, the user may decide whether he or she wishes to have the PlaySpace based upon the positions and orientations of his actual walls, or not (item 308). For example, if User1 is actually located in a very large room, but prefers that his PlaySpace comprise only a subset of his actual local room, he may decide to create a smaller PlaySpace, which may vary from the geometry of his actual local room in width, height, and/or length; alternatively User1 may prefer to have a PlaySpace created with walls, ceiling, and floor located and oriented in the approximate positions and orientations of his actual local room.

Figure 13A:
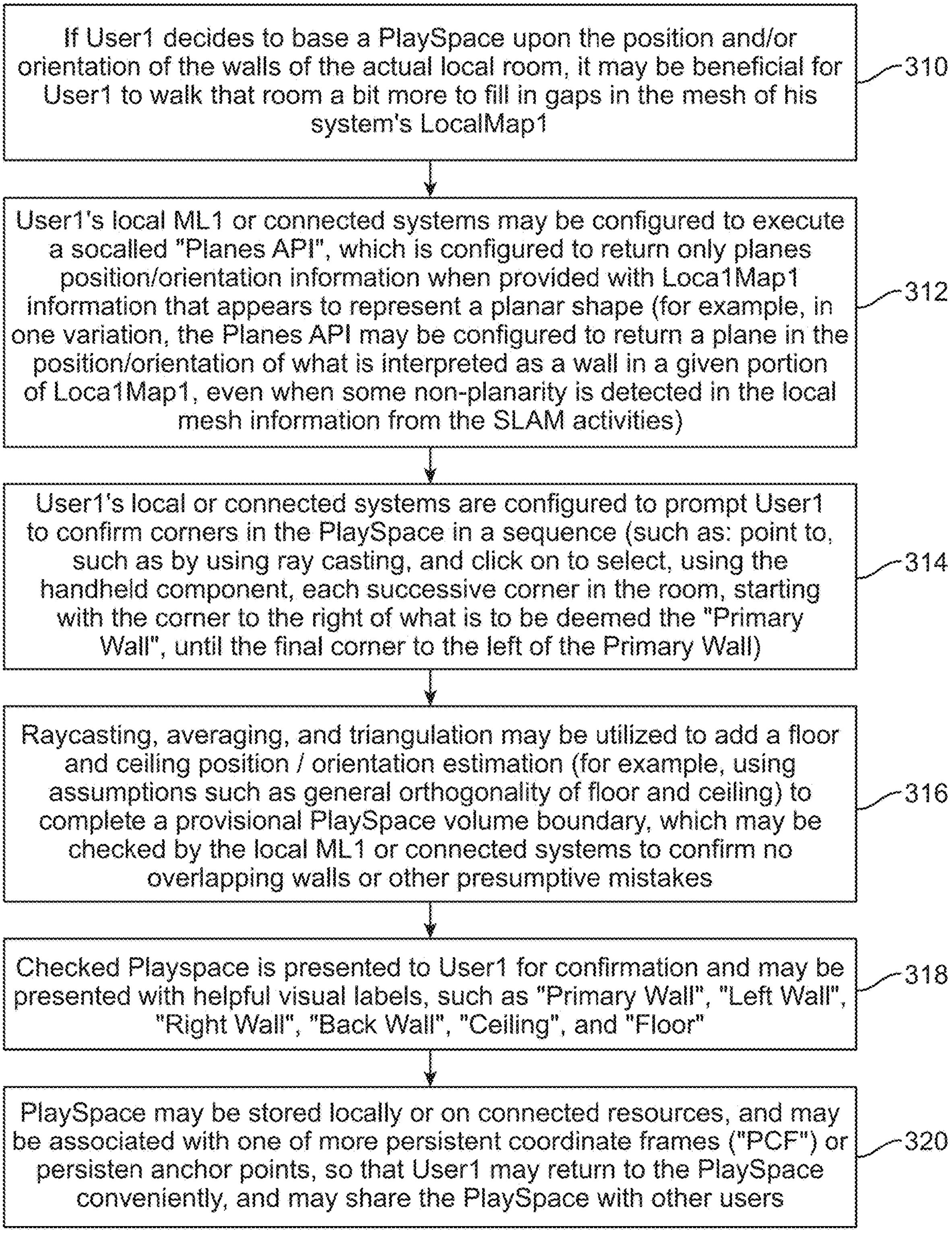

Referring to FIG. 13A, if User1 decides to base a PlaySpace upon the position and/or orientation of the walls of the actual local room, it may be beneficial for User1 to walk that room a bit more to fill in gaps in the mesh of his system's LocalMap1 by gathering further data from different perspectives, etc. using the SLAM capabilities of the spatial computing system (item 310) and various connected resources or systems 8. User1's local ML1 or connected systems may be configured to execute a so-called "Planes API", which may be configured to return only planes position/orientation information when provided with LocalMap1 information that appears to at least partially represent a planar shape (for example, in one variation, the Planes API may be configured to return a plane in the position/orientation of what is interpreted as a wall in a given portion of LocalMap1, even when some non-planarity is detected in the local mesh information from the SLAM activities) (item 312). User1's local or connected systems may be configured to prompt User1 to confirm corners in the PlaySpace in a sequence (such as: point to, such as by using ray casting, and click on, such as by using a handheld controller device or component, to select, each successive corner in the room, starting with the corner to the right of what is to be deemed the "Primary Wall", until the final corner to the left of the Primary Wall) (item 314).

Raycasting, averaging, and triangulation may be utilized by the local and connected systems to add a floor and ceiling position/orientation estimation (for example, using assumptions such as general orthogonality of floor and ceiling) to complete a provisional PlaySpace volume boundary, which may be checked by the local and/or connected systems to confirm issues such as no overlapping walls or other presumptive mistakes (item 316).

Figure 14A:
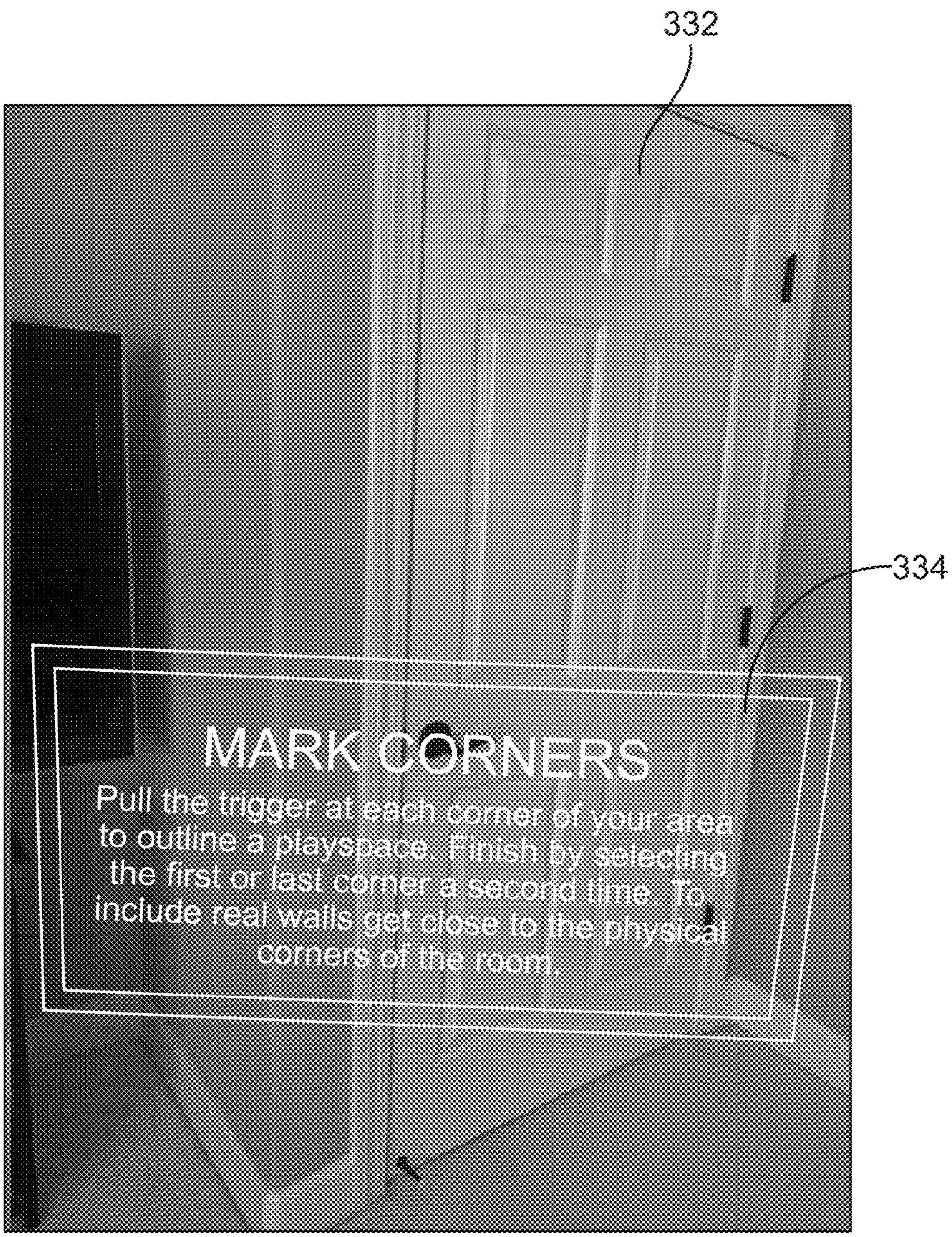

Referring again to FIG. 13A, a checked Playspace may be presented to User1, such as via a wireframe type of virtual presentation in User1's augmented reality viewing interface, for confirmation and may be presented with helpful visual labels, such as "Primary Wall", "Left Wall", "Right Wall", "Back Wall", "Ceiling", and "Floor" (item 318). Such labels may be positioned adjacent to the subject "walls" or may be offset in a manner that makes the labelling intuitive to the user (referring ahead, FIGS. 14A-141 illustrate various labels shown in the augmented reality viewing interface to assist the user); furthermore, the viewing of the PlaySpace wireframe or other representation may be displayed to the user as lined up with actual features of the actual local room, or with an offset from such features, as shown ahead in FIGS. 14D-14G.

Referring back to FIG. 13A, the created PlaySpace may be stored locally or on connected resources, and may be associated with one of more persistent coordinate frames ("PCF") or persistent anchor points, so that User1 may return to the PlaySpace conveniently, and may share the PlaySpace with other users (item 320).

The system may be configured to utilize aspects or features of available map information (such as LocalMap1) to assist in identifying and "snapping-to" during manual selection (i.e., a form of assisted manual selection wherein the user's manual selection is assisted with simulated gravity style effects which assist in easily selecting a pre-highlighted feature, if this is desired) presumptive corners with visibly presented highlighting. Similarly the system may be configured to utilize aspects or features of available map information (such as LocalMap1) assist in identifying and "snapping-to" during manual selection of actual walls or other objects of the actual room. For example, in one embodiment, the system may be configured to assume that the user is attempting to select the position of the actual wall of the actual room if the user manually points to a location within some predetermined distance, such as four inches, of the position of the actual wall of the actual room using the mesh/map; such a configuration makes it relatively easy and quick for a user to move around a room and select all four walls and corners, for example, in a conventional rectangular-prismic or cubic style actual room for which the user is trying to make a matching or near-matching PlaySpace.

Figure 13B:
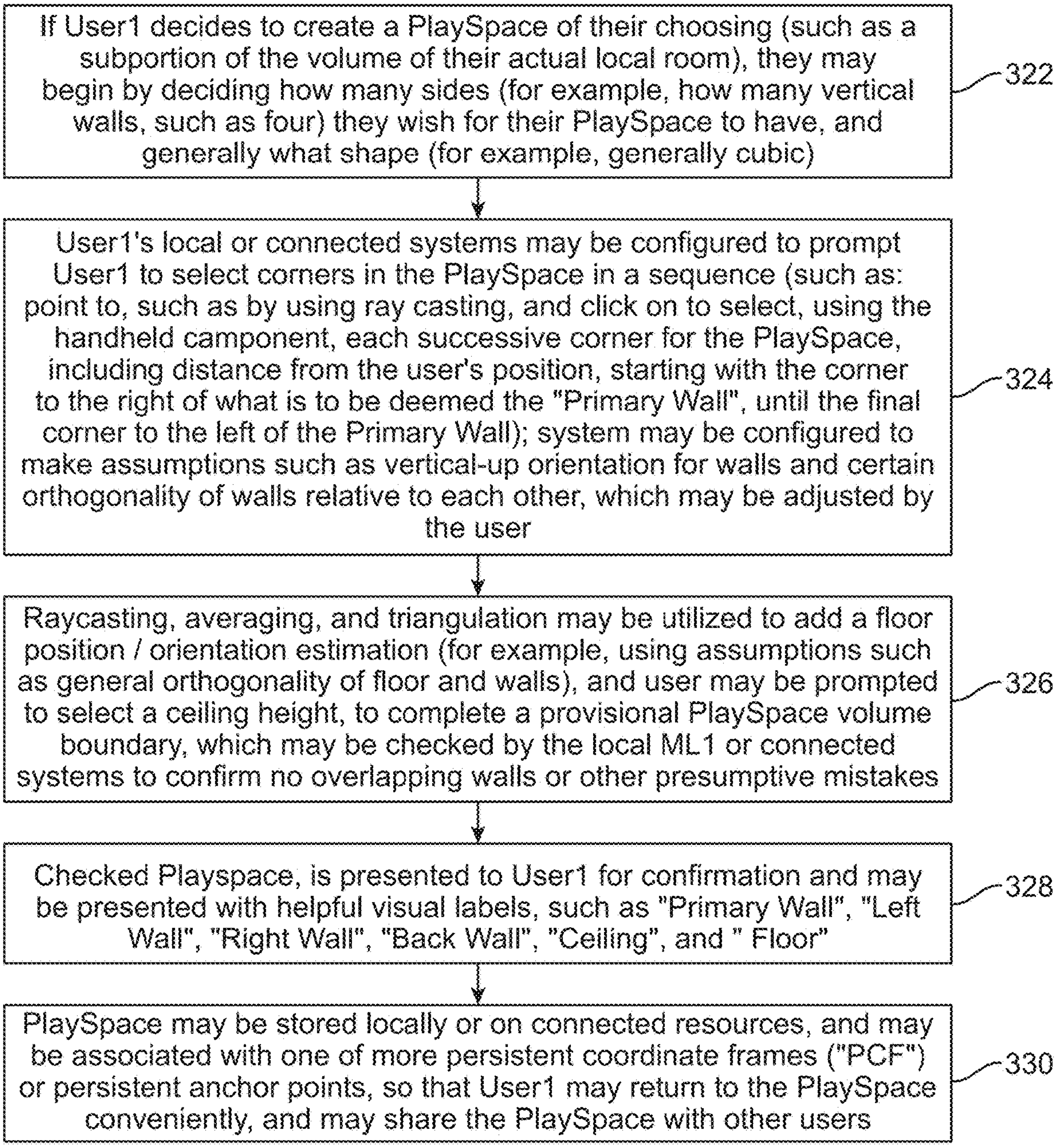

Referring to FIG. 13B, if the user decides to create a PlaySpace of their own choosing (such as a sub-portion of the volume of the actual room in which they actually reside at the time), they may begin by deciding how many sides (for example, how many vertical walls, such as four) they wish for their PlaySpace to have, and generally what shape (for example, generally cubic) it should have (item 322).

Similar to as noted above in reference to FIG. 13A, User1's local or connected systems may be configured to prompt User1 to select corners in the PlaySpace in a sequence (such as: point to, such as by using ray casting, and click on to select, using the handheld component, each successive corner for the PlaySpace, including distance from the user's position, starting with the corner to the right of what is to be deemed the "Primary Wall", until the final corner to the left of the Primary Wall). The local and/or connected system may be configured to make assumptions such as vertical-up or gravity-up orientation for walls and certain orthogonality of walls relative to each other, which may be adjusted by the user (item 324).

Raycasting, averaging, and triangulation may be utilized to add a floor position/orientation estimation (for example, using assumptions such as general orthogonality of floor and walls), and user may be prompted to select a ceiling height, to complete a provisional PlaySpace volume boundary, which may be checked by the local ML1 or connected systems to confirm issues such as no overlapping walls or other presumptive mistakes (item 326).

Referring again to FIG. 13B, a checked Playspace may be presented to User1, such as via a wireframe type of virtual presentation in User1's augmented reality viewing interface, for confirmation and may be presented with helpful visual labels, such as "Primary Wall", "Left Wall", "Right Wall", "Back Wall", "Ceiling", and "Floor" (item 328). Such labels may be positioned adjacent to the virtually-created PlaySpace "walls" or may be offset in a manner that makes the labelling intuitive to the user; furthermore, the viewing of the PlaySpace wireframe or other representation may be displayed to the user as lined up with actual features of the actual local room, or with an offset from such features.

Referring back to FIG. 13B, the created PlaySpace may be stored locally or on connected resources, and may be associated with one of more persistent coordinate frames ("PCF") or persistent anchor points, so that User1 may return to the PlaySpace conveniently, and may share the PlaySpace with other users (item 330).

Referring to FIGS. 14A-141, various aspects of a scenario the follows steps and configurations as presented in FIGS. 12 and 13A are illustrated as views or partial views through a sample user's augmented reality viewing interface.

Referring to FIG. 14A, a view through a user's augmented reality viewing interface is shown with features of the actual room (here a door 332 mounted in a wall of the actual room) visible along with a virtual presented instruction box 334 presented to the user.

Figure 14B:
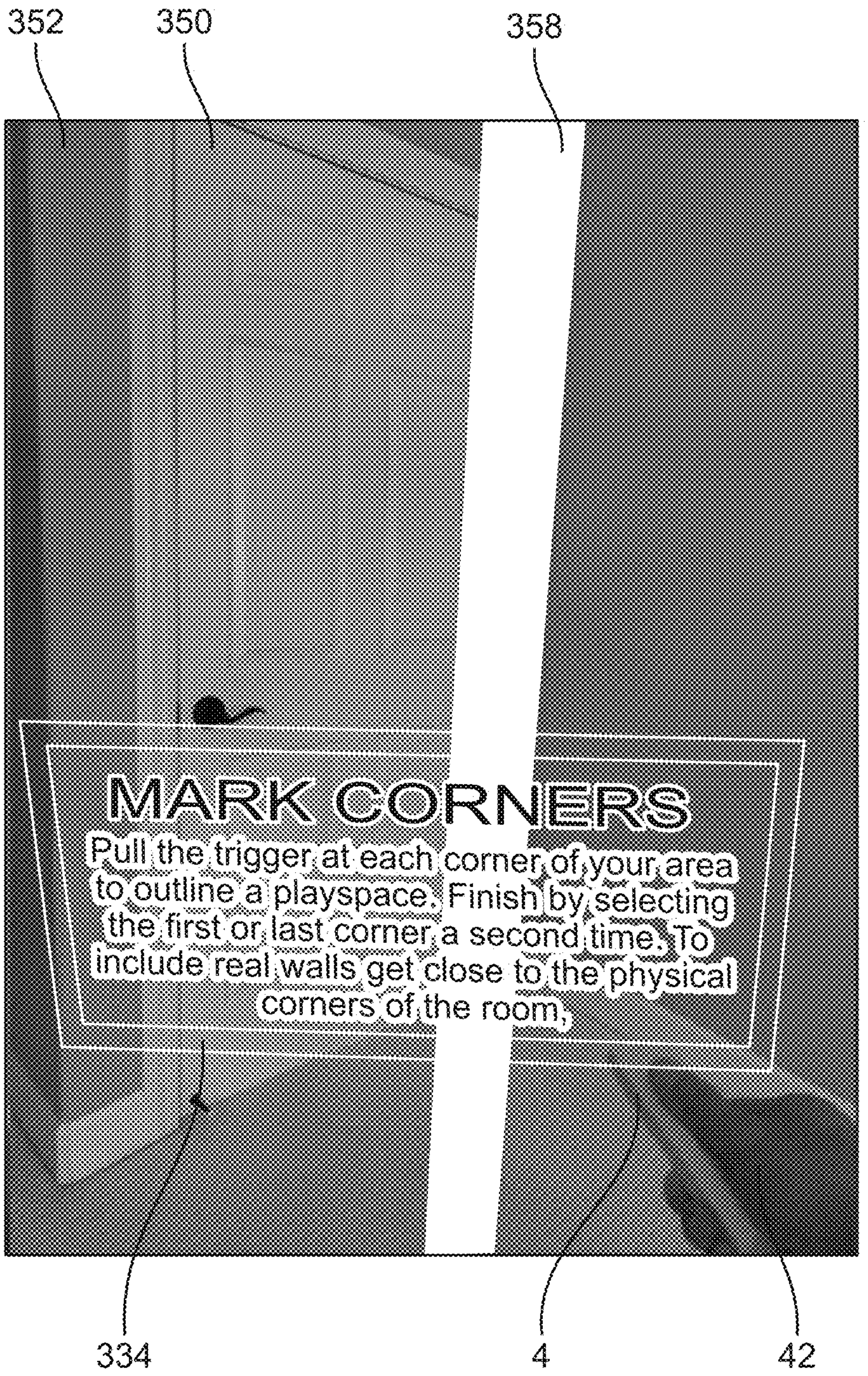

Referring to FIG. 14B, a view through a user's augmented reality viewing interface is shown with features of the actual room (here a door 350 and part of a wall 352) visible along with a virtual presented instruction box 334 presented to the user. Part of the user's hand 42 is shown in actual view along with part of a handheld controller 4 system component. A highlighted virtual marker 358 is shown to the user as he selects a corner.

Figure 14C:
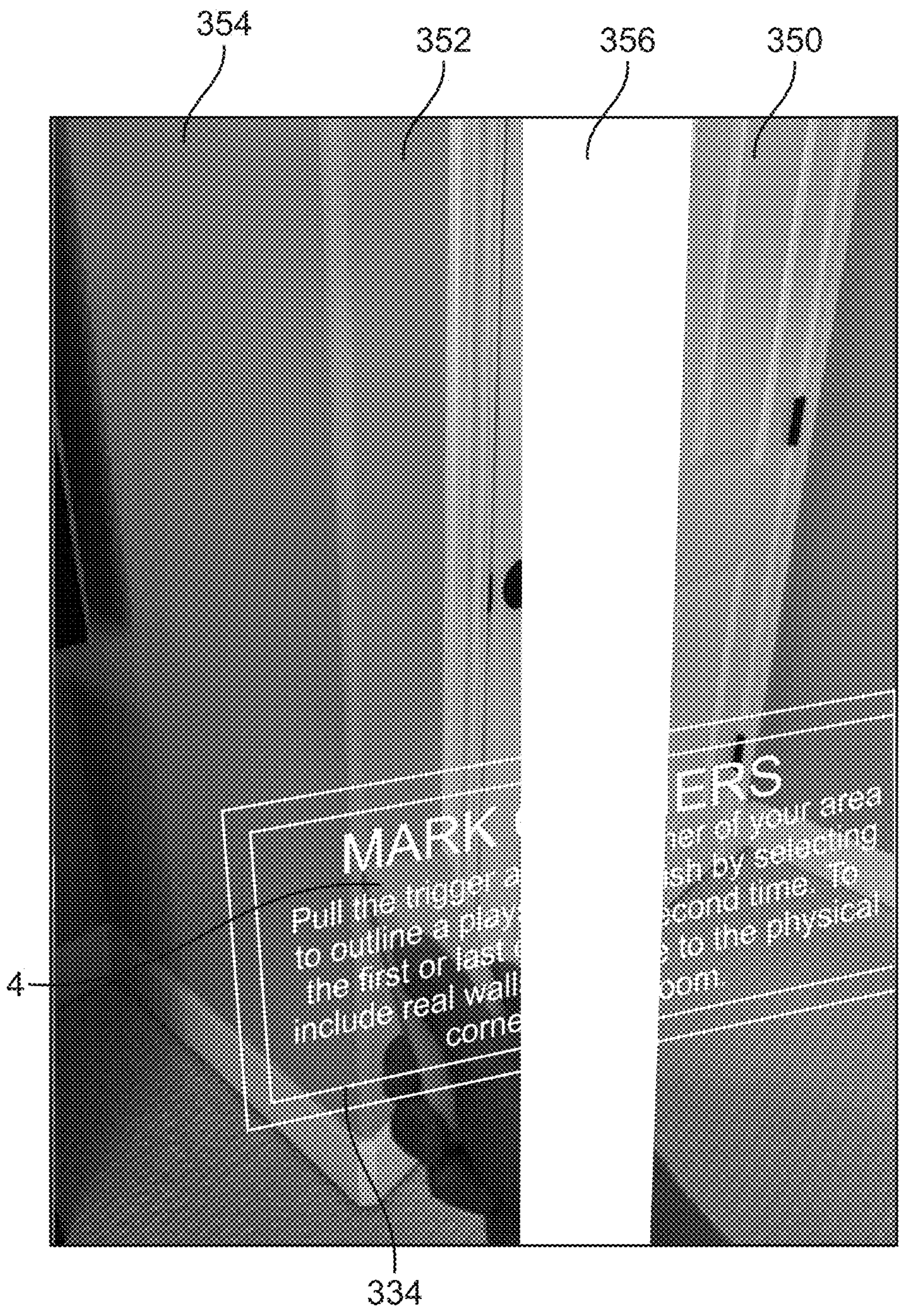

Referring to FIG. 14C, a view through a user's augmented reality viewing interface is shown with features of the actual room (here a door 350, part of a wall 352, part of another wall 354 that appears perpendicularly oriented) visible along with a virtual presented instruction box 334 presented to the user. Part of a handheld controller 4 system component is also shown. A highlighted virtual marker 356 is shown to the user as he selects a corner.

Figure 14D:
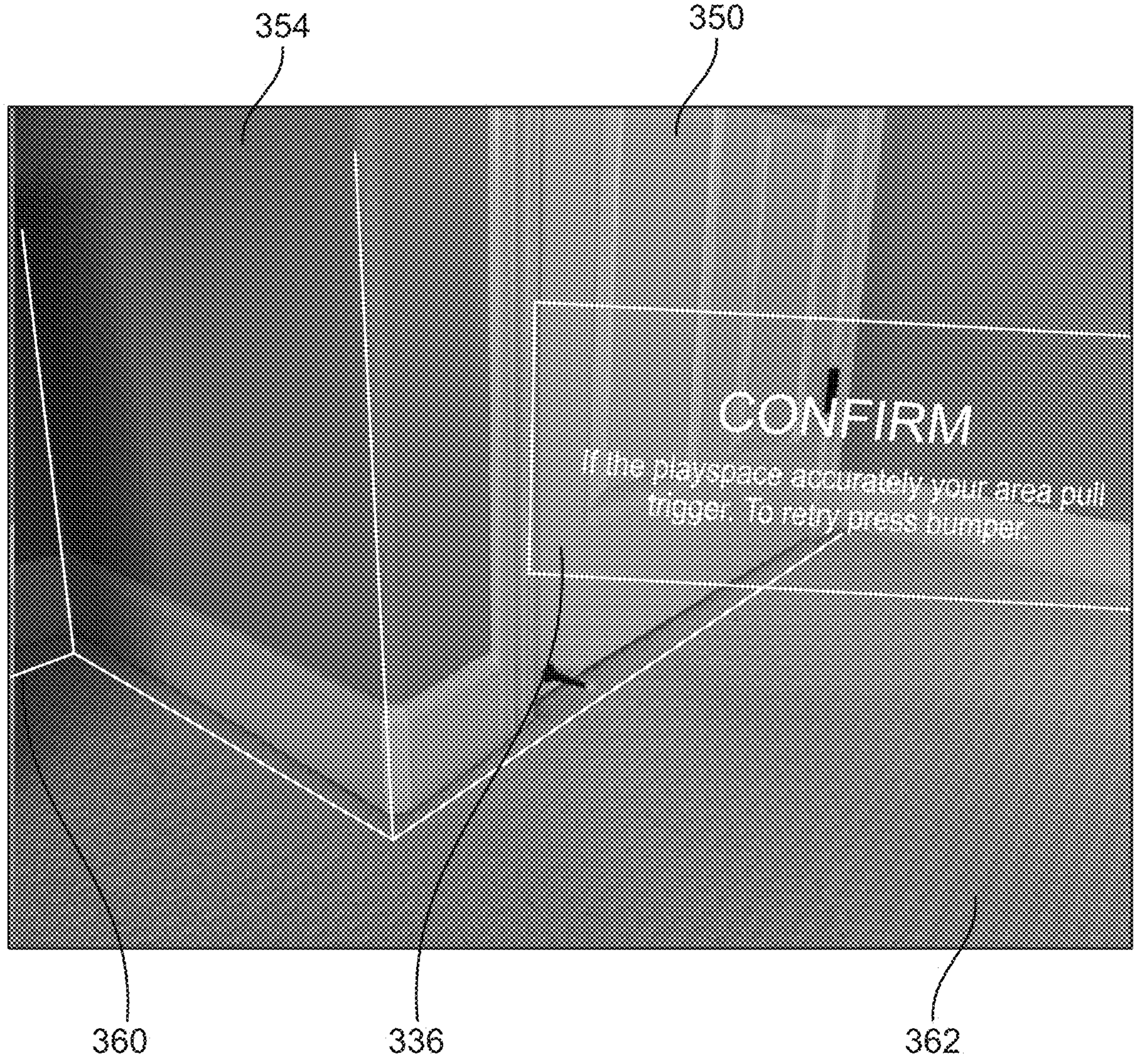
Figure 14E:
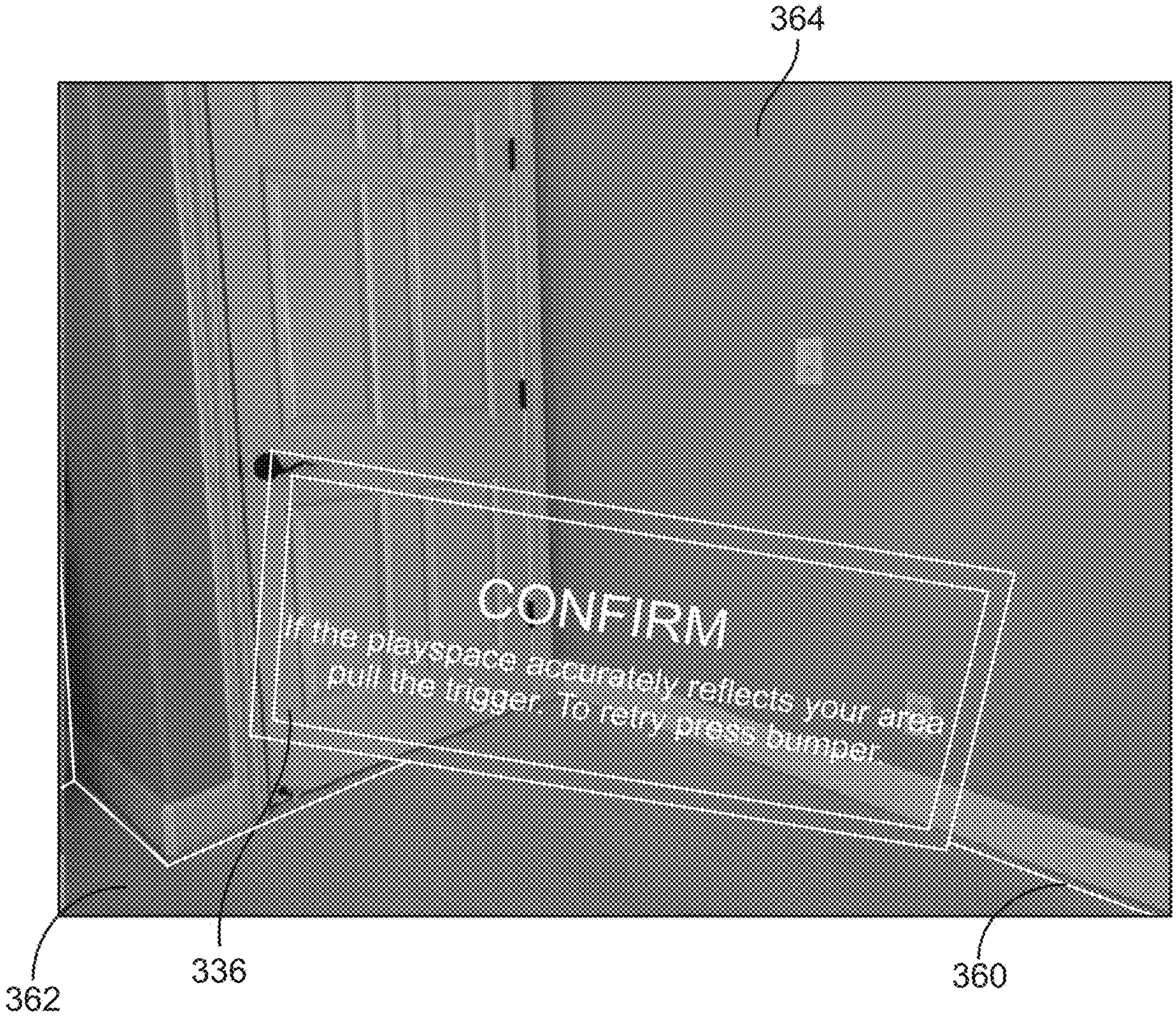
Figure 14F:
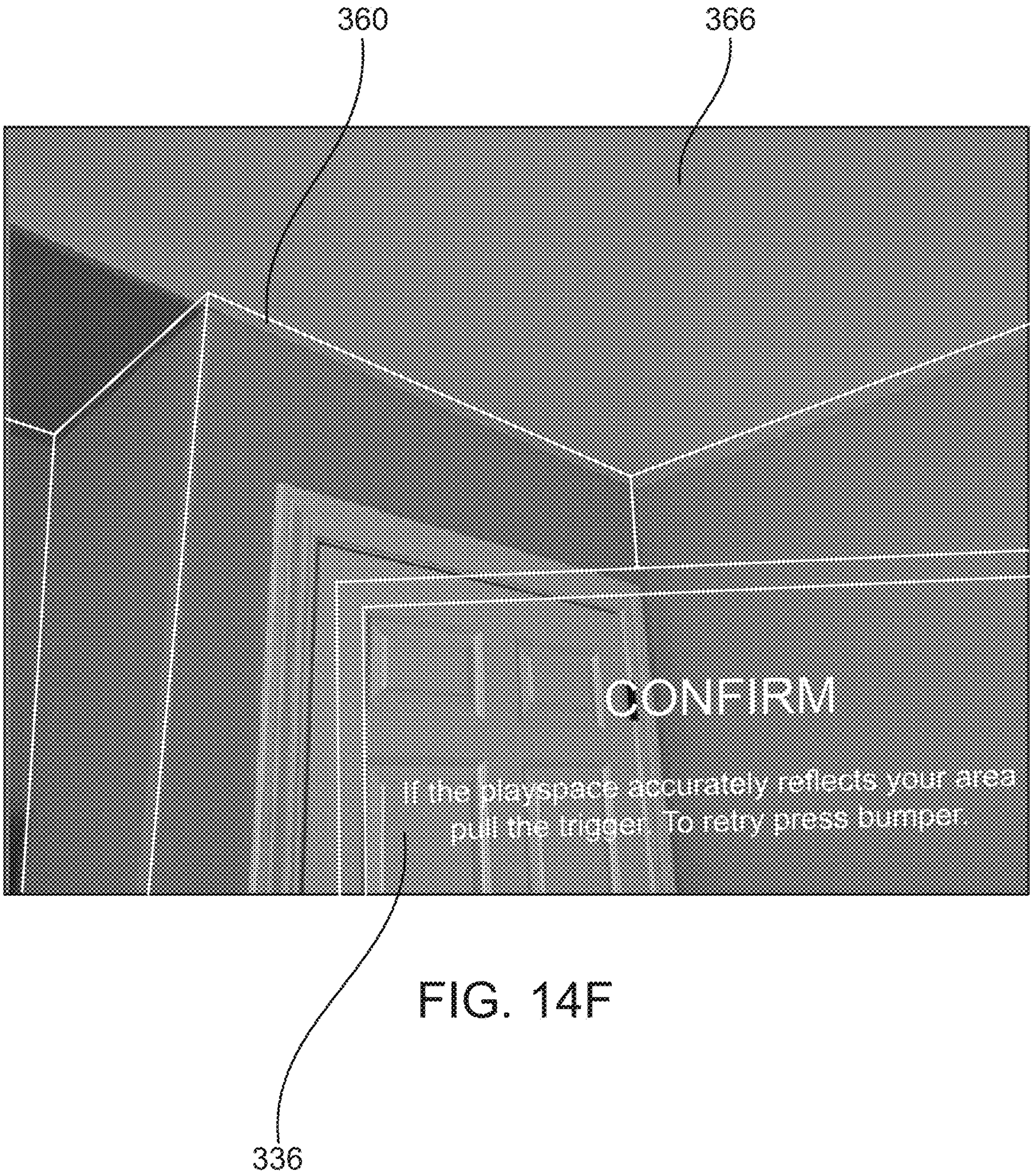
Figure 14G:
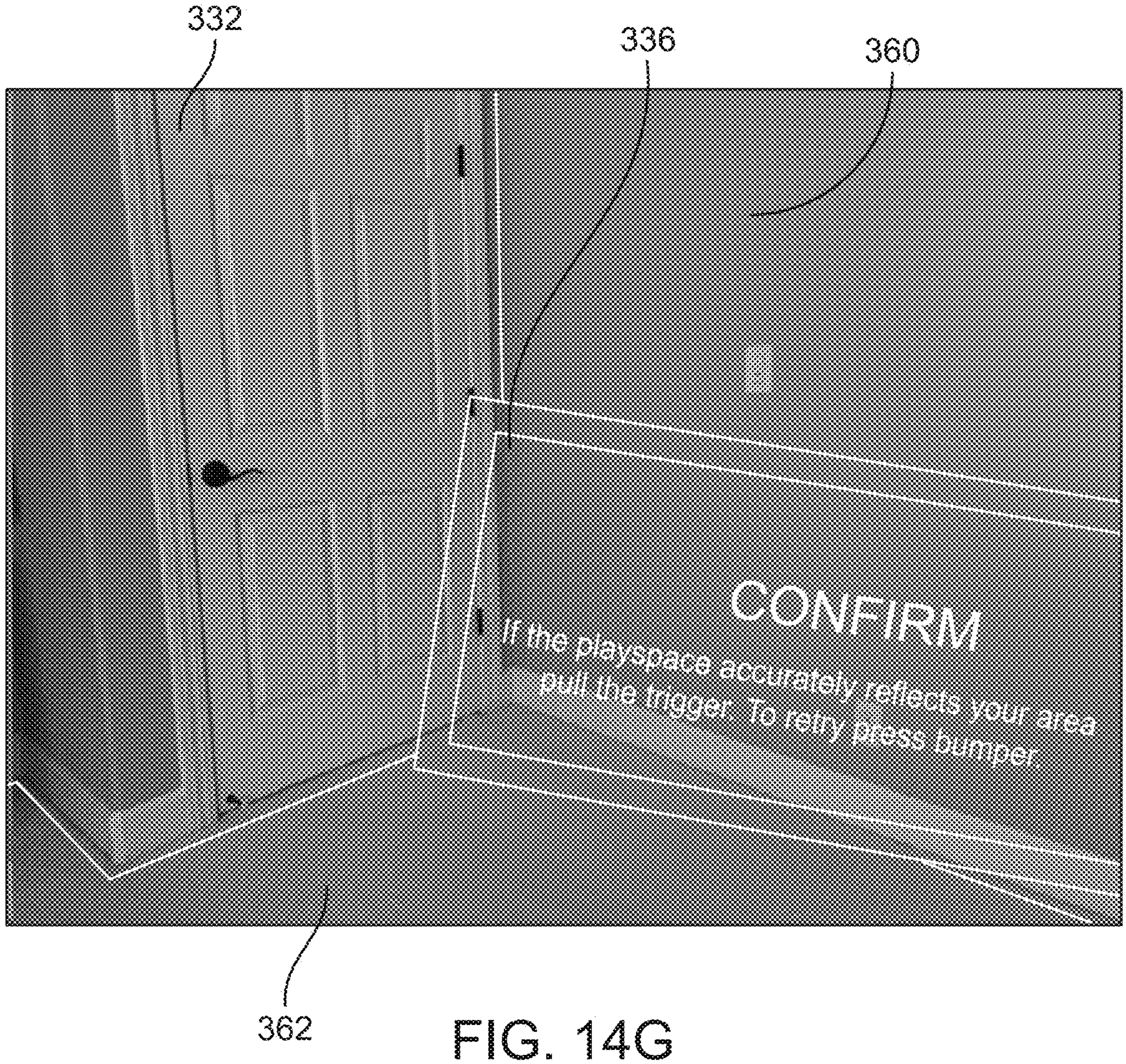
Figure 14H:
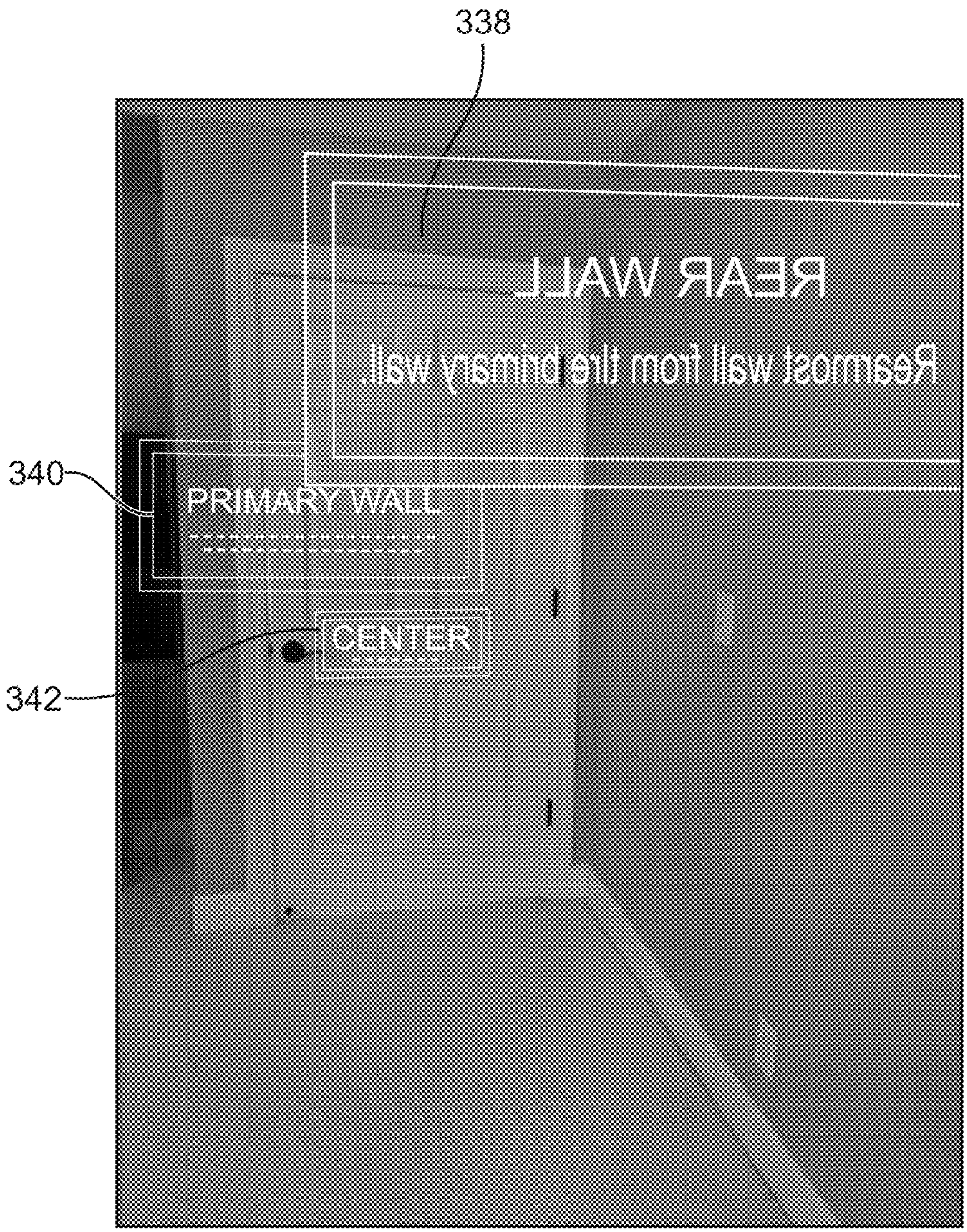
Figure 14I:

After all of the corners have been selected, referring to FIG. 14D, a wireframe virtual visualization of the created PlaySpace 360 may be shown to the user (here displayed offset from the actual walls and floor 362), along with a virtual instruction box regarding user confirmation 336. FIG. 14E illustrates other areas of the same actual room 364 with the depicted virtual confirmation wireframe (360; again, shown offset from the actual corners of the room). FIG. 14F illustrates other areas of the same actual room (including the ceiling 366) with the depicted virtual confirmation wireframe 360. FIG. 14G illustrates other areas of the same actual room (including the floor 362 and a door 332) with the depicted virtual confirmation wireframe 360. With the PlaySpace confirmed for use by the user, FIGS. 14H-141 illustrate labelling for the various walls ("Primary Wall" 340, "Rear Wall" 338, "Center" of primary wall 342, and "Right Wall" 344, also viewable in actual form 368 through the augmented reality viewing interface). With the PlaySpace created, any application for the subject augmented reality/spatial computing platform can specifically seek and utilize the labelled items, such as the Primary Wall. For example, a developer may write an app to do the functional equivalent of: "from the Playspace, place a picture in the center of the Primary wall".

Processing Unit

Figure 15:
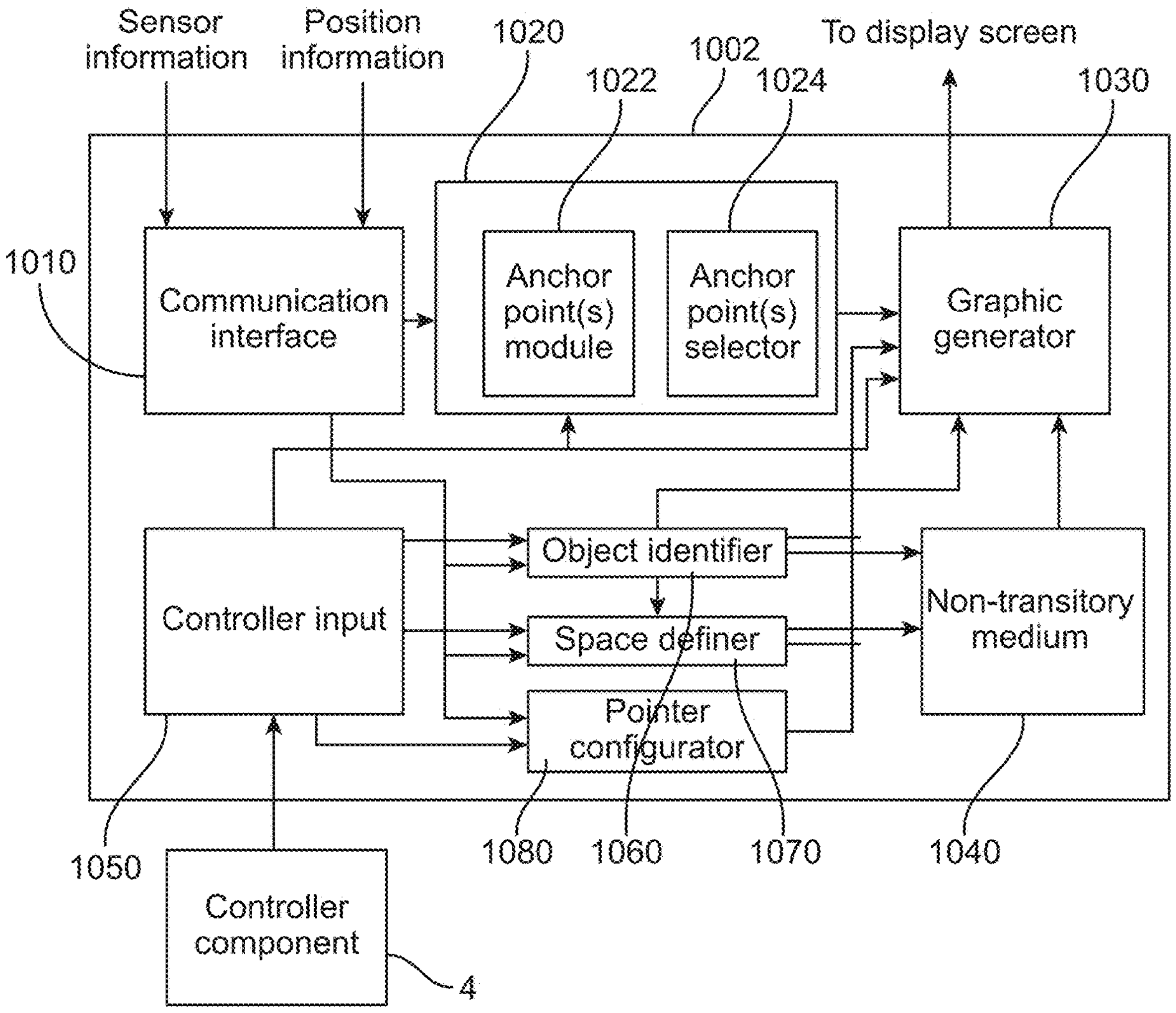
FIG. 15 illustrates a processing unit of an apparatus in accordance with some embodiments.

FIG. 15 illustrates a processing unit 1002 in accordance with some embodiments. The processing unit 1002 may be an example of the apparatus 7 described herein in some embodiments. In other embodiments, the processing unit 1002 or any part of the processing unit 1002 may be implemented using separate devices that are in communication with each other. As shown in the figure, the processing unit 1002 includes a communication interface 1010, a positioner 1020, a graphic generator 1030, a non-transitory medium 1040, a controller input 1050, an object identifier 1060, a space definer 1070, and a pointer configurator 1080. In some embodiments, the communication interface 1010, the positioner 1020, the graphic generator 1030, the non-transitory medium 1040, the controller input 1050, the object identifier 1060, the space definer 1070, the pointer configurator 1080, or any combination of the foregoing, may be implemented using hardware. By means of non-limiting examples, the hardware may include one or more FPGA processors, one or more ASIC processors, one or more signal processors, one or more math processors, one or more integrated circuits, or any combination of the foregoing. In some embodiments, any components of the processing unit 1102 may be implemented using software.

In some embodiments, the processing unit 1002 may be implemented as separate components that are communicatively coupled together. For example, the processing unit 1002 may have a first substrate carrying the communication interface 1010, the positioner 1020, the graphic generator 1030, the controller input 1050, the object identifier 1060, the space definer 1070, and the pointer configurator 1080, and another substrate carrying the non-transitory medium 1040. As another example, all of the components of the processing unit 1002 may be carried by a same substrate. In some embodiments, any, some, or all of the components of the processing unit 1002 may be implemented at the image display device 2. In some embodiments, any, some, or all of the components of the processing unit 1002 may be implemented at a device that is away from the image display device 2, such as at the handheld control component 4, the control component 6, a cell phone, a server, etc. In further embodiments, the processing unit 1002, or any of the components of the processing unit 1002 (such as the positioner 1020), may be implemented at different display devices worn by different respective users, or may be implemented at different devices associated with (e.g., in close proximity with) different respective users.

The processing unit 1002 is configured to receive position information (e.g., from sensors at the image display device 2, or from an external device) and/or control information from the controller component 4, and to provide virtual content for display in the screen of the image display device 2 based on the position information and/or the control information. In some embodiments, the position information may indicate a position of the user, and the control information from the controller 4 may indicate a position of the controller 4 and/or an action being performed by the user via the controller 4. In such cases, the processing unit 1002 generates an image of the virtual object based on the position of the user and the control information from the controller 4.

Returning to FIG. 15, the communication interface 1010 is configured to receive position information. As used in this specification, the term "position information" refers to any information representing a position of an entity or any information that can be used to derive a position of the entity. In some embodiments, the communication interface 1010 is communicatively coupled to a camera and/or depth sensor(s) of the image display device 2. In such embodiments, the communication interface 1010 receives camera images (as position information) from the camera, and/or depth signals from the depth sensor(s). In some embodiments, the communication interface 1010 may be coupled to another device, such as another processing unit, which processes images from a camera, and/or processes depth signals from the depth sensor(s), before passing them as position information to the communication interface 1010. In other embodiments, the communication interface 1010 may be configured to receive GPS information, or any information that can be used to derive a position. Also, in some embodiments, the communication interface 1010 may be configured to obtain the position information output wirelessly or via physical conductive transmission line(s).

In some embodiments, if there are different sensors at the image display device 2 for providing different types of sensor outputs, the communication interface 1010 of the processing unit 1002 may have different respective sub-communication interfaces for receiving the different respective sensor outputs. In some embodiments, the sensor output may include image(s) captured by a camera at the image display device 2. Alternatively or additionally, the sensor output may include distance data captured by depth sensor(s) at the image display device 2. The distance data may be data generated based on time-of-flight technique. In such cases, a signal generator at the image display device 2 transmits a signal, and the signal reflects off from an object in an environment around the user. The reflected signal is received by a receiver at the image display device 2. Based on the time it takes for the signal to reach the object and to reflect back to the receiver, the sensor or the processing unit 1002 may then determine a distance between the object and the receiver. In other embodiments, the sensor output may include any other data that can be processed to determine a location of an entity (the user, an object, etc.) in the environment.

The positioner 1020 of the processing unit 1002 is configured to determine a position of the user of the image display device, and/or to determine position of a virtual object to be displayed in the image display device. In some embodiments, the position information received by the communication interface 1010 may be sensor signals, and the positioner 1020 is configured to process the sensor signals to determine a position of the user of the image display device. For example, the sensor signals may be camera images captured by one or more cameras of the image display device. In such cases, the positioner 1020 of the processing unit 1002 is configured to determine a localization map based on the camera images, and/or to match features in a camera image with features in a created localization map for localization of the user. In other embodiments, the position information received by the communication interface 1010 may already indicate a position of the user. In such cases, the positioner 1020 then uses the position information as the position of the user.

In other embodiments, the processing unit 1002 is configured to obtain both sensor information and position information via the communication interface 1010. In such cases, the sensor information may be any information provided by a sensor, such as a camera, a depth sensor, etc., and the position information may be any information relating to a position of the user (or the image display device 2 being worn by the user) with respect to a certain coordinate system associated with the environment.

As shown in FIG. 15, the positioner 1020 includes an anchor point(s) module 1022 and an anchor point(s) selector 1024. The anchor point(s) module 1022 is configured to determine one or more anchor points, which may be utilized by the processing unit 1002 to localize the user, and or to place a virtual object with respect to an environment surround the user. In some embodiments, the anchor points may be points in a localization map, wherein each point in the localization map may be a feature (e.g., corner, edge, an object, etc.) identified in the physical environment. Also, in some embodiments, each anchor point may be a persistent coordinate frame (PCF) determined previously or in a current session. In some embodiments, the communication interface 1010 may receive the previously determined anchor point(s) from another device. In such cases, the anchor point(s) module 1022 may obtain the anchor point(s) by receiving the anchor point(s) from the communication interface 1010. In other embodiments, the anchor point(s) may be stored in the non-transitory medium 1040. In such cases, the anchor point(s) module 1022 may obtain the anchor point(s) by retrieving the anchor point(s) from the non-transitory medium 1040. In further embodiments, the anchor point(s) module 1022 may be configured to determine the anchor point(s) in a map creation session. In the map creation session, the user wearing the image display device walks around in an environment and/or orient the image display device at different viewing angles so that the camera(s) of the image display device captures images of different features in the environment. The processing unit 1002 may then perform feature identification to identify one or more features in the environment for use as anchor point(s). In some embodiments, anchor points for a certain physical environment were already determined in a previous session. In such cases, when the user enters the same physical environment, the camera(s) at the image display device being worn by the user will capture images of the physical environment. The processing unit 1002 may identify features in the physical environment, and see if one or more of the features match with the previously determined anchor points. If so, then the matched anchor points will be made available by the anchor point(s) module 1022, so that the processing unit 1002 can use those anchor point(s) for user localization and/or for placement of virtual content.

Also, in some embodiments, as the user moves around in the physical environment, the anchor point(s) module 1022 of the processing unit 1002 will identify additional anchor point(s). For example, when the user is at a first position in an environment, the anchor point(s) module 1022 of the processing unit 1002 may identify anchor points AP1, AP2, AP3 that are in close proximity to the first position of the user in the environment. If the user moves from a first position to a second position in the physical environment, the anchor point(s) module 1022 of the processing unit 1002 may identify anchor points AP3, AP4, AP5 that are in close proximity to the second position of the user in the environment.

In addition, in some embodiments, the anchor point(s) module 1022 is configured to obtain anchor point(s) associated with multiple users. For example, two users in the same physical environment may be standing far apart from each other. The first user may be at a first location with a first set of anchor points associated therewith. Similarly, the second user may be at a second location with a second set of anchor points associated therewith. Because the two users are far from each other, initially, the first set and the second set of anchor points may not have any overlap. However, when one or both of the users move towards each other, the makeup of the anchor points in the respective first and second sets will change. If they are close enough, the first and second sets of the anchor points will begin to have overlap(s).

The anchor point(s) selector 1024 is configured to select a subset of the anchor points (provided by the anchor point(s) module 1022) for use by the processing unit 1002 to localize the user, and or to place a virtual object with respect to an environment surround the user. In some embodiments, if the anchor point(s) module 1022 provides multiple anchor points that are associated with a single user, and there is no other user involved, then the anchor point(s) selector 1024 may select one or more of the anchor points for localization of the user, and/or for placement of virtual content with respect to the physical environment. In other embodiments, the anchor point(s) module 1022 may provide multiple sets of anchor points that are associated with different respective users (e.g., users wearing respective image display devices), who desire to virtually interact with each other in the same physical environment. In such cases, the anchor point(s) selector 1024 is configure to select one or more common anchor points that are in common among the different sets of anchor points. The processing unit 1002 may then utilize the selected common anchor point(s) for placement of virtual content, so that the users can interact with the virtual content in the same physical environment.

Returning to FIG. 15, the controller input 1050 of the processing unit 1002 is configured to receive input from the controller component 4. The input from the controller component 4 may be position information regarding a position and/or orientation of the controller component 4, and/or control information based on user's action performed via the controller component 4. By means of non-limiting examples, the control information from the controller component 4 may be generated based on the user translating the controller component 4, rotating the controller component 4, pressing one or more buttons on the controller component 4, actuating a knob, a trackball, or a joystick on the controller component 4, or any combination of the foregoing. In some embodiments, the user input is utilized by the processing unit 1002 to insert and/or to move the virtual object being presented in the screen of the image display device 2. In some embodiments, the handheld controller component 4 may be configured to move the virtual object in the two-dimensional display screen so that the virtual object will appear to be in motion in a virtual three-dimensional space. For example, in addition to moving the virtual object up, down, left, and right, the handheld controller component 4 may also move the virtual object in and out of a vision depth of the user.

The graphic generator 1030 is configured to generate graphics for display on the screen of the image display device 2 based at least in part on an output from the positioner 1020 and/or output from the controller input 1050. For example, the graphic generator 1030 may control the screen of the image display device 2 to display a virtual object such that the virtual object appears to be in the environment as viewed by the user through the screen. By means of non-limiting examples, the virtual object may be a virtual moving object (e.g., a ball, a shuttle, a bullet, a missile, a fire, a heatwave, an energy wave), a weapon (e.g., a sword, an axe, a hammer, a knife, a bullet, etc.), any object that can be found in a room (e.g., a pencil, paper ball, cup, chair, etc.), any object that can be found outside a building (e.g., a rock, a tree branch, etc.), a vehicle (e.g., a car, a plane, a space shuttle, a rocket, a submarine, a helicopter, a motorcycle, a bike, a tractor, an all-terrain-vehicle, a snowmobile, etc.), etc. Also, in some embodiments, the graphic generator 1030 may generate an image of the virtual object for display on the screen such that the virtual object will appear to be interacting with the real physical object in the environment. For example, the graphic generator 1030 may cause the screen to display the image of the virtual object in moving configuration so that the virtual object appears to be moving through a space in the environment as viewed by the user through the screen of the image display device 2. Also, in some embodiments, the graphic generator 1030 may cause the screen to display the image of the virtual object so that the virtual object appears to be deforming or damaging the physical object in the environment, or appears to be deforming or damaging another virtual object, as viewed by the user through the screen of the image display device 2. In some cases, such may be accomplished by the graphic generator 1030 generating an interaction image, such as an image of a deformation mark (e.g., a dent mark, a fold line, etc.), an image of a burnt mark, an image showing a heat-change, an image of a fire, an explosion image, a wreckage image, etc., for display by the screen of the image display device 2.

It should be noted that the above technique of placing virtual content based on anchor point(s) that is in close proximity to the action of the virtual content is not limited to gaming involving two users. In other embodiments, the above technique of placing virtual content may be applied in any application (which may or may not be any gaming application) involving only a single user, or more than two users. For example, in other embodiments, the above technique of placing virtual content may be utilized in an application that allows a user to place a virtual content that is far away from the user in the physical environment. The above technique of placing virtual content is advantageous because it allows the virtual content to be accurately placed virtually with respect to the user (as viewed by the user through the screen the user is wearing) even if the virtual content is far (e.g., more than 5 ft, more than 10 ft, more than 15 ft, more than 20 ft, etc.) from the user.

As discussed with reference to FIG. 15, the processing unit 1002 includes the non-transitory medium 1040 that is configured to store anchor points information. By means of non-limiting examples, the non-transitory medium 1040 may store positions of the anchor points, different sets of anchor points that are associated with different users, a set of common anchor point(s), selected common anchor point(s) for localization of user and/or for placement of virtual content, etc. The non-transitory medium 1040 may store other information in other embodiments. In some embodiments, the non-transitory medium 1040 may store different virtual contents, which may be retrieved by the graphic generator 1030 for presentation to the user. In some cases, certain virtual contents may be associated with a gaming application. In such cases, when the gaming application is activated, the processing unit 1002 may then access the non-transitory medium 1040 to obtain the corresponding virtual contents for the gaming application. In some embodiments, the non-transitory medium may also store the gaming application, and/or parameters associated with the gaming application.

The non-transitory medium 1040 is not limited to a single storage unit, and may include multiple storage units, either integrated, or separated but communicatively connected (e.g., wirelessly or by conductors).

In some embodiments, as the virtual object moves virtually through the physical environment, the processing unit 1002 keeps track of the position of the virtual object with respect to one or more objects identified in the physical environment. In some cases, if the virtual object comes into contact, or in close proximity, with the physical object, the graphic generator 1030 may generate graphics to indicate an interaction between the virtual object and the physical object in the environment. For example, the graphics may indicate that the virtual object is deflected off from a physical object (e.g., a wall) or from another virtual object by changing a traveling path of the virtual object. As another example, if the virtual object comes into contact with a physical object (e.g., a wall) or with another virtual object, the graphic generator 1030 may place an interaction image in spatial association with the location at which the virtual object contacts the physical object or the other virtual object. The interaction image may indicate that the wall is cracked, is dented, is scratched, is made dirty, etc.

In some embodiments, different interaction images may be stored in the non-transitory medium 1040 and/or may be stored in a server that is in communication with the processing unit 1002. The interaction images may be stored in association with one or more attributes relating to interaction of two objects. For example, an image of a wrinkle may be stored in association with an attribute "blanket". In such cases, if the virtual object is displayed as being supported on a physical object that has been identified as a "blanket", then the graphic generator 1030 may display the image of the wrinkle between the virtual object and the physical object as viewed through the screen of the image display device 2, so that the virtual object appears to have made the blanket wrinkled by sitting on top of the blanket.

It should be noted that the virtual content that can be displayed virtually with respect to the physical environment based on one or more anchor points is not limited to the examples described, and that the virtual content may be other items. Also, as used in this specification, the term "virtual content" is not limited to virtualized physical items, and may refer to virtualization of any items, such as virtualized energy (e.g., a laser beam, sound wave, energy wave, heat, etc.). The term "virtual content" may also refer to any content, such as text, symbols, cartoon, animation, etc.

Object Identifier

As shown in FIG. 9, the processing unit 1002 also includes the object identifier 1060. The object identifier 1060 of the processing unit 1002 is configured to identify one or more objects in the environment based on one or more detected features. For example, in some embodiments, the communication interface 1010 may obtain a camera image from a camera as sensor information. The camera image may include an image of an object in an environment surrounding the user. In one implementation, the object identifier 1060 may include a surface detector configured to analyze the camera image to detect a surface of the object. The surface detector may also determine an orientation and/or an elevation of the surface of the object. The object identifier 1060 may make an identification for the object based on the orientation and/or the elevation of the surface of the object. The object identifier 1060 may operate or control the graphic generator 1030 to generate an identifier indicating the identification for the object for display by a screen (of image display device 2. The screen of the image display device 2 is configured to display the identifier at a location in the screen, such that when the user views the object in the environment through the screen, the identifier will be in a spatial relationship with respect to the object.

In some embodiments, the object identifier 1060 may be configured to identify the object as a wall if the orientation of the surface of the object is substantially vertical, and if the elevation of the surface of the object is above an elevation threshold (e.g., 3 ft, 4 ft, 5 ft, etc.). In some embodiments, the surface of the object is considered "substantially vertical" if the surface lies within a plane that forms an angle with a horizon, wherein the angle is any value within the range of 90 degrees +/−10 degrees.

Also, in some embodiments, the object identifier 1060 may be configured to identify the object as a floor if the orientation of the surface of the object is substantially horizontal, and if the elevation of the surface of the object is below an elevation threshold (e.g., 2 ft, 1 ft, 6 inches, 3 inches, 2 inches, etc.). In some embodiments, the surface of the object is considered "substantially horizontal" if the surface lies within a plane that forms an angle with a horizon, wherein the angle is any value within the range of 0 degrees +/−10 degrees.

Also, in some embodiments, the object identifier 1060 is configured to identify the object as a furniture (e.g., table top, counter top, chair surface, stool, etc.) if the orientation of the surface of the object is substantially horizontal, and if the elevation of the surface of the object is above a first elevation threshold (e.g., 3 inches, 6 inches, 1 ft, etc.) and is below a second elevation threshold (e.g., 5 ft, 4 ft, 3 ft, etc.).

In some embodiments, the object identifier 1060 is configured to obtain an input indicating a selection of the object for which the identification of the object is to be determined. For example, in some embodiments, the input may comprise a user input generated via the controller component 4, wherein the user input indicates the selection of the object. In some cases, the screen of the image display device 2 may display a cursor. In such cases, the user may operate the cursor (e.g., move the cursor, use the cursor to select an object, etc.) using the controller component 4. For examples, if the controller component 4 include a touch pad, a track ball, or a joystick, etc., the user may operate any of these user controls to operate the cursor being displayed on the screen of the image display device 2. The user may move the cursor on the screen so that it appears touching a physical object in the environment surrounding the user as viewed through the screen of the image display device 2. The user may also operate a button or a touch sensitive control to select the object. The controller component 4 may generate the user input indicating a cursor position of the cursor in the screen, and the object identifier 1060 may obtain the user input indicating the cursor position, and may be configured to determine the object in the environment being selected based on the cursor position.

In other embodiments, the processing unit 1002 may be configured to obtain an orientation and/or a position of the controller component 4 as the user input. For example, in some embodiments, the system 1 may include an orientation sensor configured to sense an orientation of the controller component 4 and/or a position sensor configured to sense a position of the controller component 4. The orientation sensor and/or the position sensor may be implemented at the controller component 4, at the image display device 2, or at another component of the system 1. The processing unit 1002 is configured to obtain the user input indicating the orientation and/or position of the controller component 4, and adjust a position of a cursor being displayed on the screen of the image display device 2. For example, the user may move the controller component 4 by translating it across a space, and/or may rotate (e.g., tilt) the controller component 4. In response, the processing unit 1002 adjusts a position of the cursor being displayed on the screen of the image display device 2. The user may position the cursor over an object in the environment as viewed through the screen of the image display device 2 to select the object. In some embodiments, the object identifier 1060 is configured to determine the object in the environment being selected based on a direction of pointing by the controller component 4 towards the object in the environment. Also, in some embodiments, the object identifier 1060 is configured to obtain an input indicating a selection of the object for which the identification of the object is to be determined. For example, in some embodiments, the user may operate a button or a touch sensitive control to select the object. The controller component 4 may generate the user input indicating a cursor position of the cursor in the screen, and the object identifier 1060 may obtain the user input indicating the cursor position, and may be configured to determine the object in the environment being selected based on the cursor position.

In some embodiments, the image display device 2 may include a camera. In such cases, the object identifier 1060 may be configured to select the object for identification based on a presence of an image of the object in a camera image provided by the camera. In some embodiments, the object identifier 1060 may be configured to select the object automatically for object identification. In one implementation, the object identifier 1060 may be configured to select the object in response to the object being presence in a sequence of camera images (generated by a camera of the image display device 2) that comprise the camera image within a duration exceeding a time threshold.

It should be noted that the object that may be identified by the object identifier 1060 is not limited to the examples mentioned, and that the object identifier 1060 may identify other objects based on features of the objects. By means of non-limiting examples, the object identifier 1060 may be configured to identify a cabinet, a book shelf, a television, a fireplace, etc., or any of other items in a building structure. The object identifier 1060 may also be configured to identify life subject, such as a person, a plant, an animal, etc. Furthermore, the object identifier 1060 may also be configured to identify objects outside a building structure, such as a road sign, a streetlamp, a postbox, a vehicle, etc.

Also, in some embodiments, the feature(s) that object identifier 1060 can use to identify object(s) may include color of the object, surface texture of the object, shape of the object, size of the object, etc. In some embodiments, the object identifier 1060 may use any of these features in combination with an orientation and/or an elevation of a detected surface of the object to identify the object. In other embodiments, the object identifier 1060 may use any of these features without the orientation and the elevation of a surface of the object to identify the object.

In addition, in some embodiments, instead of detecting only one surface of an object, and determining an orientation and/or elevation of the one surface, the processing unit 1002 may be configured to detect multiple surfaces of the object, and determine respective orientations and/or respective elevations for the multiple surfaces of the object. In one implementation, the processing unit 1002 may be configured to receive a user input indicating a selected object in the environment surrounding the user, and determine multiple surfaces of the object. For example, the processing unit 1002 may identify several surfaces of the object within a certain region to gather enough information so that the identity of the object can be determined by the processing unit 1002. In some embodiments, the object identifier 1060 may be configured to detect an edge of a surface of an object, and/or a corner of an object. The object identifier 1060 may be configured to make an identification of the object based on the detected edge and/or corner of the object.

In the above embodiments, the processing unit 1002 is described in reference to identifying an object being selected by a user of the image display device 2. In other embodiments, the processing unit 1002 may identify an object in the environment surrounding the user as viewed through the screen of the image display device 2 without requiring the user to provide an explicit user input to select the object. For example, in some embodiments, the object identifier 1060 may be configured to obtain camera images provided by a camera of the image display device 2, wherein the camera is configured to continuously generate a sequence of camera images of objects in the environment as the user moves in the environment. The camera images may be sensor information obtained by the processing unit 1002 via the communication interface 1010. The object identifier 1060 may be configured to automatically identify one or more objects in the environment as they appear in the camera image(s). For example, the object identifier 1060 may be configured to perform surface detection, corner detection, edge detection, color detection, texture detection, etc., to identify the object. In some embodiments, the object identifier 1060 may be configured to provide identification(s) of the object(s) to the graphic generator 1030, which generates object identification(s) for display by the screen of the image display device 2. The object identification(s) may be displayed in the screen in association with the corresponding object(s) in the environment, so that when the user views the object identification(s) in the screen together with the object(s) in the environment (as viewed through the screen), the object identification(s) will appear in spatial association with the object(s). For example, an object identification may be displayed in the screen so that it appears to be superimposed over the real physical object, next to the real physical object (e.g., within a certain pre-determined distance from the real physical object, such as 1 inch, 2 inches, 3 inches, 3 pixel distances, 5 pixel distances, etc.). Furthermore, in some embodiments, the displayed object identification(s) in the screen may move in the screen in correspondence with a movement of the user, such that when the user moves, the displayed object identification(s) will appear to follow the object(s) being viewed through the screen. This feature is advantageous because it provides object identification(s) for respective real physical object(s) in such a way that the object identification(s) appears to be a part of the real physical object(s).

It should be noted that the object identifier 1060 is not limited to identifying objects in the environment based on camera images, and that the object identifier 1060 may be configured to identify objects in the environment based on any of other types of sensor information. For example, in other embodiments, the image display device 2 may include a depth sensor for sensing depths or distances between an object in front of the depth sensor and the depth sensor. In such cases, the object identifier 1060 may be configured to identify the object based on the sensed depths or distances. In further embodiments, the image display device 2 may include a gaze detector for detecting an eye gaze direction of the user of the image display device 2. In such cases, the object identifier 1060 may be configured to identify the object based on one or more sensor inputs provided by the gaze detector indicating the eye gaze direction.

In some embodiments, the object identifier 1060 may provide output to the graphic generator 1030 so that the graphic generator 1030 can generate graphics based on the output, and/or may provide output to the non-transitory medium 1040 for storage. Any information determined by the object identifier 1060 may be provided to the graphic generator 1030 and/or to the non-transitory medium 1040. For example, in some embodiments, the object identifier 1060 may provide information regarding an identified object in the physical environment. In such cases, the object identifier 1060 may provide information regarding the identified object to the graphic generator 1030. The graphic generator 1030 may then generate a graphic based on the information regarding the identified object, so that the graphic can be displayed on the screen of the image display device 2. As an example, the information regarding the identified object may be an identity of the object, and the graphic may indicate the identity of the object. As another example, the information regarding the identified object may be a shape of the object, and the graphic may indicate the shape of the object. The information regarding the identified object may also be stored in the non-transitory medium 1040.

In some embodiments, the processing unit 1002 (e.g., the object identifier 1060) may be configured to provide any of the features described with reference to FIGS. 4-5.

In other embodiments, the object identifier 1060 is optional, and the processing unit 1002 does not include the object identifier 1060.

Space Definer

As shown in FIG. 15, the processing unit 1002 also includes the space definer 1070. The space definer 1070 is configured to define a virtual space, in which one or more virtual content may be provided. For examples, in some embodiments, the space definer 1070 may be configured to define a virtual wall for the virtual space. Alternatively or additionally, the space definer 1070 may be configured to define a corner for the virtual space, and/or a wall edge for the virtual space.

In some embodiments, the virtual wall is offset from a real physical wall in the environment surrounding the user. In other embodiments, the virtual wall may be aligned with, or intersects, a real physical wall in the environment surrounding the user. Similarly, in some embodiments, the corner (virtual corner) for the virtual space may be offset from a real physical corner in the environment surrounding the user. In other embodiments, the corner for the virtual space may be aligned with a real physical corner in the environment surrounding the user. Also, in some embodiments, the edge (virtual edge) for the virtual space may be offset from a real physical edge in the environment surrounding the user. In other embodiments, the edge for the virtual space may be aligned with a real physical edge in the environment surrounding the user.

In some embodiments, the screen of the image display device 2 may be configured to display a wall identifier at a location in the screen, such that when the user views the virtual wall of the virtual space, the wall identifier will be in a spatial relationship with respect to the virtual wall. Also, in some embodiments, the screen of the image display device 2 may be configured to display a corner identifier at a location in the screen, such that when the user views the virtual corner of the virtual space, the corner identifier will be in a spatial relationship with respect to the virtual corner. In addition, in some embodiments, the screen of the image display device 2 may be configured to display an edge identifier at a location in the screen, such that when the user views the virtual edge of the virtual space, the edge identifier will be in a spatial relationship with respect to the virtual edge.

It should be noted that the space definer 1070 is not limited to defining one virtual wall for the virtual space, and that the space definer 1070 may define multiple walls for the virtual space. For example in some embodiments, the space definer 1007 is configured to define a plurality of virtual walls for the virtual space, and the screen of the image display device 2 is configured to display wall identifiers for the respective virtual walls. Also, the virtual wall for the virtual space is not limited to a wall having a rectilinear configuration. In other embodiments, the virtual wall for the virtual space may have a curvilinear configuration.

Various techniques may be employed by the processing unit 1002 to define the virtual space. In some embodiments, the space definer 1070 of the processing unit 1002 may be configured to use features in the physical environment surround the user to define the virtual space. In such cases, the space definer 1070 is configured to obtain a user input generated via the controller component 4, the user input indicating a selection of a feature (e.g., a wall, a wall corner, an edge, etc., or any combination of the foregoing) in the environment for defining at least a part of the virtual space. In some embodiments, the graphic generator 1030 may be configured to provide a graphics of a cursor for display by the screen of the image display device 2. In such cases, the user may operate the controller component 4 to move the cursor in the screen to select one or more features in the physical environment for defining the virtual space. For example, the user may translate and/or orient (e.g., tilt) the controller component 4 to move the cursor. As another example, the user may operate a user input controller (e.g., a touch sensitive region, a trackball, a joystick, etc.) at the controller component 4 to move the cursor. After the user has moved the cursor on the screen over the physical object in the environment as viewed through the screen, the user may operate the controller component 4 to select the object for defining the virtual space. For example, if a user sees a physical wall in the environment, and wants to define the virtual space to have the corresponding wall, the user may move the cursor on the screen so that the cursor appears to be superimposed over the physical wall in the environment (as viewed through the screen). The user may then press a button to select the physical wall that is virtually pointed at by the cursor. Thus, the user input obtained by the space definer 1070 for defining the virtual space indicates a cursor position in the screen. The space definer 1070 obtains the user input, and generates a virtual wall that corresponds with the selected physical wall. For example, the virtual wall may have a dimension (e.g., height, width) that corresponds (e.g., matches) with that of the physical wall.

In other embodiments, the controller component 4 may be operated as a pointer, which allows the user to select an object by pointing the pointer towards the object in the environment. In such cases, the user input obtained by the space definer 1070 indicates a position and/or an orientation of the controller component 4. The user may also operate a control at the controller component 4 to select the object being pointed at by the controller component 4. Thus, the selection of a feature in the environment for defining the virtual space may be based on a direction of pointing by the controller component 4 towards the feature in the environment.

In some embodiments, the space definer 1070 may be configured to define at least a part of the virtual space based on one or more camera images provided by a camera of the image display device 2. For example, the space definer 1070 may analyze the camera image to identify one or more items in the camera image. The item may be an image of a wall, an image of a corner, an image of an edge, etc., in the environment surrounding the user. The camera may be oriented in a forward facing direction with respect to the user, so that the view of the camera corresponds with the user's view of the environment through the screen. As the camera moves in the environment, the user can view different objects in the environment through the screen. The camera generates camera images that correspond with what the user is viewing through the screen. In some embodiments, if the screen of the image display device 2 displays a cursor or an image of a pointer, the space definer 1070 may be configured to determine which object in the environment the cursor or the pointer is pointing at, by analyzing the camera image with respect to the cursor position or the pointer position. For example, if the cursor position indicates that there is an image of a door in a camera image, then the space definer 1070 may determine that the cursor is pointing at the door in the physical environment surrounding the user. If the user selects the door while the cursor or the pointer is at the position of the image of the door in the camera image, the space definer 1070 may determine that the user is selecting the door for defining at least a part of the virtual space.

In other embodiments, the space definer 1070 may be configured to select a feature in the environment, for defining at least a part of the virtual space, based on a presence of an image of the feature in a camera image provided by the camera. For example, the space definer 1070 may detect an image of a wall in the camera image. In such cases, the space definer 1070 may select the wall automatically and may generate a virtual wall based on the selected wall. In one implementation, the space definer 1070 is configured to select the feature in response to the feature being presence in a sequence of camera images that includes the camera image within a duration exceeding a time threshold. For example, if the user's view is towards a wall, the camera of the image display device 2 will generate a sequence of camera images of the wall while the user's view is maintained towards the wall. If a duration of the viewing of the wall exceeds a certain predetermined time threshold (e.g., 3 seconds, 5 seconds, etc.), then the space definer 1070 may assume that the user wants to select the wall for defining at least a part of the virtual space. In such cases, the space definer 1070 may automatically selects the wall for defining at least a part of the virtual space. In some embodiments, the space definer 1070 may ask the user to confirm whether the selection of the wall is acceptable, before using the selected wall for defining the virtual space.

In some embodiments, after the virtual space has been defined by the space definer 1070, the processing unit 1002 may then provide virtual content for display in the defined virtual space by the screen of the image display device 2. In some embodiments, the graphic generator 1030 may be configured to provide the virtual content for interaction by only the user of the image display device 2. In other embodiments, the graphic generator 1030 may be configured to provide the virtual content for interaction by the user (first user) and an additional user (second user), such as that described with reference to FIGS. 10-11. For example, in some embodiments, the system 1 may be configured to connect the user and the additional user to the same defined virtual space so that the user and the additional user can interact with the virtual content at the same virtual space. In some embodiments, the graphic generator 1030 is configured to provide the virtual content for interaction by the user and the additional user in different respective rooms. In other embodiments, the graphic generator 1030 is configured to provide the virtual content for interaction by the user and the additional user in a same room.

In some embodiments, if the two users are in the same physical environment, the processing unit 1002 may be configured to register the user and the additional user to the environment so that the user and the additional user can interact with the virtual content while they are in the environment. In one implementation, the processing unit 1002 is configured to register the user and the additional user to the environment by determining one or more anchor points that are associated with a location of the user and a location of the additional user. For example, as a first user is moving in the environment, the processing unit 1002 may determine one or more anchor points based on the location of the first user. Each anchor point may be associated with a feature in the environment that is predetermined for localization purpose. As the first user is moving, the location of the first user changes, and the set of anchor point(s) for the first user also changes. Similarly, the second user in the environment may have a set of anchor point(s) associated with the location of the second user. In some embodiments, the processing unit 1002 may be configured to register the first and second user to the environment based on the respective sets of anchor point(s) associated with the respective users. Also, in some embodiments, if the two users are located close enough, the respective sets of anchor point(s) may have one or more common anchor point(s). In such cases, the processing unit 1002 may be configured to register the users to the environment based on one or more common anchor point(s).

In some embodiments, the object identifier 1060 may be implanted as a part of the space definer 1070. In such cases, the object identifier 1060 may be used to identify one or more objects, and the identified object(s) may be used by the space definer 1070 to define a virtual space. In other embodiments, the object identifier 1060 may be a separate component/module from the space definer 1070. In such cases, the object identifier 1060 may identify one or more objects, and may provide information regarding the identified object(s) to the space definer 1070.

In some embodiments, the space definer 1070 may provide output to the graphic generator 1030 so that the graphic generator 1030 can generate graphics based on the output, and/or may provide output to the non-transitory medium 1040 for storage. Any information determined by the space definer 1070 may be provided to the graphic generator 1030 and/or to the non-transitory medium 1040. For example, in some embodiments, the space definer 1070 may provide information regarding a virtual wall for the virtual space. In such cases, the space definer 1070 may provide information regarding the virtual wall to the graphic generator 1030. The graphic generator 1030 may then generate a graphic indicating the virtual wall so that it can be displayed on the screen of the image display device 2. The information regarding the virtual wall for the virtual space may also be stored in the non-transitory medium 1040.

In some embodiments, the space definer 1070 may be configured to provide any of the features described with reference to FIGS. 12-14.

In some embodiments, the controller component 4 may be utilized by the user to insert the virtual content. For example, the controller component may be moved, and/or one or more user controls (e.g., joystick, touch sensitive area, button, etc.) may be actuated to move and/or to place the virtual content at a desired location. In other embodiments, the virtual content may be provided without using the controller component 4. For example, in other embodiments, the virtual content may be provided by the graphic generator 1030 in response to a stare or a viewing of an area in the environment by the user that has passed a certain time threshold (e.g., 2 seconds, 3 seconds, 4 seconds, etc.). In some embodiments, the processing unit 1002 may be configured to provide the virtual content using the technique described with reference to FIGS. 6-7.

In other embodiments, the space definer 1070 is optional, and the processing unit 1002 does not include the space definer 1070.

Pointer Configurator

As shown in FIG. 15, the processing unit 1002 includes the pointer configurator 1080. The pointer configurator 1080 is configured to change a configuration of a pointer being displayed by the screen of the image display device 2. In some embodiments, the controller component 4 may be utilized by the user as a pointing device configured to point at objects in the physical environment surround the user, and/or at virtual objects. Based on the position and/or orientation of the controller component 4, the graphic generator 1030 generates a virtual pointer for display by the screen of the image display device 2. For example, the virtual pointer may be a graphic of an elongate object. The virtual pointer may be displayed so that it appears to be pointing at a certain object in the physical environment, or at a certain virtual object. As the user moves the controller component 4, the position of the elongate object in the screen will change correspondingly. This feature is advantageous because it allows the user to see which object the controller component 4 is pointing at.

In some embodiments, the virtual pointer may be used by the user to interact with a virtual object being displayed in the screen of the image display device 2. For example, the user may use the virtual pointer to select a virtual object, and/or to move the virtual object. The pointer configurator 1080 is configured to adjust a configuration of the pointer displayed in the screen, and/or to present an interaction graphic in association with the virtual pointer. For example, as the user moves the virtual pointer to position a virtual object, the pointer configurator 1080 may change a shape of the virtual pointer. In some cases, the virtual pointer may appear to undergo bending as the virtual pointer is moving a virtual object. The amount of bending may be based on a weight or a mass of the virtual object being positioned. For example, if the virtual object has a heavier mass, then the virtual pointer may undergo more bending as it is being used to move the virtual object.

In other embodiments, instead of or in addition to changing a shape of the virtual pointer, the pointer configurator 1080 may be configured to change other feature(s) of the virtual pointer, such as to change a color of the virtual pointer, a size of the virtual pointer, etc., in response to an interaction between the virtual pointer and the virtual object.

Also, in other embodiments, the processing unit 1002 may be configured to provide an interaction graphic (for display by the screen of the image display device 2) in response to an interaction between the pointer and a virtual object. The interaction graphic may be generated by the graphic generator 1030 based on input provided by the pointer configurator 1080. The interaction graphic may be a highlight of the virtual object being selected by the virtual pointer, or any graphic that is displayed in association with the virtual pointer.

In some embodiments, the pointer configurator 1080 may be configured to provide any of the features described with reference to FIGS. 9A-9E.

In other embodiments, the pointer configurator 1080 is optional, and the processing unit 1002 does not include the pointer configurator 1080.

Figure 16A:
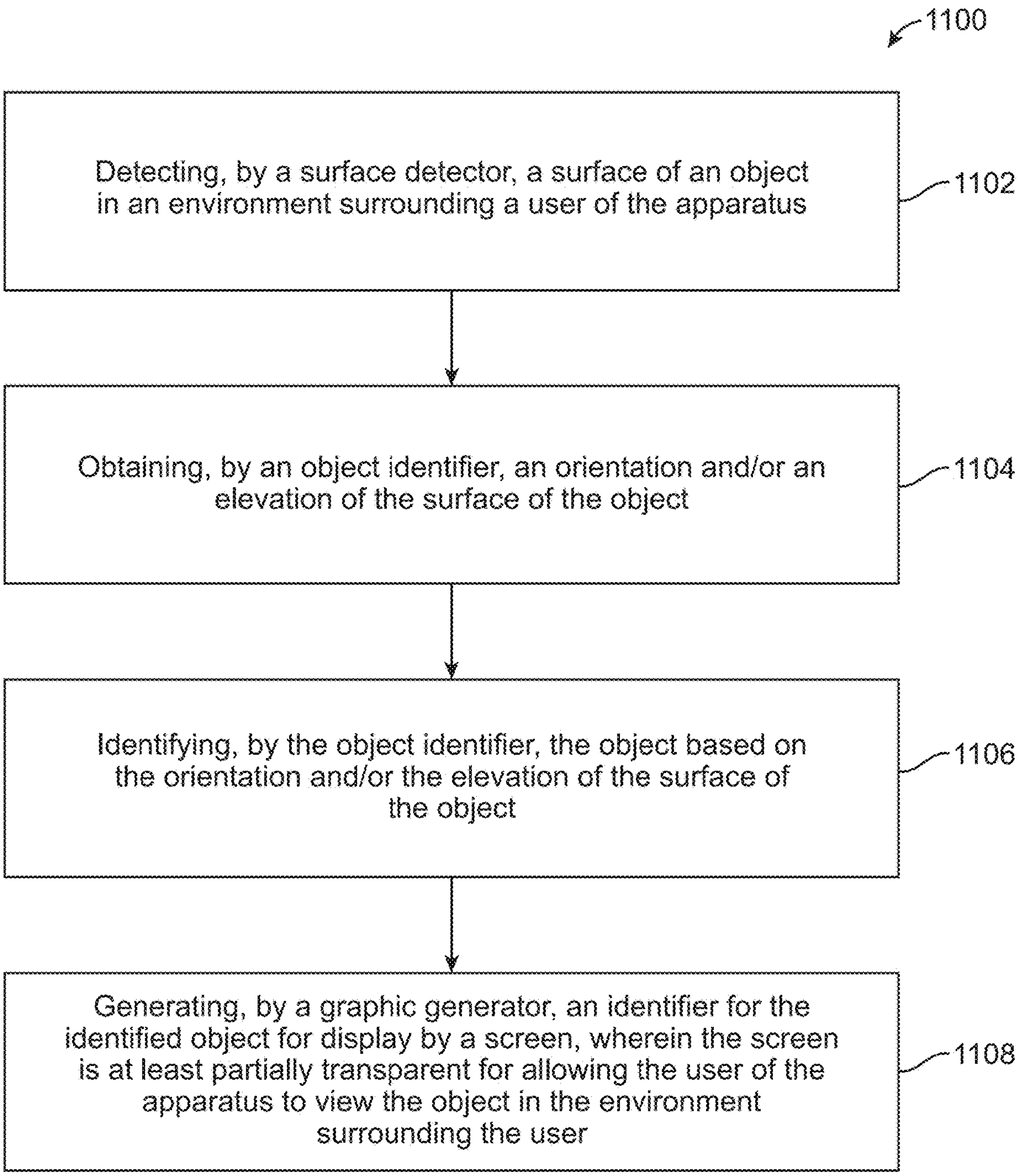
FIG. 16A illustrates a method in accordance with some embodiments.

Method Performed by the Processing Unit and/or Application in the Processing Unit FIG. 16A illustrates a method 1100 in accordance with some embodiments. The method 1100 may be performed by an apparatus configured to provide virtual content in a virtual or augmented environment. Also, in some embodiments, the method 1100 may be performed by an apparatus that is configured to provide a virtual content in a virtual or augmented reality environment in which a first user wearing a first display screen and a second user wearing a second display screen can interact with each other. Each image display device may be the image display device 2 in some embodiments. In some embodiments, the method 1100 may be performed by any of the image display devices described herein, or by multiple image display devices. Also, in some embodiments, at least a part of the method 1100 may be performed by the processing unit 1002, or by multiple processing units (e.g., processing units in respective image display devices). Furthermore, in some embodiments, the method 1100 may be performed by a server or an apparatus that is separate from image display devices being worn by respective users.

As shown in FIG. 16A, the method 1100 includes: detecting, by a surface detector, a surface of an object in an environment surrounding a user of the apparatus (item 1102); obtaining, by an object identifier, an orientation and/or an elevation of the surface of the object (item 1104); identifying, by the object identifier, the object based on the orientation and/or the elevation of the surface of the object (item 1106); and generating, by a graphic generator, an identifier for the identified object for display by a screen, wherein the screen is at least partially transparent for allowing the user of the apparatus to view the object in the environment surrounding the user (item 1108).

Optionally, in the method 1100, the object is identified as a wall if the orientation of the surface of the object is substantially vertical, and if the elevation of the surface of the object is above an elevation threshold.

Optionally, in the method 1100, the object is identified as a floor if the orientation of the surface of the object is substantially horizontal, and if the elevation of the surface of the object is below an elevation threshold.

Optionally, in the method 1100, the object is identified as a furniture if the orientation of the surface of the object is substantially horizontal, and if the elevation of the surface of the object is above a first elevation threshold and is below a second elevation threshold.

Optionally, in the method 1100, the identifier is displayed at a location in the screen, such that when the user views the object in the environment through the screen, the identifier will be in a spatial relationship with respect to the object.

Optionally, the method 1100 further includes obtaining an input indicating a selection of the object for which the identification of the object is to be determined.

Optionally, in the method 1100, the input comprises a user input generated via a controller component, the user input indicating the selection of the object.

Optionally, in the method 1100, the user input indicates a cursor position in the screen, and wherein the method further comprises determining the object in the environment being selected based on the cursor position.

Optionally, in the method 1100, the user input indicates an orientation of the controller component, and wherein the method further comprises determining the object in the environment being selected based on a direction of pointing by the controller component towards the object in the environment.

Optionally, the method 1100 further includes selecting the object for identification based on a presence of an image of the object in a camera image provided by a camera of the apparatus.

Optionally, in the method 1100, object is selected automatically for identification.

Optionally, in the method 1100, the object is selected in response to the object being presence in a sequence of camera images that comprise the camera image within a duration exceeding a time threshold.

Optionally, the method 1100 further includes defining a virtual space.

Optionally, in the method 1100, the act of defining the virtual space comprises defining a virtual wall for the virtual space.

Optionally, in the method 1100, the virtual wall is offset from a real physical wall in the environment surrounding the user.

Optionally, in the method 1100, the virtual wall is aligned with, or intersects, a real physical wall in the environment surrounding the user.

Optionally, the method 1100 further includes displaying, by the screen, a wall identifier at a location in the screen, such that when the user views the virtual wall, the wall identifier will be in a spatial relationship with respect to the virtual wall.

Optionally, in the method 1100, the act of defining the virtual space comprises defining a plurality of virtual walls for the virtual space; and wherein the method further comprises displaying, by the screen, wall identifiers for the respective virtual walls.

Optionally, in the method 1100, the act of defining the virtual space comprises defining a corner for the virtual space.

Optionally, in the method 1100, the act of defining the virtual space comprises defining a wall edge for the virtual space.

Optionally, the method 1100 further includes obtaining a user input generated via a controller component, the user input indicating a selection of a feature in the environment for defining at least a part of the virtual space.

Optionally, in the method 1100, the feature in the environment comprises a wall, a wall corner, an edge, or any combination of the foregoing.

Optionally, in the method 1100, the user input indicates a cursor position in the screen.

Optionally, in the method 1100, the user input indicates an orientation of the controller component, and wherein the selection of the feature in the environment is based on a direction of pointing by the controller component towards the feature in the environment.

Optionally, the method 1100 further includes selecting a feature in the environment for defining at least a part of the virtual space, wherein the act of selecting is performed based on a presence of an image of the feature in a camera image provided by a camera of the apparatus.

Optionally, in the method 1100, the feature in the environment is selected automatically.

Optionally, in the method 1100, the feature is selected in response to the feature being presence in a sequence of camera images that includes the camera image within a duration exceeding a time threshold.

Optionally, the method 1100 further includes displaying, by the screen, a pointer based on an orientation of a controller component, and wherein the method further comprises adjusting a configuration of the pointer displayed in the screen, and/or presenting an interaction graphic in association with the pointer.

Optionally, in the method 1100, the act of adjusting the configuration of the pointer and/or the act of presenting the interaction graphic, is performed in response to an interaction between the pointer and a virtual object.

Optionally, the method 1100 further includes providing a virtual content for interaction by the user and an additional user.

Optionally, the method 1100 further includes connecting the user and the additional user to a same virtual space so that the user and the additional user can interact with the virtual content at the same virtual space.

Optionally, in the method 1100, the virtual content is provided for interaction by the user and the additional user in different respective rooms.

Optionally, in the method 1100, the virtual content is provided for interaction by the user and the additional user in a same room.

Optionally, the method 1100 further includes registering the user and the additional user to the environment so that the user and the additional user can interact with the virtual content while they are in the environment.

Optionally, in the method 1100, the virtual content is provided in response to a stare or a viewing of an area by the user that has passed a certain time threshold.

Optionally, in the method 1100, the act of registering the user and the additional user to the environment comprises determining one or more anchor points that are associated with a location of the user and a location of the additional user.

A processor-readable non-transitory medium stores a set of instructions, an execution of which by a processing unit will cause a method to be performed, the processing unit being a part of an apparatus that is configured to provide a virtual or augmented reality experience, the method comprising: detecting, by a surface detector, a surface of an object in an environment surrounding a user of the apparatus; obtaining, by an object identifier, an orientation and/or an elevation of the surface of the object; identifying, by the object identifier, the object based on the orientation and/or the elevation of the surface of the object; and generating, by a graphic generator, an identifier for the identified object for display by a screen, wherein the screen is at least partially transparent for allowing the user of the apparatus to view the object in the environment surrounding the user.

In some embodiments, the method 1100 may be performed in response to a processing unit executing instructions stored in a non-transitory medium. Accordingly, in some embodiments, a non-transitory medium includes stored instructions, an execution of which by a processing unit will cause a method to be performed. The processing unit may be a part of an apparatus that is configured to provide a virtual or an augmented reality experience. The method (caused to be performed by the processing unit executing the instructions) includes: detecting, by a surface detector, a surface of an object in an environment surrounding a user of the apparatus; obtaining, by an object identifier, an orientation and/or an elevation of the surface of the object; identifying, by the object identifier, the object based on the orientation and/or the elevation of the surface of the object; and generating, by a graphic generator, an identifier for the identified object for display by a screen, wherein the screen is at least partially transparent for allowing the user of the apparatus to view the object in the environment surrounding the user.

Figure 16B:
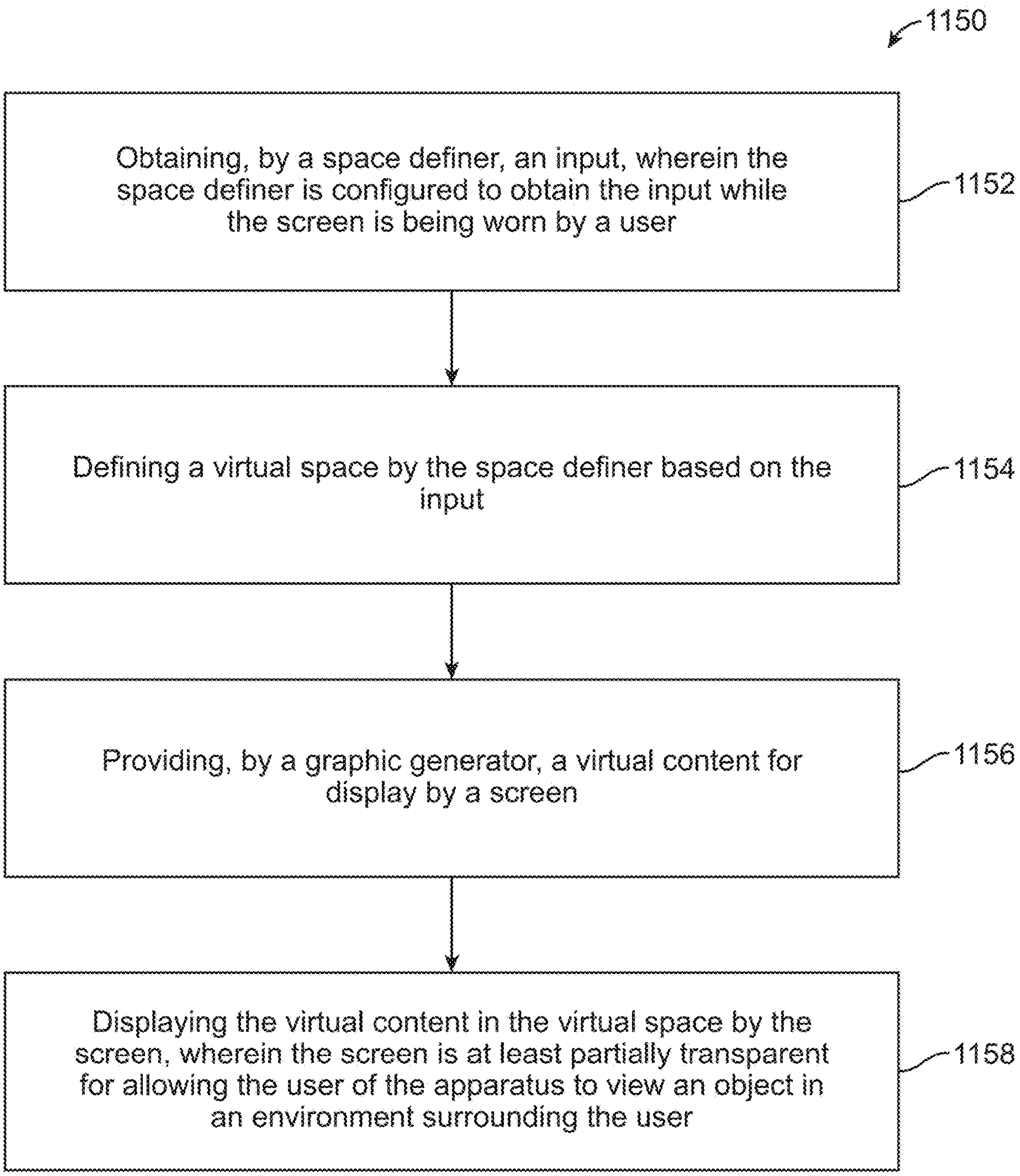
FIG. 16B illustrates another method in accordance with some embodiments.

FIG. 16B illustrates a method 1150 in accordance with some embodiments. The method 1150 may be performed by an apparatus configured to provide virtual content in a virtual or augmented environment. Also, in some embodiments, the method 1150 may be performed by an apparatus that is configured to provide a virtual content in a virtual or augmented reality environment in which a first user wearing a first display screen and a second user wearing a second display screen can interact with each other. Each image display device may be the image display device 2 in some embodiments. In some embodiments, the method 1150 may be performed by any of the image display devices described herein, or by multiple image display devices. Also, in some embodiments, at least a part of the method 1150 may be performed by the processing unit 1002, or by multiple processing units (e.g., processing units in respective image display devices). Furthermore, in some embodiments, the method 1150 may be performed by a server or an apparatus that is separate from image display devices being worn by respective users.

As shown in FIG. 16B, the method 1150 includes: obtaining, by a space definer, an input, wherein the space definer is configured to obtain the input while the screen is being worn by a user (item 1152); defining a virtual space by the space definer based on the input (item 1154); providing, by a graphic generator, a virtual content for display by a screen (item 1156); and displaying the virtual content in the virtual space by the screen, wherein the screen is at least partially transparent for allowing the user of the apparatus to view an object in an environment surrounding the user (item 1158).

Optionally, in the method 1150, the act of defining the virtual space comprises defining a virtual wall for the virtual space.

Optionally, in the method 1150, the virtual wall is offset from a real physical wall in the environment surrounding the user.

Optionally, in the method 1150, the virtual wall is aligned with, or intersects, a real physical wall in the environment surrounding the user.

Optionally, the method 1150 further includes displaying, by the screen, a wall identifier at a location in the screen, such that when the user views the virtual wall, the wall identifier will be in a spatial relationship with respect to the virtual wall.

Optionally, in the method 1150, the act of defining the virtual space comprises defining a plurality of virtual walls for the virtual space; and wherein the method further comprises displaying, by the screen, wall identifiers for the respective virtual walls.

Optionally, in the method 1150, the act of defining the virtual space comprises defining a corner for the virtual space.

Optionally, in the method 1150, the act of defining the virtual space comprises defining a wall edge for the virtual space.

Optionally, the method 1150 further includes obtaining the user input generated via a controller component, the user input indicating a selection of a feature in the environment for defining at least a part of the virtual space.

Optionally, in the method 1150, the feature in the environment comprises a wall, a wall corner, an edge, or any combination of the foregoing.

Optionally, in the method 1150, the user input indicates a cursor position in the screen.

Optionally, in the method 1150, the user input indicates an orientation of the controller component, and wherein the selection of the feature in the environment is based on a direction of pointing by the controller component towards the feature in the environment.

Optionally, the method 1150 further includes selecting a feature in the environment, for defining at least a part of the virtual space, based on a presence of an image of the feature in a camera image provided by a camera, wherein the camera image is the input obtained by the space definer.

Optionally, in the method 1150, the feature in the environment is selected automatically.

Optionally, in the method 1150, the feature in the environment is selected in response to the feature being presence in a sequence of camera images that includes the camera image within a duration exceeding a time threshold.

Optionally, in the method 1150, the virtual content is also for interaction by an additional user.

Optionally, the method 1150 further includes connecting the user and the additional user to the virtual space so that the user and the additional user can interact with the virtual content at the virtual space.

Optionally, in the method 1150, the virtual content is provided for interaction by the user and the additional user in different respective rooms.

Optionally, in the method 1150, the virtual content is provided for interaction by the user and the additional user in a same room.

Optionally, the method 1150 further includes registering the user and the additional user to the environment so that the user and the additional user can interact with the virtual content while they are in the environment.

Optionally, in the method 1150, the act of registering the user and the additional user to the environment comprises determining one or more anchor points that are associated with a location of the user and a location of the additional user.

Optionally, in the method 1150, the virtual content is provided in response to a stare or a viewing of an area by the user that has passed a certain time threshold.

In some embodiments, the method 1150 may be performed in response to a processing unit executing instructions stored in a non-transitory medium. Accordingly, in some embodiments, a non-transitory medium includes stored instructions, an execution of which by a processing unit will cause a method to be performed. The processing unit may be a part of an apparatus that is configured to provide a virtual or an augmented reality experience. In some embodiments, the apparatus may include a screen for displaying information. The method (caused to be performed by the processing unit executing the instructions) includes: obtaining, by a space definer, an input, wherein the space definer is configured to obtain the input while the screen is being worn by a user; defining a virtual space by the space definer based on the input; providing, by a graphic generator, a virtual content for display by a screen; and displaying the virtual content in the virtual space by the screen, wherein the screen is at least partially transparent for allowing the user of the apparatus to view an object in an environment surrounding the user.

Specialized Processing System

In some embodiments, the method 1100/1150 described herein may be performed by the system 1 (e.g., the processing unit 1002) executing an application, or by the application. The application may contain a set of instructions. In one implementation, a specialized processing system having a non-transitory medium storing the set of instruction for the application may be provided. The execution of the instruction by the processing unit 1102 of the system 1 will cause the processing unit 1102 and/or the image display device 2 to perform the features described herein. For example, in some embodiments, an execution of the instructions by a processing unit 1102 will cause the method 1100/1150 to be performed.

In some embodiments, the system 1, the image display device 2, or the apparatus 7 may also be considered as a specialized processing system. In particular, the system 1, the image display device 2, or the apparatus 7 is a specialized processing system in that it contains instruction stored in its non-transitory medium for execution by the processing unit 1102 to provide unique tangible effects in a real world. The features provided by the image display device 2 (as a result of the processing unit 1102 executing the instruction) provide improvements in the technological field of augmented reality and virtual reality.

Figure 17:
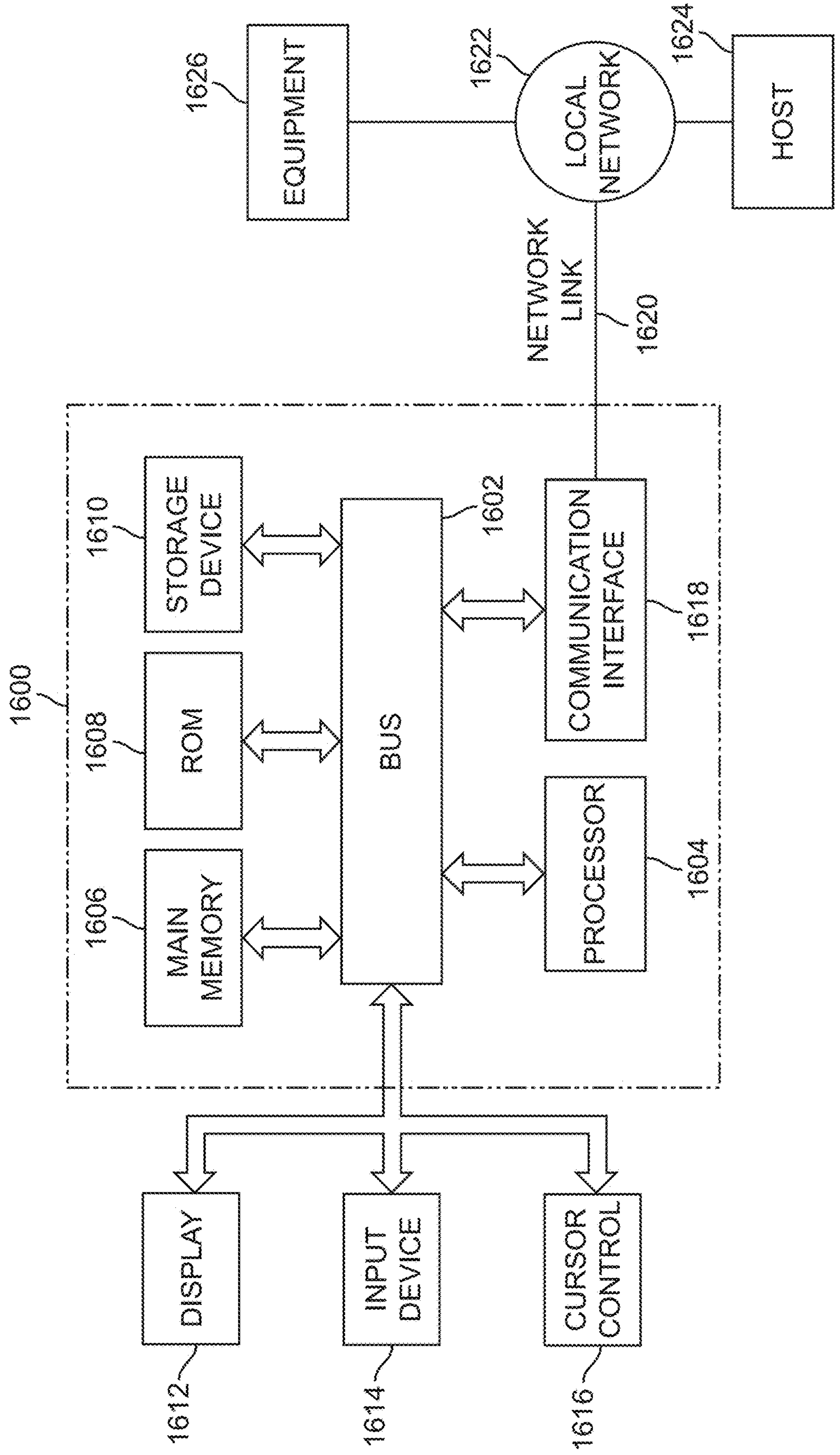
FIG. 17 illustrates a specialized processing system in accordance with some embodiments.

FIG. 17 is a block diagram illustrating an embodiment of a specialized processing system 1600 that can be used to implement various features described herein. For example, in some embodiments, the processing system 1600 may be used to implement at least a part of the system 1, e.g., the image display device 2, the processing unit 1002, etc. Also, in some embodiments, the processing system 1600 may be used to implement the processing unit 1102, or one or more components therein (e.g., the positioner 1020, the graphic generator 1030, etc.).

The processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the term "image", as used in this specification, may refer to image that is displayed, and/or image that is not in displayed form (e.g., image that is stored in a medium, or that is being processed).

Also, as used in this specification, the term "action" of the virtual content is not limited to a virtual content that is moving, and may refer to a stationary virtual content that is capable of being moved (e.g., a virtual content that can be, or is being, "dragged" by the user using a pointer), or may refer to any virtual content on which or by which an action may be performed.

Various exemplary embodiments are described herein. Reference is made to these examples in a non-limiting sense. They are provided to illustrate more broadly applicable aspects of the claimed invention. Various changes may be made to the embodiments described and equivalents may be substituted without departing from the true spirit and scope of the claimed invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the claimed inventions. All such modifications are intended to be within the scope of claims associated with this disclosure.

The embodiments described herein include methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

In addition, as used herein, a phrase referring to "at least one of" a list of items refers to one item or any combination of items. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. An apparatus for providing an augmented reality experience, comprising:

a screen, wherein the screen is at least partially transparent for allowing a user of the apparatus to view an object in an environment surrounding the user;

a space definer configured to obtain an input, and to define a virtual space based on the input, wherein the space definer is configured to obtain the input while the screen is being worn by the user; and a graphic generator configured to provide a virtual content for display by the screen, wherein the screen is configured to display the virtual content in the virtual space, and wherein the virtual content is moveable relative to a boundary of the virtual space.

2. The apparatus of claim 1, wherein the space definer is configured to define a virtual wall for the virtual space.

3. The apparatus of claim 2, wherein the virtual wall is offset from a real physical wall in the environment surrounding the user.

4. The apparatus of claim 3, wherein the virtual wall is aligned with, or intersects, a real physical wall in the environment surrounding the user.

5. The apparatus of claim 4, wherein the screen is configured to display a wall identifier at a location in the screen, such that when the user views the virtual wall, the wall identifier will be in a spatial relationship with respect to the virtual wall.

6. The apparatus of claim 1, wherein the space definer is configured to define a plurality of virtual walls for the virtual space; and wherein the screen is configured to display wall identifiers for the respective virtual walls.

7. The apparatus of claim 1, wherein the space definer is configured to define a corner for the virtual space.

8. The apparatus of claim 1, wherein the space definer is configured to define a wall edge for the virtual space.

9. The apparatus of claim 1, wherein the space definer is configured to obtain the user input generated via a controller component, the user input indicating a selection of a feature in the environment for defining at least a part of the virtual space.

10. The apparatus of claim 9, wherein the feature in the environment comprises a wall, a wall corner, an edge, or any combination of the foregoing.

11. The apparatus of claim 9, wherein the user input indicates a cursor position in the screen.

12. The apparatus of claim 9, wherein the user input indicates an orientation of the controller component, and wherein the selection of the feature in the environment is based on a direction of pointing by the controller component towards the feature in the environment.

13. The apparatus of claim 1, further comprising a camera, wherein the apparatus is configured to select a feature in the environment, for defining at least a part of the virtual space, based on a presence of an image of the feature in a camera image provided by the camera, wherein the camera image is the input obtained by the space definer.

14. The apparatus of claim 13, wherein the apparatus is configured to select the feature in the environment automatically.

15. The apparatus of claim 13, wherein the apparatus is configured to select the feature in response to the feature being presence in a sequence of camera images that includes the camera image within a duration exceeding a time threshold.

16. The apparatus of claim 1, wherein the virtual content is also for interaction by an additional user.

17. The apparatus of claim 16, wherein the apparatus is configured to connect the user and the additional user to the virtual space so that the user and the additional user can interact with the virtual content at the virtual space.

18. The apparatus of claim 16, wherein the graphic generator is configured to provide the virtual content for interaction by the user and the additional user in different respective rooms.

19. A method performed by an apparatus that is configured to provide a virtual or augmented reality experience, the apparatus comprising a screen, the method comprising:

obtaining, by a space definer, an input, wherein the space definer is configured to obtain the input while the screen is being worn by a user;

defining a virtual space by the space definer based on the input;

providing, by a graphic generator, a virtual content for display by a screen; and displaying the virtual content in the virtual space by the screen, wherein the screen is at least partially transparent for allowing the user of the apparatus to view an object in an environment surrounding the user, and wherein the virtual content is moveable relative to a boundary of the virtual space.

20. A processor-readable non-transitory medium storing a set of instructions, an execution of which by a processing unit will cause a method to be performed, the processing unit being a part of an apparatus that is configured to provide a virtual or augmented reality experience, the apparatus comprising a screen, the method comprising:

obtaining, by a space definer, an input, wherein the space definer is configured to obtain the input while the screen is being worn by a user;

defining a virtual space by the space definer based on the input;

providing, by a graphic generator, a virtual content for display by a screen; and displaying the virtual content in the virtual space by the screen, wherein the screen is at least partially transparent for allowing the user of the apparatus to view an object in an environment surrounding the user, and wherein the virtual content is moveable relative to a boundary of the virtual space.

* * * * *